US006522994B1

(12) United States Patent
Lang

(10) Patent No.: US 6,522,994 B1
(45) Date of Patent: Feb. 18, 2003

(54) INPUT/LOSS METHOD FOR DETERMINING FUEL FLOW, CHEMISTRY, HEATING VALUE AND PERFORMANCE OF A FOSSIL-FIRED SYSTEM

(75) Inventor: Fred D. Lang, San Rafael, CA (US)

(73) Assignee: Exergetic Systems LLC, San Rafael, CA (US)

( * ) Notice: Subject to any disclaimer, the term of this patent is extended or adjusted under 35 U.S.C. 154(b) by 0 days.

(21) Appl. No.: 09/273,711

(22) Filed: Mar. 22, 1999

Related U.S. Application Data

(63) Continuation-in-part of application No. 09/047,198, filed on Mar. 24, 1998.

(51) Int. Cl.$^7$ ............................ G06F 11/30; G06F 15/00
(52) U.S. Cl. ........................ 702/183; 702/22; 700/274
(58) Field of Search ......................... 702/22–25, 30–32, 702/45, 50, 55, 108, 113, 114, 182–185, 188; 700/266, 274, 287; 701/99, 100, 102; 110/185, 186, 188, 190, 91

(56) References Cited

U.S. PATENT DOCUMENTS

| | | | | |
|---|---|---|---|---|
| 4,969,408 A | * | 11/1990 | Archer et al. | 110/147 |
| 5,327,356 A | * | 7/1994 | Lang et al. | 250/338.5 |
| 5,367,470 A | * | 11/1994 | Lang | 431/12 |
| 5,563,803 A | * | 10/1996 | Morihara et al. | 209/473 |
| 5,599,179 A | * | 2/1997 | Lindner et al. | 431/12 |
| 5,790,420 A | * | 8/1998 | Lang | 700/287 |

OTHER PUBLICATIONS

Lang, F. D. and M. A. Bushey, "The Role of Valid Emission Rate Methods in Enforcement of the Clean Air Act", EPRI 1994 Heat Rate Improvement Conference, May 3–5, Baltimore, MD.*

F.D. Lang, "Methodology for Testing and Evaluating Power Plants Using Computer Simulators", 1990 Performance Software User's Group Meeting, May 1–4, 1990, St. Louis, sponsored by EI International, now Scientech Inc. of Idaho Falls, ID.

T. Buna, "Combustion Calculations for Multiple Fuels", ASME Diamond Jubilee Annual Meeting, Chicago, IL, Nov. 13–18, 1955, Paper 55–A–185, pp. 1237–1249.

E. Levy, N. Sarunac, H.G. Grim, R. Leyse and J. Lamont, "Output/Loss: A New Method for Measuring Unit Heat Rate", Am. Society of Mech. Engrs., 87–JPGC–Pwr–39.

Chapter 9, "Measurement of Heat of Combustion" contained in *Steam, Its Generation and Use*, 40th Edition, edited by S.C. Stultz and J.B. Kitto, published 1992 by the Babcock & Wilcox Company, Barberton, OH. pp. 9–8 and 9–9.

S.S. Munukutla, G. Tsatsaronis, Y. Shih, D.E. Anderson and S.M. Wilson, "A Microcomputer Software for On–Line Evaluation of Heat Rate", ASME Power Generation Conference, Philadelphia, PA, Sep. 25–29, 1988, Paper 88–JPGC/PTC–1.

S. Munukutla and A. Bose, "On–Line Elemental Analysis of Coal Using Gas Chromatography", 1989 EPRI Heat Rate Improvement Conference, May 3–5, Knoxville, TN, published 1990), pp. 7B–53 to 7B–59.

(List continued on next page.)

Primary Examiner—Marc S. Hoff
Assistant Examiner—Manuel L. Barbee
(74) Attorney, Agent, or Firm—Gary Hoenig

(57) ABSTRACT

The operation of a fossil-fueled thermal system is quantified by obtaining a reference fuel chemistry before on-line operation, and thereafter operating on-line. In on-line operation, a set of measurable operating parameters is measured, including at least effluent concentrations of $O_2$ and $CO_2$, and optionally the concentration of effluent $H_2O$ and the concentration of effluent $SO_2$. An indicated Air/Fuel ratio is obtained, as are the ambient concentration of $O_2$, and air pre-heater leakage and dilution factors. The fuel ash and fuel water are calculated, and the complete As-Fired fuel chemistry is calculated. From the complete As-Fired fuel chemistry, the pertinent systems parameters such as reference fuel heating value, boiler efficiency, system efficiency, fuel flow rate, total effluent flow rate, individual effluent flow rates, and individual emission rates are determined in a fully consistent manner. The Method has been reduced to software which is fully benchmarked and operational.

75 Claims, 8 Drawing Sheets

OTHER PUBLICATIONS

S. Munukutla, P. Chodavarapu and D.C. O'Connor, "On–Line Coal Analysis from Measurement of Flue Gas Components", ASME International Power Generation Conference, San Diego, CA, Oct. 6–10, 1991, Paper 91–JPGC–Pwr–17.

S. Munukutla and F. Khodabakhsh, "Enhancement of Boiler Performance Evaluation Methods Using CEMS Data", ASME International Joint Power Generation Conference, Minneapolis, MN, Oct. 8–12, 1995, PWR–Vol. 29, 1995, pp. 11–16.

F.D. Lang, et al, "Confirmatory Testing of the Emissions Spectral Radiometer/Fuel Flow (ESR/FF) Instrument", Electric Power Research Institute (EPRI) 1994 Heat Rate Improvement Conference, May 3–5, 1994, Baltimore, MD.

R.D. McRanie, et al, "The Electric Power Research Institute Continuous Emissions Monitoring Heat Rate Discrepancy Project, An Update Report—Dec. 1996", available from EPRI, Palo Alto, CA.

F.D. Lang and M.A. Bushey, "The Role of Valid Emission Rate Methods in Enforcement of the Clean Air Act", EPRI 1994 Heat Rate Improvement Conference, May 3–5, Baltimore, MD.

J.E. Roughton, "A Proposed On–Line Efficiency Method for Pulverized–Coal_Fired Boilers", Journal of the Institute of Energy, Mar. 1980, pp. 20–24.

A. Ghamarian & A. B. Cambel, "Energy/Exergy Analysis of Fluidized Bed Combustor", Proceedings of the Intersociety Energy Conversion Engineering Conference, Aug. 8–12, 1982, pp. 323–327.

A. Ghamarian & A. B. Cambel, "Exergy Analysis of Illinois No. 6 Coal", Energy, vol. 7, No. 6, 1982, pp. 483–488.

J. Szargut, "International Progress in Second Law Analysis", Energy, vol. 5, 1980, pp. 709–718.

J. Szargut & T. Stryrylska, "Approximate Determination of the Exergy of Fuels", Brennstoff–Warme–kraft, vol. 16, No. 12, Dec. 1964, pp. 589–596.

F.D. Lang and K.F. Horn, "Fuel Consumption Index for Proper Monitoring of Power Plants", EPRI 1991 Heat Rate Improvement Conference, May 7–9, Scottsdale, AZ, also available from Exergetic Systems, Inc. of San Rafael, CA in its latest version.

* cited by examiner

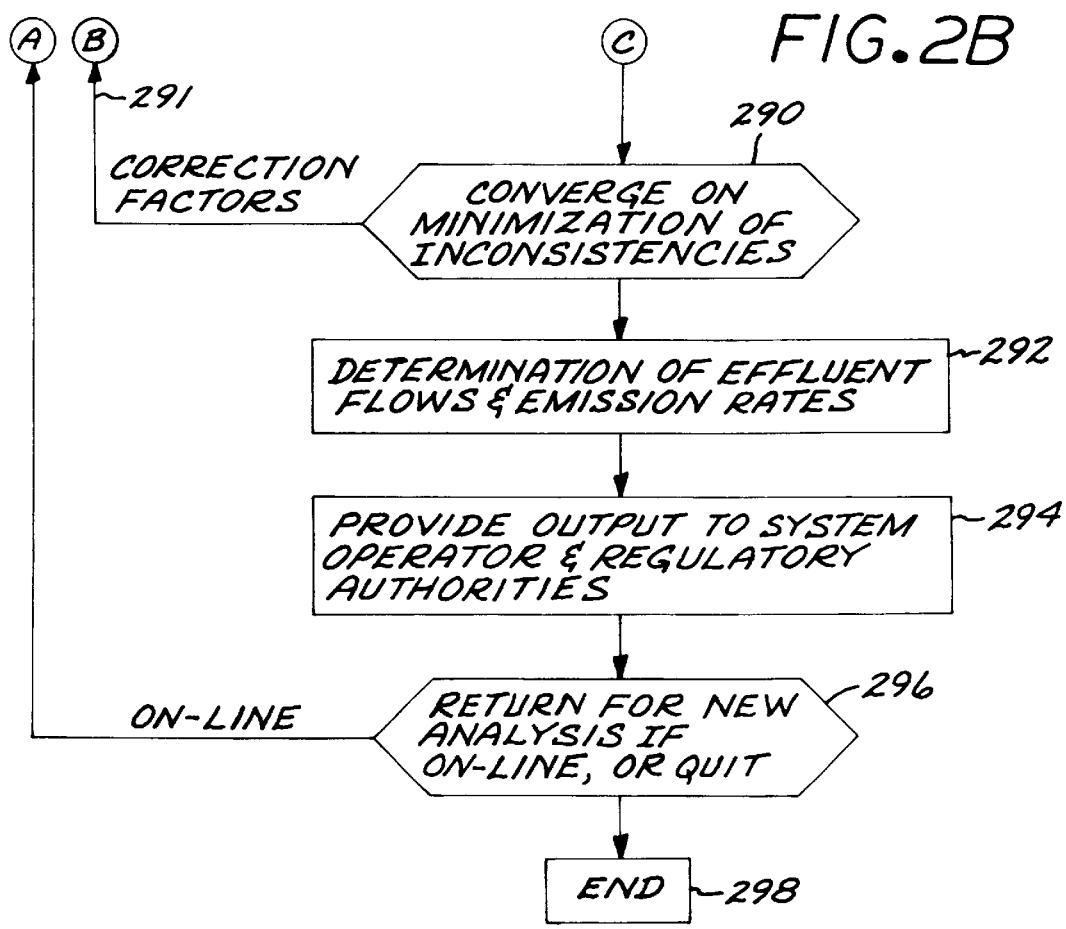

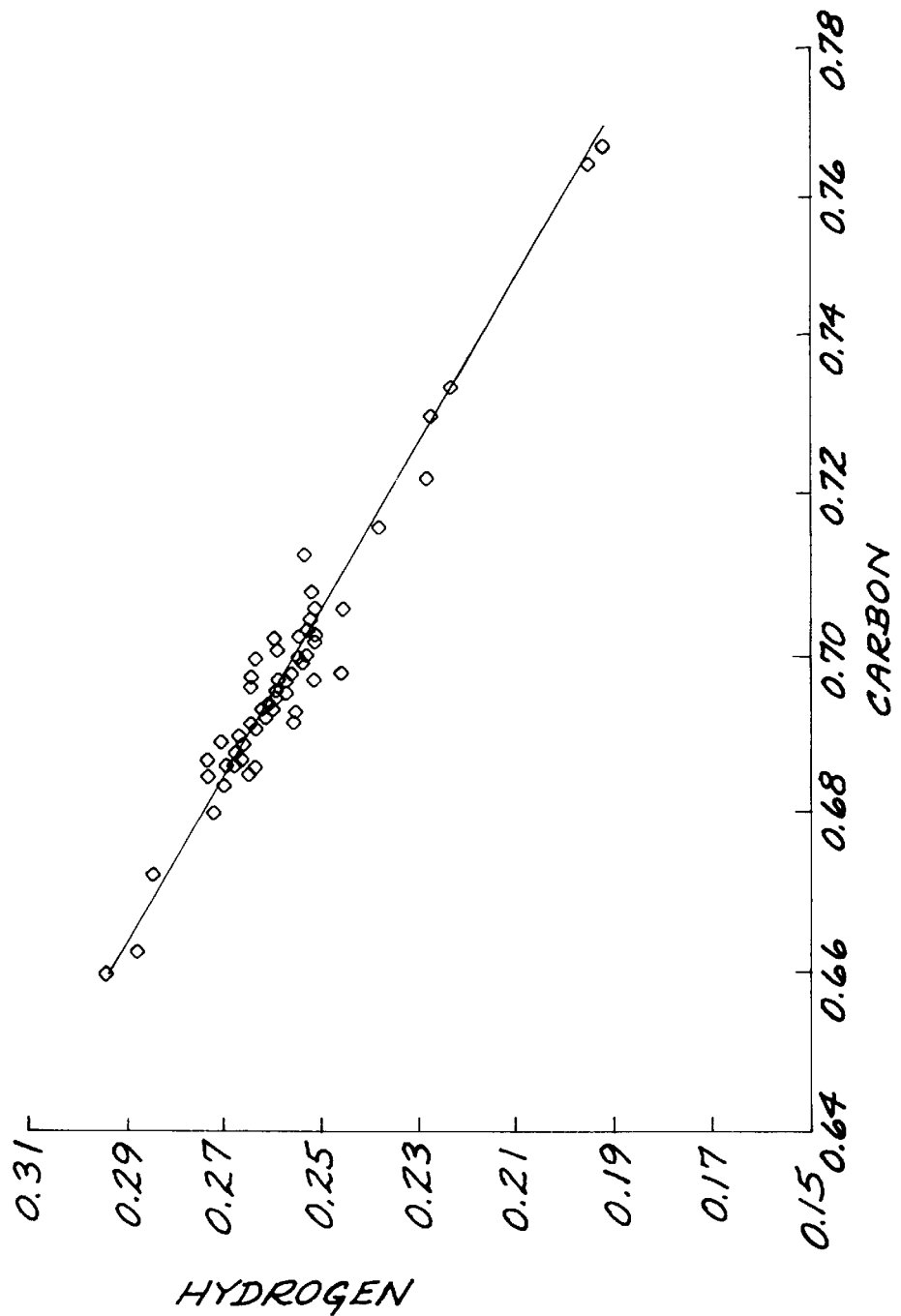

FIG. 4A

| CHARACTERISTICS OF AS-FIRED FUEL CHEMISTRY | | | SUGGESTED EFFLUENT INSTRUMENTATION & ASSUMPTIONS |
|---|---|---|---|
| MOISTURE | ASH | VARIABILITY | |
| ANTHRACITE & BITUMINOUS COAL: | | | $O_2$; $CO_2$ & $SO_2$; CONSTANT $H_2O$; CONSTANT ASH OR INDICATED AIR/FUEL GIVEN RESULTS OF ERROR ANALYSIS; UNUSUAL $CO_2$ ACCURACY SHOULD BE CONSIDERED. |
| <12% | <10% | CHEMISTRY VARIES WITHIN ±5% | |
| BITUMINOUS & SUB-BITUMINOUS COAL: | | | $O_2$; $CO_2$ & $SO_2$; CONSTANT $H_2O$ IF APPROPRIATE; CONSTANT ASH OR INDICATED AIR/FUEL RATIO DEPENDING ON VARIABILITY OF HYDROGEN/CARBON RATIO & ERROR ANALYSIS |
| <25% | <10% | VARIABLE RELATIONSHIP $H = f(C)$ | |
| BITUMINOUS & SLURRY FUELS COAL: | | | $O_2$; $CO_2$ & $SO_2$; $H_2O$ IF NOT BASE LOADED; CONSTANT ASH OR AIR/FUEL RATIO IF BASE LOADED. |
| >25% | <10% | HIGHLY VAR. WATER, ASH WITHIN ±5% | |
| >25% | <10% | WATER WITHIN ±10%, VARIABLE AIR/FUEL | $O_2$; $CO_2$ & $SO_2$; CONSTANT $H_2O$; INDICATED AIR/FUEL RATIO. |

FIG. 4B

| CHARACTERISTICS OF AS-FIRED FUEL CHEMISTRY | | | SUGGESTED EFFLUENT INSTRUMENTATION & ASSUMPTIONS |
|---|---|---|---|
| MOISTURE | ASH | VARIABILITY | |
| LIGNITES, BROWN COALS & REFUSE: | | | |
| <8% | >30% | HIGHLY VAR. ASH | $O_2$, $CO_2$ & $SO_2$; CONSTANT $H_2O$; INDICATED AIR/FUEL RATIO. |
| >8% | >30% | HIGHLY VAR. ASH & VARIABLE WATER | $O_2$, $CO_2$, $SO_2$ & $H_2O$; INDICATED AIR/FUEL RATIO; NOTE THAT ACCURACY OF $HHV_{Dry}$ & ASH COULD BE COMPROMISED WITHOUT EFFLUENT $H_2O$. |
| BIO-MASS & AGRICULTURAL BYPRODUCTS: | | | |
| <12% | <5% | CHEMISTRY VARIES WITHIN ±2 TO 5% | $O_2$, $CO_2$ & $SO_2$; CONSTANT $H_2O$; CONSTANT ASH. |
| GASEOUS FUEL & OIL FUEL: | | | |
| <1% | <3% | CHEMISTRY CONSTANT FOR A GIVEN FUEL, BUT A COMPOSITE CAN BE VARIABLE WHEN MIXING FUELS. | $O_2$, $CO_2$ & $SO_2$; CONSTANT $H_2O$; CONSTANT ASH. |

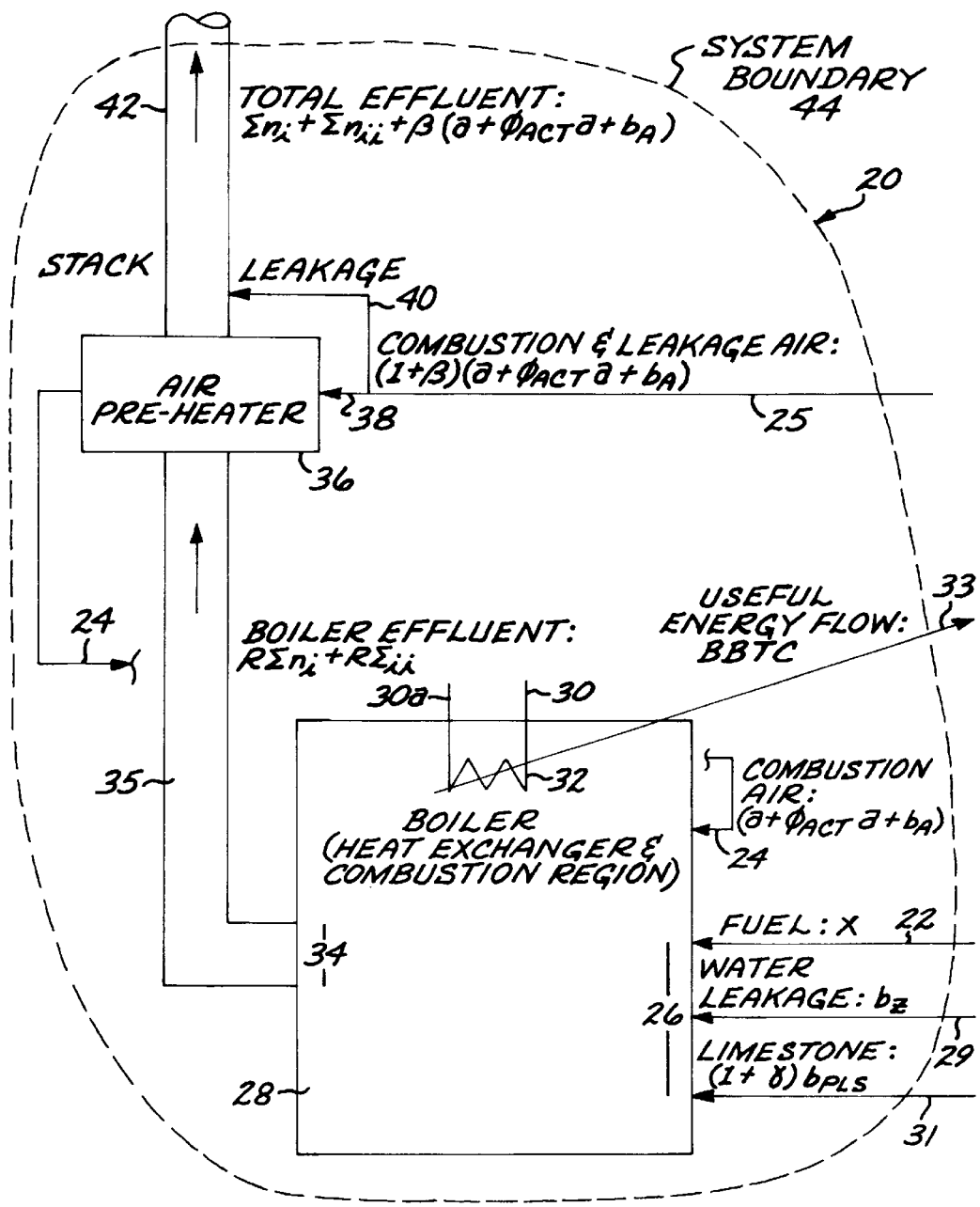

INPUT/LOSS METHOD FOR DETERMINING FUEL FLOW, CHEMISTRY, HEATING VALUE AND PERFORMANCE OF A FOSSIL-FIRED SYSTEM

This application is a continuation-in-part of pending application Ser. No. 09/047,198, filed Mar. 24, 1998, for which priority is claimed and whose disclosure is incorporated by reference.

BACKGROUND OF THE INVENTION

This invention relates to a fossil-fired power or steam generation thermal system, and, more particularly, to a method for determining its fuel chemistry, fuel heating value, fuel flow, and thermal performance from its basic operating parameters.

The importance of accurately determining thermal efficiency is critical to any thermal system. If practical day-to-day improvements in efficiency are to be made, and/or problems in thermally degraded equipment are to be found and corrected, then accuracy in determining thermal efficiency is a necessity. The tracking of the efficiency of any thermal system lies fundamentally in measuring the useful output, and the total in-flow of fuel. The useful output from a fossil fueled system includes the generation of electrical and/or mechanical power and/or the production of a heated working fluid such as steam.

The measuring of the useful output of thermal systems is highly developed and involves the direct measurement of electrical output and/or mechanical drives and/or thermal energy flow. Measuring electrical and mechanical power is well established. Measuring thermal energy flow involves direct measurement of the inlet and outlet pressure, temperature and/or quality of a fluid being heated by the combustion gases, as well as measurement of its mass flow rate (m). From this information enthalpies (h) may be determined, and thus the total energy flow, $m(h_{outlet} - h_{inlet})$, delivered from the combustion gases, when also considering incidental losses, may be determined.

The measurement of the energy flow of the input fuel requires knowledge of the heating value of the fuel and its mass flow rate. For thermal systems using gaseous fuels, the fuel's composition may be well characterized, thus its heating value may be determined based on known heats of combustion associated with individual components.

However, there are numerous situations where a fossil-fueled system's fuel energy flow is not well characterized. For example, even a gas-fired system, having no on-site fuel gas analyzer, may receive fuel from multiple sources whose composite heating value variation is ±5 percent or greater. The measurement of fuel flow may often present a problem of measurement accuracy, especially at lower loads where flow measurement devices are not calibrated. In either case the determination of fuel energy flow is critical for proper thermal understanding of any fossil-fired system, either for direct confirmation of computed results and/or for improving system thermal efficiency.

The importance of accurately determining pollutant concentrations and their flow rates is also critical to the practical operation of any fossil-fired system due to environmental constraints imposed through regulation, the potential of regulatory induced fines, and concern by the owner of the facility for environmental protection.

Given these considerations, it is equally important to have analytical evidence of the errors made in the determination of fuel flow and the errors in fuel heating value, and thus the resultant errors in the determined thermal efficiency of the system. Further, any error in effluent flow, which is proportional to any error made in fuel flow, is significant when monitoring and reporting to regulatory agencies the effluents from any source of fossil combustion. The method of this invention provides a technique for specifying and correcting possible errors based on the consistency of the primary measurements of effluent $O_2$, $CO_2$, indicated Air/Fuel ratio, assumed or measured effluent $H_2O$, possible air pre-heater leakage and the concentration of $O_2$ in combustion air.

The measurement of fuel flow has traditionally been accomplished via measurement of its mechanical effects on a device. Such effects include the pressure drop across nozzles or orifice plates, unique fluid densities, integrated weighing of a fuel handling conveyor belt (commonly used for bulk fuels such as coal), speed of sound, nuclear resonance, change in bulk storage levels, etc. Present industrial techniques for measuring gas or oil fuel flow result in typical errors of 1 percent to 10 percent relative to true values, depending on the care taken in designing, manufacturing, installing and calibrating the flow metering equipment and in its data reduction. Under ideal circumstances, tighter accuracies (i.e., smaller errors) are possible for gas and oil fuels, reaching at best 0.25 percent, but this is considered very unusual, always requiring extraordinary expense.

For bulk fuel such as coal, bio-mass, slurry fuels, wood, agricultural byproducts such as shells from nuts, trash and refuse, the typical accuracies of flow metering range upwardly from 5 percent and higher. Historically, bulk flow measurements have such poor accuracy that they are used only as a relative indicator of fuel flow. For fossil-fired systems any fuel flow error greater than approximately 1 percent, and certainly greater than 2 percent, is sufficiently high to preclude trending of the monitored fuel flow rate for reasons of thermal efficiency or for detecting degraded equipment. Improvement of efficiencies in a thermal system is classically concerned with a number of small incremental improvements, typically each in the range of 0.2 percent to 0.6 percent. A dozen or more of these, taken together, may result in 3 percent to 6 percent improvement. For example, an average 4.5 percent improvement has been physically demonstrated at over two dozen conventional power plants, see F. D. Lang, "Methodology for Testing and Evaluating Power Plants Using Computer Simulators", 1990 Performance Software User's Group Meeting, May 1–4, 1990, St. Louis, sponsored by EI International, now Scientech Inc. of Idaho Falls, Id. Prior approaches which attempt to address the accurate determination of fuel flow are discussed below.

Another critical consideration in determining thermal efficiency is the variation in the fuel's heating value due to variations in fuel chemistry. Chemical variations appear through the mix of fuel water, fuel mineral matter (called fuel ash), and the relationships of the elements comprising the basic hydrocarbon molecular chain and any free inorganic elements: nitrogen, oxygen, carbon, hydrogen and sulfur; but principally carbon, hydrogen and oxygen. If an accurate and direct flow measurement of bulk fuels is not practical, the only alternative is the determination of fuel energy flow, which is the product of flow rate and heating value of the fuel, based in part on the measured energy flow to the working fluid. If errors exist in the heating value, either an assumed, measured, or calculated value, errors will then result in the fuel flow. Prior approaches which attempt to address the determination of fuel energy flow are discussed below. Further, over the past 140 years of producing safe high pressure steam for society, mostly from coal, there has been no invention or process even suggesting an ability to determine a coal's fuel ash content in real time based on thermodynamics.

The approach of this invention is a much improved "Input/Loss Method". Prior input/loss methods have been known to the inventor, and to T. Buna as early as 1955.

One prior approach related to the present invention was developed by T. Buna in 1955 for the analysis of multiple fuels fed to a power plant. His approach was to characterize a fuel's effluent $CO_2$, given differing effluent $O_2$ values, by assuming fuel chemistry of the individual fuels. With this data for multiple fuels and knowledge of the Useful Energy Flow Delivered, he advocated determining each fuel's flow rate. He presents an "output-loss" and an "input-loss" approaches to determining boiler efficiency. The present invention is related only in that a course reversed from Buna's method is accomplished. This invention computes fuel chemistry based on effluent measurements, it assumes that all secondary fuels, unlike Buna, are known having defined chemistries, heating values and As-Fired flows. The reference is: T. Buna, "Combustion Calculations for Multiple Fuels". ASME Diamond Jubilee Annual Meeting, Chicago, Ill., Nov. 13–18, 1955, Paper 55-A-185.

Another related art to the present invention was developed by the Electric Power Research Institute (EPRI) at the Morgantown power plant, a coal-fired conventional system. This technique, termed the "Output/Loss" Method, is described by E. Levy, N. Sarunac, H. G. Grim, R. Leyse and J. Lamont, "Output/Loss: A New Method for Measuring Unit Heat Rate", Am. Society of Mech. Engrs., 87-JPGC-Pwr-39. The Output/Loss Method produces boiler efficiency ($\eta_{boiler}$) independent of fuel flow. Assuming a conventional power plant, by determining the energy flow to the working fluid ($\Sigma m\Delta h$) and gross electrical power production (P), system thermal efficiency may be determined, i.e., ($\eta_{boiler}$) ($\Sigma m\Delta h$). In addition, although it is not the objective of the Output/Loss Method, if heating value and boiler energy credits (HHVP+HBC) are known, then the As-Fired fuel flow ($m_{AF}$) may be determined as $m_{AF} = (\Sigma m\Delta h)/[\eta_{boiler}(HHVP+HBC)]$. Use of boiler energy credits (HBC), and gross power (P) versus net power, are discussed in the Preferred Embodiment. The technique relies on measuring emission gas flow directly, and thus $\eta_{boiler}$. Knowing emission gas flow allows the determination of the majority of the thermal losses associated with combustion, called "Stack Losses". However, this approach has drawbacks when it is applied for practical applications in power plants for the following reasons: 1) it does not rely on measurement of flue gas concentrations (thus changes in the in-flows of water/steam to the combustion process, or changes in effluent $CO_2$, as might reflect changes in fuel chemistry or air pre-heater leakages); 2) the errors in effluent gas flow measurements in irregular ducts not designed for accurate flow measurements, which is the case at most power plant facilities, may easily exceed ±20 percent, resulting in over ±4 percent error in system efficiency since typically stack losses are ≈20 percent (i.e., ±4 percent error in fuel flow); 3) the technique of direct flue gas flow measurements does not consistently meet current U.S. Environmental Protection Agency's accuracy requirements of ±15 percent; 4) it is obvious from the above discussion that if the fuel's heating value (HHV) is variable, as is common with most coal-fired systems, and is not properly monitored in a continuous manner, then calculated fuel flow will also be in error, due to errors made in the assumed heating value; 5) direct measurement of effluent flow commonly involves ultrasonic, sonic or direct gas velocity measurements, requiring assumptions as to effluent compositions, i.e., fuel constituents and air pre-heater leakage, errors in these will force errors in the deduced effluent flow; and 6) if the fuel bears highly variable quantities of ash (a pure dilutive or concentrative influence on fuel heating value, but affects effluent flows through Air/Fuel relationships), then the computed fuel flow, since it is dependent on an assumed heating value with an assumed ash content, will likely be in error.

Another related art to the present invention was presented at a technical conference in 1988 by S. S. Munukutla, et al. In this work the authors develop a process which used effluent measurements to determine the Moisture-As-Free (MAF) composition of coal. Their published work teaches little relative to the art of monitoring thermal performance and the determination of coal chemistry of practical operating power plants. Munukutla, et al., do not consider air pre-heater leakage, but measure combustion effluents before the air pre-heater (at the economizer outlet). They invoke high accuracy effluent measurements afforded with gas chromatography, not common industrial instruments. This basic technique, commonly referred to as Thermal Analysis using in part gas chromatography, is used in laboratories to determine heating values under highly controlled conditions, refer to Chapter 9, "Measurement of Heat of Combustion" contained in *Steam, Its Generation and Use,* 40th Edition, edited by S. C. Stultz and J. B. Kitto, published 1992 by the Babcock & Wilcox Company, Barberton, Ohio. It was also the subject of inventor's earlier U.S. Pat. No. 5,327,356. They do not consider the injection of limestone as is common with fluidized bed combustors, representing the largest single type of steam generator sold outside the U.S. They make no claims for the on-line determination of fuel ash, but assume it is constant based on laboratory analysis. Errors are made in their Equation 3, which if applied to their process would yield ridiculous results. This error is corrected in subsequent works by Munukutla as presented in 1989 and later. The ratio of atmospheric non-$O_2$ (principally $N_2$ and Ar) to $O_2$ is set as a constant in their work at 3.76 (which assumes $O_2$ at 21.0 percent). First, this ratio, commonly found in fundamental thermodynamic text books, is in error; the correct ratio is 3.7737, herein termed $\phi_{Act}$, derived from a value of 20.948 percent atmospheric $O_2$ per NASA (reference U.S. Standard Atmosphere 1976, NOAA-S/T-76-1562-NASA). Not using a correct value results in an error in determining excess air and molar oxygen balances. Second, in approximately 10% of the power plants tested by the inventor, atmospheric $O_2$ may be degraded, resulting in a higher $\phi_{Act}$ value, due to in-leakage of flue gases into the combustion air stream and/or local atmospheric inversions which may result in starving the local environment for oxygen. In the present invention this ratio is expressed as a variable, $\phi_{Act}$, to be set by the user based on circumstances local to the thermal system.

At a systems understanding level, the 1988 approach by Munukutla, et al., is lacking for they compute boiler efficiency only as a final result of the technique using the Input-Output Method (discussed below); see their Equation 10. A computed boiler efficiency incorporated within the technique proper is lacking, thus integral consistency required for, and a feature of, the present invention is not assured using their methods. A most important attribute of the present invention demonstrates an integral relationship between coal constituents and the determination of boiler efficiency, leading to system efficiency; indeed without coal constituents boiler efficiency simply cannot be computed by the present invention. Munukutla, et al., technique determines the total fuel energy flow from system energy flow balances (their FIG. 2 and Equation 4), developing a "fuel energy" term, $Am_{MAF}=Q_{rad}+Q_{steam}$; offering no explanation as to how the term "A" in this expression is related to coal heating value, as one might assume. However, this expression is then used to develop mass flow rates of the coal's constituents, termed $\mu_1$, (in pounds/second). These $\mu_1$ terms are then used in a correlation which develops total fuel energy flow (Btu/hr), thus bypassing a boiler efficiency calculation. Air pre-heater leakage is not considered in their system energy balances. It is noteworthy that this energy balance technique, leading to their Equation 4, is not referenced in later publications on the same subject by the same principal author (in 1989, 1991 and 1995), however the basic stoichiometrics, corrected, are referenced. The reference for this work is S. S. Munukutla, G. Tsatsaronis, Y. Shih, D. E. Anderson and S. M. Wilson, "A Microcomputer Software for On-Line Evaluation of Heat Rate", ASME Power Generation Conference, Philadelphia, Pa., Sep. 25–29, 1988, Paper 88-JPGC/PTC-1.

In three later works, Munukutla and his colleagues attempt to refine the technique. At a 1989 conference, published in 1990, Munukutla and A. Bose again propose using gas chromatography to measure economizer outlet gaseous effluents in determining MAF heating values. The heating value correlation employed, using weight fractions of coal's constituents, was the Mott-Spooner correlation based on Dulong's formula. These are both well known correlations in the industry, however they are not based on chemical binding energies as this invention employs. However in this 1989 work, the correlation was used incorrectly; the correlation was intended for MAF fuel constituents, Munukutla and Bose inconsistently used the wet As-Fired. As witness to the inaccuracy of their work, their calculated MAF heating value reasonably agreed with the As-Fired (wet). In 1991. Munukutla, P. Chodavarapu and D. C. O'Connor published essentially the same work as in 1989, again based on gas chromatography effluent measurements. In their 1991 work fuel water is either measured or determined by difference, assuming the remaining effluents are measured on a wet base. It is obvious from their work that reasonably accurate molecular weights are not used; given the sensitivity of any such approach, such errors amount to ≈1% error (using their numerical examples, the fuel carbon fraction is computed as 0.6616, versus the correct 0.6570 as determined by simply using correct molecular weights. Further, as with the 1988 and 1989 work, no provisions are made for limestone injection. Again the 1991 work used the Mott-Spooner correlation based on Dulong's formula to determine the heating value, $HHV_{MAF}$, but this time the authors used the consistent MAF fuel constituents, later correcting $HHV_{MAF}$ for fuel water and ash. The result was in error with the reported value by 387 ΔBtu/lbm, or 3.1%. Using only their 1991 reported fuel analysis, this invention's methods produced an error of 162 ΔBtu/lbm. They also reported results of 14 tests preformed, resulting in a standard deviation of ±785 ΔBtu/lbm, or ±5.6%. In 1995, Munukutla and F. Khodabakhsh published a similar work as in 1989 and 1991, but this time based effluent measurements on continuous emission monitoring system (CEMS) instrumentation. CEMS instrumentation is required by the US EPA on all stationary sources of pollutants. Effluent measurements include $CO_2$, CO, $O_2$, SO2 and volumetric flow rate. Under US and European regulations these measurements must be made at the boundary of the system, at the air pre-heater's outlet, i.e., the smoke stack, not at the boiler's outlet (i.e., the air pre-heater inlet); refer to FIG. 6. Munukutla and Khodabakhsh applied the same stoichiometrics for this work was used since 1988, applicable for a system without air pre-heater leakage. Given the measurements are made with air leakage present, the method is fundamentally flawed; all effluents emanating from the combustion process are of course diluted with air leakage. However, the system was defined in such a manner that air leakage was factored out when considering a system energy balances. This was done by using the air pre-heater's hot outlet flow to the boiler, per their FIG. 2, not the combustion air inlet to the air pre-heater. The consequence of this is that although fuel flow could be computed correctly, the integral determination of boiler efficiency, as with the 1988 work, is not possible. Further, since the proposed effluent measurements in this 1995 work are inconsistent with its basic analytics, the computed fuel constituents are then seriously flawed. Limestone injection is not considered. Fuel ash is assumed constant. In all of these works, from 1988 through 1995, no mention is made of converting the resultant heating value from a constant volume base to a constant pressure base as required given that laboratory determined coal heating values derive from "bomb calorimeter" devices, a constant volume process. However, a refinement described in their 1995 work suggests an iterative correction of the measured CEMS volumetric flow with that computed through stoichiometrics. The present invention does not employ effluent flow measurements and thus this refinement is not material.

References for the 1989, 1991 and 1995 works by Munukutla and his colleagues include: S. Munukutla and A. Bose, "On-Line Elemental Analysis of Coal Using Gas Chromatography", 1989 EPRI Heat Rate Improvement Conference, May 3–5, Knoxville, Tenn., published 1990); S. Munukutla, P. Chodavarapu and D. C. O'Connor, "On-Line Coal Analysis from Measurement of Flue Gas Components". ASME International Power Generation Conference, San Diego, Calif., Oct. 6–10, 1991, Paper 91 -JPGC-Pwr-17; and S. Munukutla and F. Khodabakhsh, "Enhancement of Boiler Performance Evaluation Methods Using CEMS Data", ASME International Joint Power Generation Conference, Minneapolis, Minn., Oct. 8–12, 1995, PWR-Volume 29, 1995.

Another approach was developed by the present inventor and was described in U.S. Pat. No. 5,367,470. The invention of the '470 patent is noteworthy because it addresses the determination of boiler efficiency without knowledge of fuel flow and without knowledge of effluent flow, but knowing principally effluent $CO_2$, effluent $H_2O$ and routine system data, and it is useful in many situations. However, the Air/Fuel ratio is not required in the method of the '470 patent. A key to the invention of the '470 patent is its requirement to repetitiously adjust, or iterate, on "an assumed water concentration in the fuel until consistency is obtained between the measured $CO_2$ and $H_2O$ effluents and those determined by stoichiometrics based on the chemical concentration of the fuel". Some aspects of the invention are dependent upon high accuracy effluent water and carbon dioxide concentration measurements, or "predetermined accuracies" of these effluents. The present invention has no such limitations on accuracy. The difficulty in the method of the '470 patent lies with the fact that adjusting fuel water, which will of course alter the computed effluent water, has no prima facie effect on a dry-base effluent $CO_2$. It is true, for example, that if fuel water is increased, the relative fraction of the other fuel's constituents, per unity mole of total As-Fired fuel, will decrease assuming that the fuel's other constituents, nitrogen, oxygen, carbon, hydrogen, sulfur and ash, remain proportionally constant to each other. However, it would be unusual that any given fuel water adjustment would produce an exactly consistent effluent $CO_2$, with the exception where the dry chemistry is constant or highly predictable. Further, if the fuel has a variable ash content, ash having a pure dilutive or concentrative influence on fuel chemistry and fuel heating value, then such variable effect could not possibly be determined by merely iterating on fuel water. A higher assumed fuel water may decrease a wet-base effluent $CO_2$, but the actual fuel could contain much lower ash, thus actually increasing the amount of fuel carbon relative to the whole. The approach of simple water iterations of the '470 patent is useful in many situations, such as where the coal fuel bears little and constant ash, and, further, where very high accuracy and consistent effluent $CO_2$ and $H_2O$ measurements are made, but has limitations in other applications.

Yet another approach was developed by the present inventor and was described in U.S. Pat. No. 5,790,420. The invention of the '420 patent is noteworthy as it extends the approach of the '470 patent to include combustion turbine systems. The '420 patent is concerned with methods for improving thermal efficiency, determining effluent flows and determining fuel flow of fossil-fired systems through an understanding of the total energy flow (fuel flow rate x heating value), the As-Fired input to the system. The '420 patent states that method errors will offset: "the sign of the error introduced by the heating value will always have an opposite change in the calculated fuel flow". Errors may be introduced in the '420 patent by the use of its Equations 31 or 32 to compute the dry-base heating value, dependent on knowledge of the dry molar composition of the fuel. These dry compositions may be determined through "use of a correlation relating carbon, hydrogen, oxygen and sulfur contents to a dry-base heating value then correcting for water". Fuel ash is suggested by the '470 patent and the '420 patent as being treated as a constant value. This is the case since the fuel constituents are solely defined per unity moles of dry-base fuel or as an As-Fired (for wet-base) fuel. A dry-base fuel contains ash; a wet-base fuel contains ash and water. If the effects of variable ash were to be addressed, fuel constituents would by necessity initiate from a base free of both ash and water, i.e., so-called "Moisture-Ash-Free"; such a base is not mentioned in either the '470 patent or the '420 patent. The '420 patent explains that the molar quantity of fuel water "is iterated until convergence is achieved", resulting in an As-Fired heating value. Again, as water is altered, the aggregate of all other fuel constituents are altered in opposite fashion to maintain a normalized unity moles of fuel. As with the approach of the '470 patent, the '420 patent requires high accuracy instrumentation, stating "the apparatus necessary for practicing the present invention includes utilization of any measurement device which may determine the effluent concentrations of $H_2O$ and $CO_2$ to high accuracy". The approaches of the '420 patent and the '470 patent, which are rudimentary Input/Loss methods, are dependent on thermodynamically understanding a fossil-fired system without direct measurement of fuel or effluent flows, but there is room for improvement.

Another related art to the present invention involves using fuel water and fuel ash instruments intended for on-line operation. By fuel ash is meant the fuel's non-combustible mineral content, before firing. These instruments employ a variety of techniques. Fuel water instruments include: capacitance techniques, microwave techniques, ultrasonics techniques and IR spectroscopy. Fuel ash instruments include: X-ray backscatter, X-ray fluorescence, gamma-ray backscatter, dual energy gamma-ray transmission, gamma-ray pair production, natural gamma radiation, prompt gamma neutron activation analysis, laser spectroscope, electron spin resonance and nuclear magnetic resonance. Knowing the fuel's water and ash contents can lead to adjustment of the assumed heating value. This provided the fuel's MAF chemistry remains constant. Further, these methods do not involve techniques in which errors made in the fuel ash measurement are off-set by fuel water concentrations. Further, common industrial accuracies are no better than ±5%, thus a ±5% error in fuel heating value. Further, whereas the direct determination of fuel water and ash would aid the present invention as overchecks of its calculated values, such instruments by themselves do not provide an integrated approach to the understanding of thermal systems. Clearly the computation of boiler efficiency, as integrally related to system parameters, is not made by simple use of these instruments.

Another related art to the present invention is Thermal Analysis which employs laboratory techniques of differential thermal analysis (DTA) and differential thermal gravimetrics (DTG), also termed thermogravimetry, combined with gas chromatography or other high accuracy gas analyzer, to determine the elementary analysis and proximate analysis of coal. This technique is intended for a laboratory environment, since it analyzes only gram amounts of coal. Obviously using tons of coal/hour by a thermal system such as a 100 Mwe power plant, developing a representative gram-size sample would present an insurmountable problem. One of the largest companies which supplies such equipment is Mettler Toledo, Hightstowns, N.J. which has been selling such equipment since at least 1980. This basic technique is mentioned in Chapter 9, "Measurement of Heat of Combustion" contained in *Steam, Its Generation and Use*, cited above.

Another approach was developed by the American Society of Mechanical Engineers (ASME) and published as its Power or Performance Test Codes (PTC). Several of these codes discuss two methods which are relevant: the Input-Output Method invoked in PTC 4.1 (Steam Generators), 4.4 (Gas Turbine Heat Recovery Steam Generators), and PTC 22 (Gas Turbines); and the Heat-Loss Method invoked in PTC 4.1 and PTC 4.4. The Input-Output Method relies on the direct measurement of fuel flow. For coal-fired plants or any bulk-fuel systems, this has no applicability for the improvement of thermal efficiency for the above-discussed reasons of inaccuracy in fuel flow measurements. The Heat-Loss Method was intended to address the issue of inaccurate coal flow measurements by determination of unique stack and non-stack losses, thus: $\eta_{system}=1.0-\Sigma$(System Losses). The difficulty with this method, as in the case of the Output/Loss method, lies in the need to make two critical determinations: 1) either measurement of gaseous effluent flow directly or accurately knowing fuel chemistry leading to an effluent-to-fuel flow determination; and 2) when applied to coal-fired systems, measuring effluent ash flow and its associated unburned carbon in the ash. As discussed, the required accuracy is not possible on a consistent basis when measuring effluent flows. Further, the traditional use of the Heat-Loss Method requires an "accurate, simple, and ultimate analysis of the fuel being fired." The difficulty in determining both "bottom" and "fly" ash flows, defined in PTC 4. 1, is evidenced by the fact the procedure is not preformed on any routine basis by any known coal-fired power plant.

In summary, the approaches of the Output/Loss Method, Munukutla and his colleagues, the '470 patent, the '420 patent, fuel water and fuel ash instrumentation, laboratory Thermal Analysis, the Input-Output Method, and the Meat- Loss Method all have significant limitations. The Output/Loss Method and both ASME Methods are flawed conceptually for at least typical large coal-fired systems. None of these methods are applicable for on-line monitoring. The methods of the '470 patent and the '420 patent do not consider: 1) the determination of fuel ash (intrinsically assuming a constant or known relationship between fuel carbon and fuel ash); and 2) the complexities of the non-water constituents, iterating simply on fuel water. That is, the methods of the '470 patent and the '420 patent simply alter fuel water under the assumption that the relationships between the fuel's non-water constituents remain as constants or are predictable through correlations. If the determination of the fuel's constituents is flawed, then the determination of the fuel's heating value is flawed, and thus the fuel flow will be in error. Although as the '470 patent and the '420 patent state, such errors in heating value and fuel flow tend to off-set one another, this is typically true only if the ash is both a relatively small fraction of the total fuel and of essentially constant concentration. As will be seen in relation to the present invention, tolerating such errors voids useful information associated with absolute knowledge of heating value, voids the accurate determination of effluent flow, and voids any computational overcheck of the accuracies of the effluent measurements. None of these methods, except the '470 Patent and the '420 patent, consider multiple fuels which are commonly used in commercial power plants. None of these methods considers the thermodynamic determination of fuel ash. None of these methods considers the use of limestone injected into the combustion process. None of these methods, except the '470 Patent and the '420 patent, consider air pre-heater leakage such that gas concentrations on either side of the air pre-heater are useable in stoichiometric relationships. None of these methods, except the '470 Patent and the '420 patent, consider variable $O_2$ in the combustion air local to the system.

Another approach was developed by the United States Environmental Protection Agency (EPA) as related to the determinations of effluent flow and individual emission rates ($lb_{pollutant}$/million-$Btu_{fuel}$). EPA's approach is described in its regulations, Chapter 40 of the Code of Federal Regulations (40 CFR). Specifics are described in 40 CFR Part 60, Appendix A, Methods 1, 2 and 17 defining various techniques for measuring effluent flows, and in 40 CFR Part 60, Appendix A, Method 19 defining "F Factors" used to determine emission rates. The EPA requires the direct measurement of effluent flow from stationary sources of fossil combustion. The EPA also requires the reporting of emission rates for the major pollutants, determined using the F Factor technique. The EPA's approach has the same shortcomings as discussed for the Output/Loss Method. The EPA approach does not require any inter-relationship between a computed fuel flow, which through stoichiometrics must be consistent with effluent flow. In a work by Lang, et al., reporting actual test results on a large power plant, EPA's Methods 1, 2 and 17 resulted in effluent flows, on average, 12 percent higher than those consistent with system efficiency; this implies a 12% higher fuel flow, a large error in system understanding. Further, all EPA methods produced higher flows relative to those consistent with system efficiency, and none were consistent in themselves. These results are typical of the 12 to 15% bias reported throughout the industry. See F. D. Lang, et al, "Confirmatory Testing of the Emissions Spectral Radiometer/Fuel Flow (ESR/FF) Instrument", Electric Power Research Institute (EPRI) 1994 Heat Rate Improvement Conference, May 3–5, Baltimore, Md. In another study at two large power plants, use of EPA's Method 2 produced 9.8 percent and 18.6 percent higher system heat rates (i.e., system efficiencies) based on measured effluent flows, see R. D. McRanie, et al, "The Electric Power Research Institute Continuous Emissions Monitoring Heat Rate Discrepancy Project, An Update Report—December 1996", available from EPRI, Palo Alto, Calif. Studies by Lang and M. A. Bushey, analyzing 14 power plant test results, indicated that errors in emission rates using the EPA F Factor method could range from −8 percent to +4 percent; and, when studying five dozen coal samples, they found that for 18 percent of the samples the error exceeded 5 percent. See F. D. Lang and M. A. Bushey, "The Role of Valid Emission Rate Methods in Enforcement of the Clean Air Act", EPRI 1994 Heat Rate Improvement Conference, May 3–5, Baltimore, Md.

Another related art to the present invention was developed by Roughton in 1980; see J. E. Roughton, "A Proposed On-Line Efficiency Method for Pulverized-Coal-Fired Boilers", Journal of the Institute of Energy, Vol.20, March 1980, pages 20–24. His work served in part as the basis for the above cited EPA methods, and is related to the Output/Loss Method. Roughton's method produces boiler efficiency ($\eta_{boiler}$) independent of fuel or effluent flows. His work computes boiler efficiency from the process' stack and non-stack thermal losses, evaluated per unity of As-Fired fuel flow. Of these losses, the major loss is the stack loss. Whereas this is directly measured for the Output/Loss Method, Roughton relies on the statistical relationship between dry effluent flow and total As-Fired fuel energy flow assuming a water-free (dried) fuel. He relies on an observed ratio of these two quantities being essentially constant at 0.0008257 $lbm_{effluent}/Btu_{As-Fired\ Fuel}$ (referred to below by the term $L_{fuel}$ and called the "fuel factor"). The method's accuracy is based solely on this value remaining constant. The EPA's F-Factor approach fundamentally relies on this same ratio remaining constant, see the work by Lang and Bushey. It has been found that for a specific fuel, having a certain Rank from a certain geographical region, this ratio is indeed constant; but found not the same for different fuels. Further, it makes no claim as to predicting heating value; indeed Roughton states: "Using this ratio it is possible to obtain the dry stack loss and moisture loss without the need for an ultimate analysis of the coal or for an accurate determination of calorific value" of the As-Fired fuel.

Complete thermodynamic understanding of fossil-fired systems, for the purposes of improving system efficiency and regulatory reporting, requires the determination of fuel mass flow rate, fuel chemistry, fuel heating value, total effluent flow rate, emission rates of the common pollutants, and thermal efficiency of the overall combustion process. All such quantities must be determined with thermodynamic consistency. There is a need for an improved approach to these determinations.

SUMMARY OF THE INVENTION

The approach of the present invention, termed the Input/Loss Method, consistently determines fuel flows, effluent flows, emission rates, fuel chemistry, fuel heating value and thermal efficiency, resulting in improved determinations of the thermal efficiency of any fossil fueled system. The Input/Loss Method has been applied through computer software, installable on a personal computer, and demonstrated being fully operational. This computer and software is termed a Calculational Engine, receiving data from a fossil fueled system's data acquisition devices. The Calculational Engine operates continuously, i.e., in "real time" or "on-line", as long as the fossil fueled system is receiving and burning fuel.

Prior to on-line operation, the Input/Loss Method requires certain initializing data involving reference fuel chemistry and heating value, and reference fuel stoichiometric data associated with the reference fuel chemistry. In addition, those computer programs which will describe the steam generator's air handling equipment and its heat exchangers, or the gas turbine and its heat exchangers and/or the steam turbine cycle, require routine initiating input. If operating for the first time, initial estimates of fuel chemistry and heating value are required, typically the reference values are used. Effluent measurements are required. If off-line, the assumed effluent measurements may be either consistent with the assumed fuel, or take a bias for the study of instrumentation error. Using these data, error analyses are preformed indicating which assumptions will yield minimum errors by exercising the Input/Loss Method as an analytical tool. Two such assumptions are required. The first of these is how the molar fraction of fuel ash, using a Moisture-Ash-Free (MAF) base, $\alpha_{MAF-Ash}$, should be treated: using a constant value of $\alpha_{MAF-Ash}$; or correlating $\alpha_{MAF-Ash}$ as a function of MAF heating value, $HHV_{MAF}$; measuring it directly using a fuel ash meter; or, preferably, determining $\alpha_{MAF-Ash}$ by explicit solution requiring the measurement of the system's wet combustion Air/Fuel mass ratio (a relative measurement routinely made in all fossil fueled systems). In general, this Air/Fuel ratio requires normalization given measurement bias such that stoichiometric consistency is achieved. An alternative to the Air/Fuel ratio is the indicated fuel mass flow rate, also routinely measured in all fossil fueled systems, but requiring normalization (using error analysis procedures of this invention). The second assumption is how the molar fraction of fuel water, using a MAF base, $\alpha_{MAF-water}$, should be influenced by effluent water: using a constant value of the effluent $H_2O$, is preferred; or the effluent stream may be instrumented for the direct measurement of $H_2O$.

When operating in real time and using the initialized data, the Input/Loss Method performs the following sequential steps: 1) obtain measurements of the concentrations of the common pollutants to accuracies common to the electric power industry; 2) obtain measurements of the gross shaft electrical power, mechanical power, and/or the useful energy flow developed from the system; 3) if multiple fossil fuels are used, their properties are combined (e.g., using the FUEL.EXE program) to form a composite fuel, composite higher heating value, and, even if a single fuel, to prepare input for step 4; 4) fuel concentrations and heating value are input to a steam generator or gas turbine computer simulator (e.g., the EX-FOSS.EXE program); 5) obtain measurements of the effluents $O_2$, $CO_2$, $SO_2$, and $H_2O$ if appropriate, and the indicated Air/Fuel ratio (or indicated fuel mass flow) if appropriate, to accuracies common to the electric power industry; 6) the steam generator, or gas turbine, computer simulator is executed producing consistent stoichiometrics given the supplied fuel and input of the measured effluent $O_2$ and common pollutants, including the computed effluents $CO_2$, $SO_2$ and $H_2O$ values, the Air/Fuel ratio, the moles of fuel per 100 moles of dry gaseous effluent (termed x), and at least the following thermal performance parameters: fuel and effluent flows, system thermal efficiencies and emission rates —all consistent with the input fuel's chemistry and heating value; 7) by solution the molar MAF fractions of fuel carbon, water and sulfur are computed as explicit stoichiometric solutions, both dependent principally on the effluents $O_2$, $CO_2$, $SO_2$ and $H_2O$ (which was not done in the '470 patent or the '420 patent); 8) through dependency on the molar MAF fraction of fuel carbon, the molar MAF fractions of fuel nitrogen, oxygen and hydrogen are determined; 9) as optioned in the initialization, the molar MAF fraction of fuel ash is determined, the preference is by explicit solution; 10) the molar MAF fuel species are converted to a molar dry base, then converted to a molar wet base (As-Fired), and finally to wet weight fractions (As-Fired); 11) the higher heating value is computed based on changes to the fuel's MAF constituents, then converted to a dry base, and then to an As-Fired base; 12) the results of the last two steps, fuel chemistry and heating value, are then input to the FUEL.EXE program (or a similar program) of step 3 and the processes repeated until convergences on the fuel moles (x), As-Fired heating value ($HHV_{AF}$), fuel flow and minor stoichiometric terms are achieved; 13) after convergences are achieved, and if errors are within criteria, the procedure is deemed successful, if not instrumentation is identified by the process allowing for both correction and the minimization of errors through application of multidimensional optimization techniques; and finally, 14) after convergences are achieved and error analysis completed, the operation of the system is adjusted to improve its thermal efficiency and/or to minimize the polluting emissions and/or to report effluent flow and emission rates to regulatory authorities. When this process is completed all objectives of this invention will have been met.

The fossil fueled system operator has assurance of complete thermodynamic understanding of the system because of: 1) explicit relationships between measured effluents and the key fuel constituents of carbon, water and ash; 2) an explicit relationship between these and the computed heating value; 3) an explicit relationship between the fuel energy flow (heating value and flow) and the useful energy flow developed from the combustion gases; and 4) an explicit relationship between fuel flow and effluent flow.

The apparatus necessary for practicing the present invention includes any measurement device (or combination of devices) which determines the effluent concentrations of $O_2$ and $CO_2$, and, if appropriate, effluent $H_2O$, CO & $SO_2$ to current standards found in the electric power industry. Further, the system's routinely measured Air/Fuel ratio (or fuel mass flow) is required provided it is consistent, not necessarily accurate (normalization of the signal is provided) if fuel ash is to be determined in real time. Further, routine and common thermal system data, all of which are typically known to thermal system operators, is required such as: effluent gaseous temperature; combustion air psychrometrics; working fluid flows, pressures and temperatures at key heat exchangers, and the like.

It is therefore an important object of the present invention to provide a procedure for determining the energy flow of the input fuel to a fossil fueled system without direct measurement of the fuel flow rate or heating value or fuel chemistry, and in accomplishing this, to assure that system efficiency, and system mass and energy in-flows and out-flows are consistent.

It is a further object of the present invention to provide a quantitative procedure of demonstrating the consistency of the Method's results.

It is a further object of the present invention to provide a means for determining the energy flow of the input fuel of a fossil fueled system by predicting the composition of the input fuel, including its ash content, and with this information predict heating value, and then back-calculate the input fuel flow rate from a classical use of system efficiency.

It is a further object of the present invention to provide a means for determining both the total effluent flow rate (cubic feet/hour or pounds/hour), the emission rates (pounds/million-Btu$_{fuel}$) and flow rates (pounds/hour) of all effluents including the common pollutants produced from a fossil fueled system by determining the fuel flow rate indirectly and having knowledge of the fuel's chemistry and effluent concentrations.

It is a further object of the present invention to provide a procedure for determining the thermal efficiency of a fossil fueled system without directly measuring the input fuel flow rate.

It is a further object of the present invention to provide an intrinsic self-checking procedure of the Method of this invention, computed in real time, in-process, in which the computed and measured effluent $CO_2$, effluent $H_2O$, Air/Fuel ratio and computed fuel factor are compared for consistency, and if errors are within criteria the procedure was deemed successful, or not.

It is a further object of the present invention to provide a procedure to identify which of the effluent $CO_2$, effluent $H_2O$ and Air/Fuel ratio measurements is producing erroneous measurements, such that corrective actions may be taken if appropriate.

It is a further object of the present invention to provide a procedure in which the errors made in predicting the concentration of fuel water will be off-set by fuel ash, though an explicit computation of fuel ash. Thus any error in fuel water, as off-set by fuel ash, will have negligible effect on the As-Fired heating value.

It is a further object of the present invention to provide a means for determining the flow of a fuel's solid non-combustible mineral material (commonly referred to as fuel ash) associated with coal fuel, and thus adjust and improve the operations of the ash removal equipment in a combustion system's effluent stream.

It is a further object of the present invention to demonstrate that all aforementioned objectives associated with a fossil fueled system are also, and herein declared, objectives associated with any fossil fueled system producing electrical power, mechanical power and/or useful energy flow from the system.

It is a further object to provide an approach which yields improved results as compared with EPA Methods 1, 2, 17, and/or 19.

It is a further object to provide an approach which yields improved results as compared with the methods of the ASME Power Test Codes 4.1, 4.4, and/or 22.

Other objects and advantages of the present invention will become apparent when the Method and apparatus of the present invention are considered in conjunction with the accompanying drawings.

BRIEF DESCRIPTION OF THE DRAWINGS

FIGS. 2A and 2B represent a block diagram of the present approach, showing the determination of fuel flow, system efficiency, fuel chemistry, fuel heating value, effluent flow and emission rates; herein collectively referred to as FIG. 2.

FIG. 3 is a plot of Moisture-Ash-Free molar fuel hydrogen versus Moisture-Ash-Free molar fuel carbon using typical coal data.

FIGS. 4A and 4B represent a table of suggested Calculational options associated with this invention allowing for the analysis of any hydrocarbon fuel and coals of various Ranks; herein collectively referred to as FIG. 4.

FIG. 6 is a schematic representation of a conventional or fluidized bed power plant illustrating use of stoichiometric relationships.

DESCRIPTION OF THE PREFERRED EMBODIMENT

Figure 1:
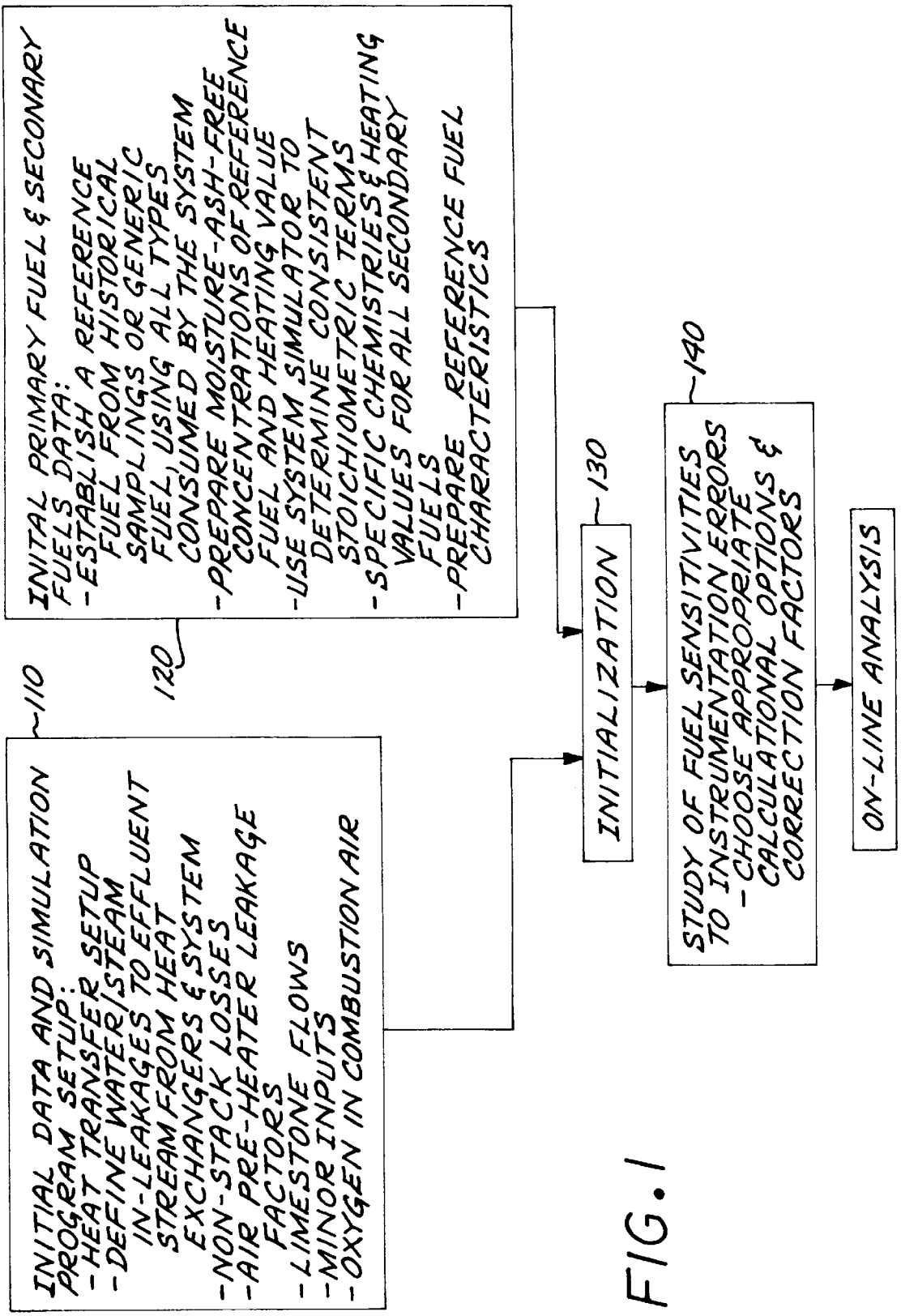
FIG. 1 is a block diagram illustrating the initialization procedures including the study of instrumentation errors.

For clarity, note that FIG. 6 depicts fossil-fired power plant thermal system 20. In this power plant thermal system 20, a fuel feed 22 and combustion air 24 are provided from an upstream side 26 of the heat exchangers/combustion region 28. Note that this region 28 does not include the air pre-heater 36. In addition, in some types of power plant thermal systems 20, other materials may be injected into the heat exchangers/combustion region 28, such as a flow of limestone 31 to minimize effluent $SO_2$ by chemically binding sulfur. The fuel feed 22 contains, in general, combustible material, water and mineral matter (called fuel ash). The fuel ash is an unburnable component that passes through the system with little physical change, but which is heated and cooled.

In the heat exchangers/combustion region 28, the fossil fuel 22 is burned with the combustion air 24 to form hot combustion products. Heat from the combustion products is transferred to a working fluid 30 that flows through heat exchangers 32 that are depicted as integral with the heat exchanger/combustion region 28. The heated working fluid 30a is used in a manner appropriate to a working fluid to generate a useful output 33 (for a conventional power plant such useful output may be supplied to a turbine cycle which could produce electrical). There may be a water leakage 29 into the hot combustion products, not associated with the fuel feed 22 as a result of, for example, soot blowing or tube leaks from the heat exchangers.

After leaving the heat exchangers/combustion region 28 on its downstream side 34, the cooler combustion products commonly flow through ducts 35 which may contain effluent ash removal equipment, passing then to an air pre-heater 36, where a further portion of their heat energy is transferred to an incoming air stream 38, which then becomes the combustion air 24. The total air delivered to 20 is 25. In many cases, a leakage flow 40 of air enters the flow of combustion products from the incoming air flow 25 as it passes through the air pre-heater 36. The further-cooled combustion products leave the air pre-heater 36 and pass to a stack 42 and are then exhausted to the atmosphere.

This general system description is applicable to a wide variety of fossil-fired power plants, such coal-burning power plants, oil-burning power plants, gas-fired power plants, biomass combustors, fluidized bed combustors, a conventional electric power plant, a steam generator, a package boiler, a combustion turbine, and a combustion turbine with a heat recovery boiler combustion turbines. This list is not meant to be exhaustive, however, and is presented to illustrate some of the areas of applicability of the present invention.

It is desirable to quantify the operation of this power plant thermal system 20. If it is characterized quantitatively, then the relationship of variations in the operating parameters to the inputs and outputs of the power plant thermal system 20 may be understood. This understanding, in turn, permits the operation of the power plant thermal system 20 to be optimized for thermal efficiency and pollution minimization.

In this system, some quantities are readily measured, and others cannot be measured on-line, in real time with accuracy sufficient to quantify the operation of the power plant thermal system 20 to the required accuracy. For example, gas concentrations, working fluid flow rates, and temperatures and pressures may be readily measured with good accuracy by conventional sensors located at a defined system boundary 44 and elsewhere such as in the regions 35 and 42. On the other hand, the As-Fired fuel chemistry of the fuel feed 22 cannot be measured accurately in real time if the fuel is coal or other bulk fuel. The present invention uses a modeling analysis to quantify the As-Fired fuel chemistry of the fuel feed 22 and other parameters in a self-consistent manner, which allows the entire power plant thermal system 20 to be quantitatively understood. Once the power plant system is quantitatively understood, its operating parameters may be varied to optimize its thermal performance.

The present invention provides an Input/Loss Method which allows for a complete understanding of fossil fueled combustion systems such as power plants, through application of non-direct but explicit determination of fuel and effluent flows, fuel chemistry, fuel heating value and thermal efficiency, resulting in improved thermal efficiency. In addition the Input/Loss Method of the invention determines the effects of inaccuracies in the Method's primary measurements. This invention was developed primarily for coal-fired systems. However, this invention may also be applied to any fossil fueled combustion process including, but not limited to, gas, oil, bio-mass, slurry fuels, wood, agricultural byproducts such as shells from nuts, trash and refuse.

More particularly, this invention relates to the Input/Loss Method for monitoring the operation of a fossil fueled process by analyzing the composition of combustion effluents $CO_2$, $O_2$, $SO_2$ and, depending on the characteristics of the fuel and combustion process, effluent $H_2O$ and/or the systems' indicated combustion Air to Fuel ratio. Other routine system data are also required such as gaseous effluent temperature. Having computed the thermal efficiency and consistent fuel flow rate, and having computed the fuel's chemical composition, and having computed the fuel's heating value, the plant's effluent flow rate and emission rates may then be determined. Further, this invention allows for the determination of the effects of inconsistencies in the principal measurements of effluent $CO_2$, effluent $H_2O$ and the systems' Air/Fuel ratio (or indicated fuel flow), as such inconsistencies impact the thermal efficiency of the system and its effluent flow rate.

The subject of this invention includes any fossil-fueled system producing a useful and measurable output. Such fossil-fossil systems include, for example, conventional electric power plants; fluidized bed electric power plants; any boiler whose combustion gases cause the increase in energy of a measurable fluid; a combustion turbine producing electrical or mechanical power; and a combustion turbine producing both electrical and/or mechanical power, and whose combustion gases cause the increase in energy of a measurable fluid. Although the traditional working fluid from fossil-fired systems is steam, this invention places no limitations on the nature or quantity of useful output associated with fossil combustion. However, if fuel and effluent flows are to be determined, the invention does require that the working fluid's energy received from the combustion process be measurable. This invention applies to a wide range of systems, from small boilers as might be used for space-heating hotels, to large commercial electric power plants. Working fluid flows, such as steam flow, could typically range from 10,000 pounds/hour (lbm/hr) to 10,000, 000 lbm/hr. Electrical or mechanical power could typically range from 5 Mega-Watts (MW) to 1,500 MW.

System Calculations

The present invention allows for a complete understanding of fossil-fueled combustion systems through explicit determinations of fuel and effluent flows, fuel chemistry, fuel heating value and thermal efficiency through thermodynamics, not through direct measurement of fuel flow, fuel chemistry nor through effluent flow. The approach principally relies on measurements of the effluents from fossil-fueled systems, and other routine system data. Given the nature and choice of such data, it has the potential of high resolution on a continuous basis, but the process only anticipates common industrial accuracy standards of required instrumentation. The data may be input to a computer program for resolution of mass and energy balances associated with the system. Measurements include the concentration of combustion gases exiting the system (i.e., smoke stack), the direct production of power, and the total energy deposition to the working fluid from the hot combustion gases.

The thermal efficiency of a fossil-fueled system, termed system thermal efficiency is defined in the usual manner (i.e., total useful output divided by total inputs):

$$\eta_{system} = \frac{\text{Gross Shaft Power(CT)} + \text{Useful Energy Flow Delivered}}{\text{Fuel Energy Flow} + \text{System Energy Flow Credits}} \quad (1)$$

In Equation (1), "Gross Shaft Power (CT)" refers to direct shaft power developed from the combustion gases as normally associated with a combustion turbine. Such a system may or may not employ a heat recovery steam generator (if it does then the "Useful Energy Flow Delivered" term will be non-zero). For a conventional fossil-fueled power plant the Gross Shaft Power is zero, and the Useful Energy Flow Delivered refers to the energy flow to the working fluid of a turbine cycle (TC). In general the terms Gross Shaft Power (CT) plus Useful Energy Flow Delivered define the thermal system's "useful output". For a conventional power plant or a conventional boiler, it is necessary to separate the power production process, or turbine cycle, from the combustion process. Note that the efficiency of the power production process could be thought of as the efficiency associated with the working fluid's process.

$$\eta_{turbine\text{-}cycle} = \frac{\text{Useful Power Produced(TC)}}{\text{Useful Energy Flow Delivered}} \quad (2)$$

Therefore:

$$\eta_{system} = \eta_{boiler} \eta_{turbine\text{-}cycle} \quad (3)$$

where for a conventional boiler:

$$\eta_{boiler} = \frac{\text{Useful Energy Flow Delivered}}{\text{Fuel Energy Flow} + \text{System Energy Flow Credits}} \quad (4)$$

For a combustion turbine system $\eta_{turbine\text{-}cycle}$ is unity, and the $\eta_{boiler}$ term is identically $\eta_{system}$ as defined by Eq. (1). In all further discussions the term $\eta_{boiler}$ is used in place of $\eta_{system}$ when referring to a combustion turbine system (understanding that the value of $\eta_{turbine\ cycle} \equiv 1.00$), and the "Useful Energy Flow Delivered" of Eq.(4) is replaced with "Gross Shaft Power (CT) +Useful Energy Flow Delivered" of Eq. (1). Further, for convenience of discussion, combustion turbine efficiencies employ a higher heating value;

conversion to a lower heating value base, as commonly used for combustion turbine systems in North America, is a simple conversion that is well known in the art and described in ASME PTC 22. Outside of North America, lower heating values are used for most analyses of fossil fueled systems. Several authors in this field disagree with the use of the term "System Energy Flow Credits"; see the denominator of the efficiency Equation (4). Its use, or not, is not important to this invention; however, its consistent treatment relative to $\eta_{boiler}$ is most important. If energy credits are to be used, which is the Preferred Embodiment, then the term must appear in the boiler efficiency calculation, and also when fuel flow is computed, i.e., Eqs.(19B) and (21). If the term is not used, then only fuel flow and heating value will define fuel energy flow and thus $\eta_{boiler}$.

The evaluation of electrical or mechanical power terms is well known. The Preferred Embodiment uses gross electrical or mechanical power, that is total power derived directly from the combustion gases. However, net power may be used, that is gross power less that power consumed within the system, called "house load". Use of either of these terms is not important to this invention, only that gross or net terms be used consistently. The evaluation of the term Useful Energy Flow Delivered is well known, and involves simply measuring of mass flow rate, and pressures and temperatures of the working fluid. Therefore the evaluation of $\eta_{turbine-cycle}$ is known to those skilled in the art, and may be accomplished with high accuracy and reasonable expense.

It is evident from the above discussion that all principal terms are descriptive of any fossil-fueled system producing useful energy flow and/or power (in any form). The Method of this invention is equally applicable to a combustion turbine as to a conventional boiler producing useful energy flow by heating a working fluid such as steam or liquid water, and to a conventional fossil-fueled power plant consisting of a conventional boiler heating liquid water to create steam for direct usefulness and/or for a steam cycle producing any combination of electrical or mechanical power, defined as useful power from a turbine cycle. The Method of this invention is equally applicable when using higher or lower heating value as a bases for the efficiency definition.

The boiler efficiency of Eq. (4) is helpful for continuous monitoring of thermal performance if the fuel flow and other parameters comprising $\eta_{boiler}$ may be measured accurately. Even if so monitoring, then the directly measured fuel flow, fuel water, fuel ash and/or the resultant boiler efficiency may be compared to the calculated values via procedures herein disclosed. The Method of this invention computes $\eta_{boiler}$, although Eq.(4) (or Eq.(1) for a combustion turbine) is reformulated such that fuel flow is calculationally excluded. After excluding the fuel flow term, three major deficiencies in the knowledge of a fossil-fueled system's thermodynamic process remain, and especially when considering a coal-fired system: 1) the complexities of the combustion process (and if a combustion turbine, the complexities of the compression and expansion of gases); 2) the specification of thermal losses not directly related to the combustion process (but which could affect measured fuel flow); 3) the variability or uncertainty of the heating value; and 4) the variability or uncertainty of the fuel chemistry as it impacts $\eta_{boiler}$ and the heating value.

A computer program EX-FOSS.EXE has been developed to address the first two of these difficulties. It is a commercially available program which has been in use in the power generation industry since 1985 and is available (together with the FUEL.EXE program) from Exergetic Systems, Inc. of San Rafael, Calif. The methodology of the EX-FOSS.EXE program is presented in detail in the '420 patent, see its FIGS. 1A and 1B, and their associated discussion, which figures and discussion are incorporated by reference. The FUEL.EXE program, using both known fuels (e.g., stabilizing gas, oil and/or coals) and the fuel being resolved, performs simple weighting calculations resulting in a composite fuel. FUEL.EXE may accept any number of fuels, each of which is described by its elementary molar or weight fractions. Gaseous components are input by molecular molar or weight fractions. Each descriptive fuel's fractions must sum to unity. These are combined to produce a composite fuel, at the user's option, using a molar or weight base. The individual fuel's heating values are also weighted. This composite is then supplied to EX-FOSS.EXE as required input.

The EX-FOSS methodology separates the definition of boiler efficiency into components which, taken separately, calculationally exclude the first of the aforementioned problem areas. When separated, terms called combustion efficiency, $\eta_C$, and boiler absorption efficiency, $\eta_A$, are developed. Use of $\eta_C$ allows consideration of only input and output terms which may be measured with high accuracy, thus eliminating resolution of combustion's thermodynamic complexities. $\eta_C$, addresses the major loss in a fossil fired system, i.e., stack losses. The use of $\eta_A$ allows for the consideration of only "non-stack" losses, losses which generally have minor impact on system efficiency, thus whose understanding does not require high resolution. The following terms are defined, and typical units are provided for clarity:

$m_{AF}$≡As-Fired Fuel Mass Flow Rate; $lbm_{AF}$/hr.

HHVP≡Higher Heating Value at Constant Pressure; Btu/$lbm_{AF}$.

HBC≡Specific System Energy Credits; Btu/$lbm_{AF}$.

EF≡Fuel Energy Flow (fuel flow×higher heating value at constant pressure); Btu/hr.
 ≡$m_{AF}$HHVP CF≡System Energy Flow Credits (fuel flow×specific energy credits relative to the system); Btu/hr.
 ≡$m_{AF}$HBC HPR≡Enthalpy of the Combustion Products (includes the heat of formation plus $\int C_p dT$ at the effluent boundary); Btu/$lbm_{AF}$.

HRX≡Enthaply of the Reactants (based on the heating value, sensible heating and energy credits); Btu/$lbm_{AF}$.

HSL≡Specific Stack Losses (includes losses directly affecting the energy released during combustion, defined by PTC 4.1: $L_G$, $L_{mF}$, $L_H$, $L_{mA}$, $L_X$, $L_Z$, $L_{CO}$, $L_{UH}$ & $L_{UHC}$; all divided by $m_{AF}$); Btu/$lb_{AF}$.

HNSL≡Specific Non-Stack Losses (boiler or combustion turbine losses whose mechanisms originate from the combustion process or from the hot gases, and interface directly with the environment thus a direct effect on the BBTC term; defined by PTC 4.1 as: $L_\beta$, $L_p$, $L_d$, $L_r$ & $L_{UC}$; defined by PTC 4.4 as: $L_\beta$ & $L_W$; in addition, if appropriate, to the gas turbine's shaft bearing losses, applicable gear losses and other similar frictional losses associated with delivery of useful shaft power directly by combustion gases (all divided by $m_{AF}$); Btu/$lbm_{AF}$.

$$ERC = \text{Energy Released during Combustion; Btu/hr.}$$
$$= EF + CF - \sum(\text{Stack Losses})$$
$$= EF + CF - m_{AF}HSL$$
$$= m_{AF}(HPR - HRX)$$

$$BBTC = \text{Gross Shaft Power(CT, if a combustion turbine)}$$
$$\text{plus Useful Energy Flow Delivered; Btu/hr}$$
$$= ERC - \sum(\text{Non-Stack Losses})$$
$$= ERC - m_{AF}HNSL$$

With these definitions, equivalent ways to express fossil boiler efficiency include the following.

$$\eta_{boiler} = \frac{BBTC}{EF + CF} \quad (5)$$

$$\eta_{boiler} = \frac{ERC - \sum(\text{Non-Stack Losses})}{EF + CF} \quad (6)$$

$$\eta_{boiler} = \frac{(EF + CF) - \sum(\text{Stack Losses}) - \sum(\text{Non-Stack Losses})}{EF + CF} \quad (7)$$

$$\eta_{boiler} = \frac{ERC}{EF + CF}\left\{1.0 - \frac{\sum(\text{Non-Stack Losses})}{ERC}\right\} \quad (8)$$

Eq.(8) suggests that boiler efficiency may be divided into two separate efficiencies: one descriptive of the combustion process per se (called the combustion efficiency), and the other descriptive of certain non-stack losses (called the boiler absorption efficiency).

The combustion efficiency definition is suggested from the Input-Output Method defined in PTC 4.1 or in PTC 4.4: that is, net energy flow produced at the thermodynamic boundary divided by the total energy flow input (fuel energy flow and system energy flow credits). The following develops $\eta_C$ on a unity fuel flow bases:

$$\eta_C = 1.0 - \frac{\sum(\text{Stack Losses})}{EF + CF} \quad (9)$$

$$\eta_C = \frac{(EF + CF) - \sum(\text{Stack Losses})}{EF + CF} \quad (10)$$

$$\eta_C = \frac{ERC}{EF + CF} \quad (11)$$

$$\eta_C = [m_{AF}(HPR - HRX)]/(EF + CF) \quad (12)$$

$$\eta_C = \frac{HPR - HRX}{HHVP + HBC} \quad (13)$$

The boiler absorption efficiency is derived from the Heat-Loss Methods found in the PTC 4.1 and 4.4 although limited to non-stack energy terms. It must be referenced to the Energy Released during Combustion term (ERC) if all losses (on a systems basis) are to be additive when calculating the boiler efficiency, see Eq.(7):

$$\eta_A = 1.0 - \frac{\sum(\text{Non-Stack Losses})}{\eta_C(EF + CF)} \quad (14)$$

The quantity $\eta_C(EF+CF)$ defines the ERC term, see definitions and Eq.(11), thus:

$$\eta_A = 1.0 - m_{AF}HNSL/ERC \quad (15A)$$

$$\eta_A = 1.0 - \frac{HNSL}{HPR - HRX} \quad (15B)$$

The Stack Losses includes the following PTC 4.1 terms relating Stack Losses to total As-Fired fuel flow rate:

$$m_{AF}HSL = L_G + L_{mF} + L_H + L_{mA} + L_X + L_Z + L_{CO} + L_{UH} + L_{UHC} \quad (16)$$

The quantity HNSL includes the following PTC 4.1 terms, PTC 4.4 terms, and terms relating to turbine losses (energy flow losses in delivering gross shaft power):

$$m_{AF}HNSL = L_{\beta-4.1} + L_p + L_d + L_r + L_{UC}L_{\beta-4.4} + L_W + \text{(turbine shaft losses)} \quad (17)$$

The combination of the combustion efficiency and boiler absorption efficiency is equivalent to the classical definition of boiler efficiency as defined by ASME Power Test Codes (e.g., PTC 4.1), British Standards (e.g., BS2885), and others. The following, using direct energy flow terms, again demonstrates the derivation of boiler efficiency, see Eq.(13) and Eq.(15):

$$\eta_{boiler} = \eta_C \eta_A \quad (18)$$

$$\eta_{boiler} = \frac{HPR - HRX}{HHVP + HBC} \cdot [HPR - HRX - HNSL]/(HPR - HRX) \quad (19A)$$

$$\eta_{boiler} = \frac{HPR - HRX - HNSL}{HHVP + HBC} \quad (19B)$$

$$\eta_{boiler} = \frac{BBTC}{m_{AF}(HHVP + HBC)} \quad (20)$$

Eq. (20) may be rearranged to solve for fuel flow rate, provided heating value and BBTC are accurately known. The resolution of fuel flow and heating values are objectives of this invention:

$$m_{AF} = \frac{BBTC}{\eta_{boiler}(HHVP + HBC)} \quad (21)$$

By separating boiler efficiency into combustion and boiler absorption components, the analyst has knowledge as to where degradations are occurring. If combustion efficiency decreases (i.e., stack losses increase), the plant engineer would consider: fuel-air mixing equipment, degradation of hardware directly interfaced with delivery of the combustion air, low heat content in the fuel, improper operation of the fuel's burner mechanism, improper operation of the combustion proper such as the location of the fire-ball, etc.—all sources directly affecting the combustion process (i.e., stack losses). The terms comprising combustion efficiency may be easily reduced to a unit basis of total as-fired fuel, refer to Eq.(13); as such these terms have the potential to be determined with great accuracy. HHVP is the higher heating value; corrected for an assumed constant pressure combustion process, if necessary, using the procedures established in PTC 4.1.

In a similar manner, if the boiler absorption efficiency decreases (non-stack losses increase), consideration should be given to terms affecting this efficiency: radiation & convection losses, gas turbine bearing losses if extracting power directly from the combustion gases, heat exchanger water/steam leaks, heat exchanger effectiveness, etc. The boiler absorption efficiency also has the potential to be determined with high accuracy. Generally this term approaches unity; thus its error is no greater than its compliment (if $\eta_A$=98 percent, one may safely assume a maximum error of ±2 percent). Although $\eta_A$ is dependent (through the term ERC) on $\eta_C$; and a given degradation in $\eta_C$ will effect $\eta_A$, the impact on relative changes is generally small. Also, by an iteration technique, $\eta_A$ may be resolved without a priori knowledge of fuel flow rate. Thus, both $\eta_C$ and $\eta_A$, therefore $\eta_{boiler}$, may be determined independent of fuel flow.

The enthalpy of the products (HPR) may be accurately calculated using methods discussed in the '470 patent. The enthalpy of the reactants (HRX) may be accurately calculated using methods discussed in the '470 patent, provided the energy associated with injected limestone is included, if applicable, using similar techniques.

The Preferred Embodiment employs water and steam properties which are internally consistent within ±0.0008% maximum for enthalpy calculations. They derive from the 1969 work by Keenan, Keyes, Hill and Moore, modified by NASA. Combustion and atmospheric gases have total consistency (zero error) given their explicit solution techniques between heat capacity, enthalpy and entropy; they are based on American Petroleum Institute standards. Moist air psychometrics are consistent within ±0.0010% for common enthalpy calculations. Below 38F., as low humidities are approached, consistency is within ±0.0090%. Heats of Formation are obtained from the world-recognized CODATA standards for thermodynamics.

The above description of system equations and related procedures results in the concept that fuel flow rate may be determined with complete consistency from thermal efficiency. The accuracy of the computed fuel flow is intrinsically dependent on fuel chemistry and heating value, addressed below. The computation of boiler efficiency using any operational and consistent method available is acceptable, provided it is independent of fuel flow such that fuel flow may be back-calculated from the classical definition of thermal efficiency, and thus is thermodynamically consistent with Useful Energy Flow Delivered from the system (and/or shaft power delivered from a combustion turbine). As used by the Input/Loss Method, the determination of boiler efficiency requires only computational consistency, not absolute accuracy. Computationally, boiler efficiency need only produce an accurate fuel flow, consistent with energy flows delivered BBTC (Eq.(5)).

Combustion Equation and Fuel Chemistry

Whatever specific procedures are employed to determine boiler efficiency (or system efficiency for a combustion turbine), this invention is based on a consistent treatment of the combustion equation. Any determination of efficiency is adequate when applied for this invention, provided the terms of the combustion equation are treated in an operational and consistent manner. The following combustion equation is taken from the EX-FOSS computer program for illustration of the preferred procedures. However, another consistent and available method for the determination of efficiency may be found in Chapter 9 of *Steam, Its Generation and Use*, 40th Edition, edited by S. C. Stultz and J. B. Kitto, published by the Babcock & Wilcox Company, Barberton, Ohio. As applied in the present invention, "consistency" is defined by three attributes: 1) use of accurate molecular weights and consistently used thermodynamic properties; 2) use of accurate and correct molar balances, proof of which is demonstrated when such molar balances are used as a bases of system mass flow balances yielding minimum error; and 3) the incorporation of these same molar quantities within the computation of boiler efficiency. This later attribute is most important to the present invention. The concern is not the denominator of the boiler efficiency equation and whether boiler credits are included or not, but rather the equation's numerator. The terms HPR and HRX discussed above, as integrally based on the molar quantities defined below, with HNSL, defined the useful power and/or energy flow delivered by the system per unit of fuel; thus use of these terms demonstrate required consistency. The equality $m_{AF}$(HPR−HRX−HNSL)=BBTC is part of this consistency.

In the present approach, the As-Fired fuel chemistry is first calculated based upon system measurements and the use of a mathematical description or model of the thermal system. All calculated system parameters (e.g., thermal efficiency, total effluent flow, emission rates, fuel flow, heating values and parameters associated with Second Law analysis) are thereafter calculated principally from the As-Fired fuel chemistry, and are therefore necessarily "consistent" with each other. By contrast, in each prior approach the various system parameters are either not calculated at all, or calculated using a variety of calculational techniques and with different input information, with the result that the system parameters typically are inconsistent with each other to some degree.

The preferred stoichiometric equation relating reactants to products is presented as Eq.(29). The nomenclature used in Eq.(29) is unique in that brackets are used for clarity: for example, the expression "$\alpha_2[H_2O]$" means the fuel moles of water, algebraically simply $\alpha_2$; the expression "$d[CO_2]$" means the effluent moles of $CO_2$, algebraically simply "$d$". Note that molecular quantities are used versus atomic for nitrogen, oxygen, and hydrogen; conversion is routine. The quantities comprising the combustion equation are traditionally based on an assumed 100 moles of dry gaseous product. This assumption is useful when measuring stack emissions since the commonly measured concentrations are based on dry molar fractions: if measured on a wet base, such measurements may be converted to a dry base.

$x\{\alpha_0[C_{YR}H_{ZR}$ $]+\alpha_1[N_2]+\alpha_2$ $[H_2O]+\alpha_3[O_2]$ $+\alpha_4[C]+\alpha_5$ $[H_2]+\alpha_6[S]$ $+x_7[CO_2]+\alpha_8$ $[CO]+\alpha_9[H_2S]+\alpha_{10}$ $[ash]\}_{As\text{-}Fired\ Fuel}+b_Z$ $[H_2O]_{In\text{-}Leakage}+\{(1+\beta)(a$ $[O_2]+a\varphi_{Act}[N_2]+b_A$ $[H_2O]\}_{Air}+\{(1+\gamma)b_{PLS}$ $[CaCO_3]\}_{As\text{-}Fired\ PLS}$ $=d[CO_2]+g[O_2]+h[$ $N_2]+j[H_2O]+k[SO_2]$ $+\{e[CO]+f[H_2]+l[$ $SO_3]+m[NO]+p[N_2O]$ $+q[NO_2]+t[C_{YP1}H_{ZP1}]$ $+u[C_{YP2}H_{ZP2}]$ $\}_{Minor\ Components} + \sigma b_{PLS}[$ $CaSO_4 \cdot zH_2O] + \{(1-\sigma$ $+\gamma)b_{PLS}[CaO]$ $\}_{Excess\ PLS} + x\alpha_{10}[ash]$ $+w[C_{Reject}] + v[C_{Refuse}]$ $+\{\beta a[O_2] + \beta a\phi_{Act}$ $[N_2] + \beta b_A[H_2O]$ $\}_{Air\ Leakage}$ (29)

The following is presented to assist in understanding Eq. (29), where all are molar quantities unless otherwise indicated:

x=As-Fired fuel per 100 moles of dry gas product (the solution base).

$\alpha_1$=Fuel constituents per mole of As-Fired fuel (wet-base), $\Sigma\alpha_1$=1.0. $\alpha_1$ are derived from weight fractions as input to FUEL.EXE.

$b_A$=Moisture in entering combustion air, per base.

$b_A \equiv \omega(1.0+\phi_{Act})aN_{Air}/N_{H2O}$, where $\phi$ is specific humidity of the local atmosphere determined from psychrometric measurements.

$\beta b_A$=Moisture entering with air leakage, per base.

$b_Z$=Water/steam in-leakage from the working fluid, per base.

$b_Z \equiv x\ N_{AF}\Sigma[m_{leakage}/(M_{AF}N_{H2O})]$ $b_{PLS}$=Molar fraction of pure limestone [$CaCO_3$] required for zero CaO production, per base.

$b_{PLS}=k_F-k_{Act}$; where $k_F \equiv x(\alpha_6-\alpha_9)/[1.0+(1/k_F)_{input}]$; where the ratio of $SO_3$ to fuel generated $SO_2$, i.e., before reaction with limestone, $(1/k_F)_{input}$, is supplied input. $k_{Act}$ is the measured effluent $SO_2$; without limestone injected, $k_F = k_{Act}$.

$\gamma$=Molar ratio of excess $CaCO_3$ to stoichiometric $CaCO_3$ (e.g., $\gamma$=0.0 if no effluent CaO).

$\gamma=(m_{LS}/m_{AF})x\ N_{AF}/(\xi b_{PLS}N_{CaCO3})-1.0$; where $m_{LS}$ is the system's indicated actual limestone mass flow rate, and $\xi$ is a mass ratio of actual limestone to pure $CaCO_3$ it contains.

z=Moles of $H_2O$ per $CaSO_4$, supplied as input based on periodic laboratory analysis of boiler refuse.

$\sigma$=Kronecker function: unity if $(\alpha_6+\alpha_9)>0.0$, zero if no sulfur is present in the fuel.

$\beta$=Air pre-heater dilution factor, a ratio of air leakage to true combustion air, a molar ratio $\beta \equiv (R_{act}-1.0)/[aR_{Act}(1.0+\phi_{Act})]$.

$R_{Act}$=Ratio of total moles of dry gas from the combustion process before entering the air heater, to the total moles of dry effluent (after leaving the air pre-heater); the air pre-heater leakage factor typically obtained from either the ratio of $CO_2$ or $O_2$ across the air pre-heater.

a=Molar fraction of combustion $O_2$, per base.

$\phi_{Act}$=Ratio of non-oxygen gases (nitrogen and argon) to oxygen in the combustion air local to the system.

$\phi_{Act} \equiv (1.0-A_{act})A_{act}$.

$A_{act}$=Concentration of $O_2$ in the combustion air local to the system.

$n_j$=Molar quantities of dry gas product at the system's boundary for specific compounds: d, e, f, g, h, k, l, m, p, q, t and u. The sum is denoted as $\Sigma n_1$. Dry air gases associated with system leakage ($\beta a$ and $\beta a\phi_{Act}$) are treated separately. p1 $n_{ji}$=Molar quantities of non-gas product at the system's boundary for specific compounds: j, $\sigma b_{PLS}$, $(1-\sigma+\gamma)b_{PLS}$, $x\alpha_{10}$, w and v. The sum is denoted as $\Sigma n_1$. Moisture from air leakage ($\beta b_A$) is treated separately.

$N_j$=Molecular weight of compound or element j, defined by the 1983 IUPAC to six significant figures.

$N_{AF}$=Molecular weight of the As-Fired (wet) fuel.

$AF_{input}$=Ratio of mass flows of combustion air to As-Fired fuel, based on indicated, uncalibrated, plant data, unitless.

$w=(WF_{Rejects})(YR\alpha_0+\alpha_4+\alpha_7-\alpha_8)xHHV_{Reject}/HHV_{AF}$ $v=[(WF_{Bottom-Ash})(Carbon/Bottom-Ash) + (WF_{Fly-Ash})(Carbon/Fly-Ash)]xN_{AF}/N_C$; $WF_1$ are weight fractions.

Resolution of Eq.(29) proceeds by solving for all $n_1$ and $n_n$ quantities. Minor component terms of Eq.(29) are typically resolved either through direct measurement (e.g., for CO), or assumed zero values, or through assumed relationships (e.g., $SO_3$ is a function of an input molar ratio of $SO_3$ to $SO_2$, defined above. All Minor Components typically have only low parts-per-million concentrations thus have little impact, with the possible exception of the terms v & w. The true importance and functionality of Eq.(29) to the Input/Loss Method lies in the fact that consistency of molar balances is needed for successful system understanding as discussed above, for conservation of mass flows, and for resolution of fuel chemistry. For clarity the following major terms are associated with the system's thermodynamics:

Total effluent water=$J=j+b_{A\beta}$

Total effluent oxygen=$G=g+a\beta$

Total effluent=$\Sigma n_1+\Sigma n_n+\beta(a+a\phi_{Act}+b_A)$

Total effluents before the air pre-heater=$R_{Act}\Sigma n_1+R_{Act}\Sigma n_n$.

Total As-Fired pure limestone=$(1+\gamma)b_{PLS}$

Dry combustion air without air pre-heater leakage=$(a+a\phi_{Act})$

Dry air from air pre-heater leakage present in effluent=$\beta(a+a\phi Act)$

Wet combustion air=$(a+a\phi_{Act}+b_A)$

Total wet combustion air and air pre-heater leakage=$(1+\beta)(a+a\phi_{Act}+b_A)$.

Eq.(29) is unique in describing at least three features of critical importance when improving the performance of conventional power plants with the Method of this invention. These include: 1) its ability to address air pre-heater leakage through application of $R_{Act}$ through the dilution term $\beta$; 2) the ability to describe effluent concentrations on either side of the air pre-heater, again through application of $R_{Act}$; 3) its ability to address limestone injection commonly used in fluidized bed combustors; and 4) the use of an explicit $\phi_{Act}$ term allowing for variable $O_2$ concentration in the system's local combustion air. Air pre-heater leakage dilutes all combustion effluents with moist air from the local environment, thus all important effluents $H_2O$, $CO_2$ and $O_2$ used for this invention are altered. Furthermore, many times a power plant's more precise effluent measurements, especially $O_2$, may be found on the air pre-heater's inlet (economizer outlet), and not at the air heater outlet; refer to FIG. 6. Although most environmental regulation requires effluent measurements at the system's boundary, translation between the air heater inlet and outlet measurements is many times essential. Eq.(29) allows for such translation through the $R_{Act}$ term, defined above such that 100 moles of dry gas are computed both at the upstream and downstream locations of the air pre-heater; see "Boiler" of FIG. 6. Thus effluents may be used by the present invention either upstream or downstream of the air pre-heater; refer to the G and J terms defined above, allowing conversion between measurements with and without air leakage. Combustion gas conditions upstream of the air pre-heater and before the exit of the heat exchangers and combustion region, see FIG. 6, would employ terms of $gR_{Act}$ and $jR_{Act}$. Combustion gases downstream of the air pre-heater typically exit the system to the environment, in other words the gaseous effluent boundary of the system. Limestone injected into the combustion process will create additional effluent $CO_2$, and could decrease the effluent $H_2O$ if the sulfate product is matrixed with water, $CaSO_4 \cdot zH_2O$. Of course $CO_2$ and $H_2O$ are two important effluents to the present invention. In addition to the basic stoichiometrics associated with limestone injection, the detail afforded by Eq.(29) allows numerous and obvious determinations of molar and mass ratios. For example the molar ratio of fuel sulfur to limestone's calcium, termed the limestone conversion ratio, important to a fluidized bed operator, is simply $k_F/[(1+\gamma)b_{PLS}]$. The concentration of $O_2$ in the system's combustion air (termed $A_{act}$), leading to the term $\phi_{Act}$, affects all system effluent and combustion air terms.

In summary, the aforementioned technique describes the process of calculating boiler efficiency of both any thermal system and in particular of practical conventional power plants based on effluent measurement data, fuel heating value and several parameters of minor importance. The next stage of the process involves the recognition that a given fuel has an unique chemical composition, thus when burned will yield unique concentrations in its gaseous effluent. The principal gaseous effluents from any fossil combustion process are $N_2$, $CO_2$, $H_2O$, $O_2$ and $SO_2$. $H_2O$, when effluent from combustion, is in its super-heated phase, thus acting as a gas. The source of $N_2$ is principally the air used to bum the fuel and it has little chemical reactiveness, thus its sensitivity to the fuel's chemical composition is not significant. $SO_2$ effluent concentrations are generally in the parts per million, thus its impact has minor importance.

The relative concentrations of carbon, $\alpha_4$, and hydrogen, $\alpha_5$, found in any fossil fuel will have significant impact on the relative concentrations of $CO_2$ and $H_2O$ found in the effluent. In addition, these effluents will be influenced by the following: $O_2$ used to burn the fuel (i.e., the Air/Fuel ratio); fuel water, $\alpha_2$; in-leakage of water; and water in the combustion air. This implies that the molar fractions of $CO_2$, $H_2O$ and $O_2$ present in the effluent (the system's boundary, i.e., its smoke stack or translated from data from the air pre-heater inlet) must be unique relative to the fuel input and supplied combustion air.

The following elementary molar balances may be derived from the combustion Eq.(29). The $\Gamma_k$ expressions are simply convenient groupings of quantities, principally comprising measured effluents (known values) which have the greatest influence on the individual element of interest. Minor fuel terms carried within $\Gamma_k$ expressions are multiplied, initially, by an estimated fuel moles, x. These minor terms are quickly resolved when converging on x. An exception is $\Gamma_{ash}$, discussed below. Given these groupings the $\Gamma_k$ expressions of Eqs.(36) thru (40), with solution of the term "a" as discussed below, may be treated as known quantities. The elementary wet fuel components typically associated with coal are considered unknowns, as are the fuel moles, these include the following: $\alpha_1$, $\alpha_2$, $\alpha_3$, $\alpha_4$, $\alpha_5$, $\alpha_6$, $\alpha_{10}$ and x. Many coal-fired and bio-mass-fired plants use supplementary firing with gaseous fuel such as methane; others mix coals, frequently to adjust composite sulfur content; others mix hydrocarbon fuels such as coal, shredded tires, trash, and the like. The Input/Loss Method may account for all non-coal type hydrocarbon fuels, but they are assumed to have known chemistries with known fuel flows. Mixed fuels (such as multiple coals) are input to the system simulator (e.g., EX-FOSS.EXE) as a composite, combining them by using the FUEL.EXE program, although the resultant computed fuel chemistry, after proper weighting, is assigned to one fuel (e.g., the most variable coal), by assuming the other fuels have fixed or predictable, and known, chemistries. Alternatively, such assignment may be made to a combined subset of fuels.

$$x\alpha_1 = \Gamma_{N2} - a\phi_{Act} \quad (30)$$

$$x(\alpha_2 + \alpha_5) = \Gamma_{H2O} \quad (31)$$

$$x(\alpha_3 \leftrightharpoons \alpha_2/2) = \Gamma_{O2} \quad (32)$$

$$x\alpha_4 = \Gamma_{CO2} \quad (33)$$

$$x\alpha_6 = \Gamma_{SO2} \quad (34)$$

$$x\alpha_{10} \neq -\Gamma_{ash} - x(\alpha_1\alpha_2 + 2\alpha_3 + \alpha_5/2 - 1.0) \quad (35)$$

where:

$$\Gamma_{N2} = 1.0 - (d_{Act} + e_{Act} + f + G_{Act}k_{Act} + 1 + m/2 + q/2 + t + u) - \phi_{Act}(R_{Act} - 1.0)/[R_{Act}(\phi_{Act} + 1.0)] \quad (36)$$

$$\Gamma_{H2O} = (J_{Act} - b_A\beta) + f + ZP_A t/2 + ZP_A u/2 - b_Z - b_A - x(ZR\alpha_0/2 + \alpha_9) + b_{PLS}\sigma z \quad (37)$$

$$\Gamma_{O2} = d_{Act} + e_{Act}/2 + (G_{act} - a\beta) + (J_{act} - b_A\beta)/2 + k_{Act} + 31/2 + m/2 + p/2 + q + 2r - a - b_A/2 - b_Z/2 + (3\sigma - 2 - 2\gamma + \sigma z)b_{PLS}/2 - x(\alpha_7 + \alpha_8/2) \quad (38)$$

$$\Gamma_{CO2} = d_{Act} + e_{Act} + YP_A t + YP_B u + v + w - (1.0 + \gamma)b_{PLS} - x(YR\alpha_0 + \alpha_7 + \alpha_8) \quad (39)$$

$$\Gamma_{SO2} = k_{Act} + 1 + \gamma b_{PLS} - x\alpha_9 \quad (40)$$

$$\Gamma_{ash} = a - (G_{Act} - a\beta) + e_{Act}/2 + w + v - b_{PLS}/2 - 1/2 - m/2 - p/2 - q - 2r + x[\alpha_0(YR - ZR/2) + \alpha_7 + \alpha_8/2 + \alpha_9/2] \quad (41)$$

In these relationships the subscript "Act" means an effluent measurement or assumption (an "actual" value). The term $J_{Act}$ in Eqs.(37) and (38) relating to the moles of effluent $H_2O$ (or $j_{Act}R_{Act}$ referring to air pre-heater inlet conditions), could be input as a constant value or measured, given the option suggested by error analysis. All other values are either evaluated explicitly based on input data, internal models and/or have minor import but carried in the formulations for consistency. Eq.(35) is numerically correct, however if it is reduced by substituting x with $x_{MAF}$, and $\alpha_j$ with $\alpha_{MAF-j}$, see Eqs.(50) and (51), it is seen that Eq.(35) offers a trivial solution for $\alpha_{MAF-10}$; this result illustrates the null effects ash has as a neutral substance, and thus its resolution difficulties.

As a group, these relationships are of critical importance for understanding the Input/Loss Method. If fuel chemistry is to be resolved, thus heating value and thus accurate fuel flow, etc., then stoichiometric relationships generally representing Eqs.(30) to (41) must be resolved. These equations are not unique in their grouping of terms, further reductions and/or complexities are possible. The grouping of terms adopted here is principally the right-side terms of Eq.(29).

For the following discussion, assume that fuel ash has zero concentration. With this assumption, Eqs. (30) through (34) yield five equations with eight unknowns. Unknowns include $\alpha_1$ through $\alpha_6$ the terms "a" and "x". The term "x" is a convenience term and could be divided through changing the base of Eq.(29) to unity moles of fuel, thus eliminating use of terms comprising two unknowns, x and any $\alpha_j$. The requirement $\Sigma_{j=0,\ldots,9}\alpha_j=1.00$, assuming ash is temporally ignored, is again a convenience; again the entire Eq.(29) could be divided through by $\alpha_4$, or $x\alpha_4$, setting a base of unit moles of fuel carbon. Effluent $N_2$ could be resolved by difference assuming 100 moles of gaseous effluent ($CO_2$, $H_2O$, $O_2$, $SO_2$, and minor pollutants are measured or assumed), or $N_2$ could be measured directly. By assuming a constant value for fuel nitrogen, $\alpha_1$, a minor fuel constituent, the unknowns are reduced to five with five equations. However, close examination will quickly indicated that this mathematical system invokes a stiff matrix. If $\alpha_3$, again a minor, fuel constituent, is assumed constant then Eqs.(31) and (32) represent two equations with two unknowns, $\alpha_2$ and $\alpha_5$. Eq.(33) could be solve outright resolving its one unknown $\alpha_4$. These manipulations are discussed to emphasize that algebraic manipulations must address the physical reality of the thermal system as done by the Input/Loss Method. The resolution of fuel carbon and fuel hydrogen, of critical importance in resolving fuel chemistry, should address their intrinsic chemical relationship as a hydrocarbon, and the influence played by the principal effluent measurements, $d_{Act}$, $J_{Act}$ and $G_{Act}$. Invoking such relationships reduces the Method's sensitivity to instrumentation errors. The Preferred Embodiment employs this approach, relying on the belief that coals within a generic category (Rank) and geographical region, have well defined MAF carbon to MAF hydrogen relationships. Further, the fuel mole term, x, is used in the Preferred Embodiment for this single variable appears in all stoichiometric conversions to mass flows (the consistent determination and conservation of which is an object of this invention); and represents a iterative parameter for Eq.(29). Further, the Preferred Embodiment does not require that the minor fuel constituents be assumed constant. Further, as will become apparent, the Preferred Embodiment allows use of multidimensional minimization techniques which addresses instrumentation errors.

Returning to the problem as posed by Eq.(29), including fuel ash, if fuel chemistry is to be resolved then fundamental problems require solution—independent of algebraic manipulations. These problems include the following: 1) for every unknown fuel quantity, $\alpha_j$, there is always, at least, additional unknowns in the combustion air term and the fuel moles, "a" and "x"; and 2) the fuel's solid non-combustible minerals (commonly referred to as "ash") may not be resolved through effluent measurements since it is a neutral non-gaseous substance, the same input of $x\alpha_{10}$ in the fuel appears in the effluent, further, its outlet flow from the system is not possible to measure directly with any reasonable accuracy.

The first of these problems is solved by reducing $\alpha_j$ quantities to a molar MAF bases, eliminating the influence of the two components not chemically involved in the hydrocarbon fuel—water and ash—and then solving for $\alpha_{MAF-j}$ terms algebraically employing correlations of molar MAF fractions of fuel hydrogen, nitrogen and oxygen as a function of carbon. Fuel MAF carbon is resolved explicitly by first solving Eq.(33) for x, converting to a MAF base, subtracting Eq.(32) from Eq.(31) to eliminate the $x_{MAF}\alpha_{MAF-2}$ terms, and into the result substituting Eq.(33)'s solution for $x_{MAF}$, yielding:

$$\alpha_{MAF-4}=-\Gamma_{CO2}(A_5-2A_3)/[\Gamma_{CO2}(B_5-2B_3)-\Gamma_{H2O}+2\Gamma_{O2}] \quad (42)$$

Note that the w & v terms of Eq.(39), related to reject & refuse carbon may be expanded, as functions of $\alpha_{MAF-4}$ (see Eq.(29) notes), if their magnitudes affect the accuracy of $\alpha_{MAF-4}$. Given $\alpha_{MAF-4}$, $x_{MAF}$ is resolved via Eq. (56), based on Eq. (33). In Eq.(42) the constants $A_j$ and $B_j$ are developed from reference fuel data associated with coal samples taken from the actual As-Fired, or obtained from generic specification of the coal Rank:

$$\alpha_{MAF-1}=A_1+B_1\alpha_{MAF-4} \quad (43)$$

$$\alpha_{MAF-3}=A_3+B_3\alpha_{MAF-4} \quad (44)$$

$$\alpha_{MAF-5}=A_5+B_5\alpha_{MAF-4} \quad (45)$$

Fuel MAF sulfur is resolved explicitly by solving Eq.(34):

$$\alpha_{MAF-6}=\Gamma_{SO2}/x_{MAF} \quad (46)$$

Fuel MAF water is resolved explicitly by solving Eq.(31) for x, and substituting into Eq.(32), yielding:

$$\alpha_{MAF-2}=(\alpha_{MAF-3}\Gamma_{H2O}-\alpha_{MAF-5}\Gamma_{O2})/(\Gamma_{O2}-\Gamma_{H2O}/2) \quad (47)$$

Both fuel MAF nitrogen and oxygen concentrations are small, and typically may be fixed as constants, or described by Eqs.(43) and (44). The MAF sulfur concentration may also be computed assuming $\alpha_{MAF-6}=A_6+B_6\alpha_{MAF-4}$, if the effluent $SO_2$ measurement is questionable (or if limestone is injected and its conversion rate is questionable). As a further alternative, either the oxygen or sulfur could be used to assure that $\Sigma_{j=0,1,3,\ldots,9}\alpha_{MAF-j}=1.0$ (assuming $\alpha_{MAF-0}$, $\alpha_{MAF-7}$, $\alpha_{MAF-8}$, $\alpha_{MAF-9}$, or any other secondary fuel has zero or known concentration). The sole criteria in deciding the exact methodology is the reliability and availability of effluent data and its relative impact on MAF fuel terms. For example, nitrogen is a major effluent, however using Eq.(30) to solve for fuel nitrogen, typically a very minor component of the fuel's makeup, would invite even slight errors made in determining effluent $N_2$ (made either by direct measurement or determined by difference suggested in Eq.(36)) to greatly amplify the uncertainty in $\alpha_{MAF-1}$. Indeed, the $\Gamma_{N2}$ term is used to resolve the combustion $O_2$, the term "a" via Eq. (58); wherein the term $x_{MAF}\alpha_{MAF-1}$ is resolved through Eq.(43) such that $\Gamma_{O2}$, which is dependent on "a", may be resolved. Besides carbon, an important term is the fuel MAF hydrogen concentration which must represent a valid functionality with carbon. Experience has shown valid functionality may be easily achieved since the hydrogen:carbon chemical bond is predominate with carbon:carbon; indeed the variability of a specific coal Rank lies not in its base chemistry but rather in its water and ash. FIG. 3 is a sample plot of MAF hydrogen versus MAF carbon for a coal fuel having highly variable As-Fired heating value, water and ash contents. In FIG. 3, both axes are MAF molar fractions per mole of MAF fuel.

To this point in the process, resolution of fuel chemistry has been possible by assuming a Moisture-Ash-Free (MAF) basis. In carrying this out, it is not critical to the invention that carbon be computed as the independent quantity. Hydrogen, or any other MAF fuel element could be considered as the independent variable. For example, if solving for hydrogen first, then $\alpha_{MAF-4}=f(\alpha_{MAF-5})$. However, the preferred procedure is to place independence with carbon, where of course the greatest accuracy and sensitivity may be found in the effluent measurements. $CO_2$ does not exist in the combustion air to any appreciable concentration, it does not leak into the system, it is generated only from combustion and as a major effluent has obvious sensitivity to resolution of $\alpha_{MAF-4}$ of Eq.(42).

The second problem, dealing with ash, requires examination of the total system. The only system effect of fuel ash is as a pure dilutive or concentrative influence on fuel, and of course on the heating value. From a qualitative viewpoint, as fuel ash increases at the expense of carbon (for example), the amount of combustion air required to produce the same effluent $O_2$, given less carbon to combust, will decrease. Given a decreasing heating value (higher ash) increased fuel flow is required to meet the same useful energy flow. Thus an ideal system parameter for such sensitivities, which is routinely measured at fossil-fueled systems, is the Air/Fuel ratio. Generally such sensitivities are reasonable, a 10 percent increase in ash for a common coal will cause a 5 percent decrease in the Air/Fuel ratio, although many system and fuel parameters may affect such sensitivities. The wet, mass base, combustion Air/Fuel ratio (termed AF), as computed by the system simulator is developed as follows:

$$AF=(m_{Air}+m_{Moisture})/m_{AF} \quad (48A)$$

$$AF=(1+\beta)[(a+a\phi_{Act})N_{Air}+b_A N_{H2O}]/(xN_{AF}) \quad (48B)$$

Expanding the term $xN_{AF}$ in Eq.(48B):

$$xN_{AF}=x(\Sigma_{j=0-9}N_j\alpha_j+N_{10}\alpha_{10}) \quad (49)$$

and then employing the following definitions of MAF fuel moles and fuel constituents:

$$x_{MAF}\equiv x/(1.0+\alpha_{MAF-2}+\alpha_{MAF-10}) \quad (50)$$

$$\alpha_{MAF-j}\equiv\alpha_j(1.0+\alpha_{MAF-2}+\alpha_{MAF-10}) \quad (51)$$

allows substitution of Eqs.(50) and (51) into Eq.(49) for x and $\alpha_j$, cancelling the term $(1.0+\alpha_{MAF-2}+\alpha_{MAF-10})$ as intended, and then substituting into Eq. (48B) yields a solvable form:

$$xN_{AF}=x_{MAF}(\Sigma_{j=0-9}N_j\alpha_{MAF-j}+N_{10}\alpha_{MAF-10}) \quad (52)$$

$$AF=(1.0+\beta)[(a+a\phi_{Act})N_{Air}+b_A N_{H2O}]/[x_{MAF}(\Sigma_{j=0-9}N_j\alpha_{MAF-j}+N_{10}\alpha_{MAF-10})] \quad (53)$$

Simplifying Eq.(53) and solving for MAF fuel ash, $\alpha_{MAF-10}$, yields the following results. Note in Eq.(54) that a normalized Air/Fuel ratio is used, normalized to actual plant data, defined by Eq.(57), $x_{MAF}$ is substituted using Eq.(56).

$$\alpha_{MAF-10}=\Gamma_{Ash}\alpha_{MAF-4}/(\Gamma_{CO2}N_{10})-\Sigma_{j=0-9}N_j\alpha_{MAF-j}/N_{10} \quad (54)$$

where:

$$\Gamma_{Ash}\equiv(1.0+\beta)[(a+a\phi_{Act})N_{Air}+b_A N_{H2O}]/AF_{Act} \quad (55)$$

$$x_{MAF}=\Gamma_{CO2}/\alpha_{MAF-4} \quad (56)$$

$$AF_{Act}=AF_{input}(AF_{Ref1}/AF_{Ref2}) \quad (57)$$

$$a=(\Gamma_{N2}-x_{MAF}\alpha_{MAF-1})/\phi_{Act} \quad (58)$$

The variable $AF_{input}$ is the wet Air/Fuel ratio from the system's data collection devices (an unscaled signal); $AF_{Ref1}$ is the wet Air/Fuel ratio consistent with reference fuel chemistry; and $AF_{Ref2}$ is the wet Air/Fuel ratio consistent with reference fuel chemistry but as would be produced from the system's data collection devices (a signal used for scaling). The value of $N_{10}$ in Eq. (54) is input as a constant, or fitted as a function of $\alpha_{MAF-10}$ (thus solving a quadratic equation), or fitted as a function of $HHV_{MAF}$. Note that a system's indicated fuel flow measurement could obviously be used in place of AF, applying similar techniques as demonstrated in determining $\alpha_{MAF-10}$. However, use of AF is preferred since it integrally involves effluent and combustion air terms (through $\Gamma_{CO2}$, $\Gamma_{N2}$ and $\Gamma_{Ash}$), and thus through such dependencies allows error analysis techniques to be operational and practical.

It is noteworthy that the explicit procedure of determining fuel ash, and through use of the term $(1.0+\alpha_{MAF-2}+\alpha_{MAF-10})$ of Eqs.(50) and (51), allows any errors made in fuel water, $\alpha_{MAF-2}$, to be off-set by fuel ash, $\alpha_{MAF-10}$. This must occur since any given quantity $x\alpha_j$ (wet-base) must be equivalent to $x_{MAF}\alpha_{MAF-j}$ (MAF-base); if not, such wet to MAF conversions would numerically cause inconsistencies in the computed Air/Fuel ratio. There may be only one AF—wet-base is the same as MAF. Further, the effect may easily be demonstrated through off-line study.

The selection of specific Calculational options is dependent upon the characteristics of fossil fuels. As an example using coals of various Ranks and other fuels, FIG. 4 illustrates a table of options relating to fuel water, fuel ash and the fuel's typical variability. Note that these options are subject to application of the multidimensional minimization techniques described herein; for example an assumption of constant effluent $H_2O$ may be corrected using error analysis.

Thus all fuel constituents are therefore determined on a MAF bases. Given these values, the wet base fuel molar fractions are determined, the wet base moles of fuel (x), followed by wet base (As-Fired) weight fractions:

$$\alpha_j=\alpha_{MAF-j}/(1.0+\alpha_{MAF-2}+\alpha_{MAF-10}) \quad (59A)$$

$$x=x_{MAF}(1.0+\alpha_{MAF-2}+\alpha_{MAF-10}) \quad (59B)$$

$$WF_j=\alpha_j N_j/(\Sigma\alpha_j N_j) \quad (60)$$

$$WF_{dry-j}=WF_1/(1.0-WF_2) \quad (60B)$$

The present Input/Loss Method has important advantages over the prior techniques discussed in the Background. The following table clarifies differences.

| | Determinations of Fossil Fuel Chemistries | | | |
|---|---|---|---|---|
| Method | Water | Ash | MAF Elements | Comments |
| Input-Output | no | no | no | Chemistry not mentioned. |
| Heat-Loss | no | no | no | Chemistry assumed. |
| Output/Loss | no | no | no | "Approximate" chemistry assumed. |
| Buna | no | no | no | Chemistry assumed. |
| Fuel Water & Ash Meters | yes | yes | no | MAF chemistry assumed known, may adjust MAF heating value. |
| Thermal Analysis | yes | yes | yes | Off-Line, laboratory use with high accuracy gas measurements, with ~gram samples. |
| Munukutla | yes | no | yes | No air leakage, fuel ash is assumed known. |
| Pat. 5367470 | yes | no | no | Water iterated, known dry chemistry relationships. |
| Pat. 5790420 | yes | no | no | Water iterated, known dry chemistry relationships. |
| Input/Loss | yes | yes | yes | Explicit calculation for water, ash and carbon, with error analysis. |

Heating Value Calculations

Variations to a reference heating value may be determined by calculating the differential effects of MAF reference versus actual MAF fuel chemistry. The As-Fired fuel chemistry could be used to produce the MAF or dry. The heating value calculation involves use of a correlation relating oxygen, carbon, hydrogen and sulfur contents to a MAF heating value, correcting for ash to obtain a dry-base heating value, then finally correcting for water to obtain the As-Fired value. The As-Fired value is then corrected for a constant pressure process if appropriate. The preferred correlation is scientifically based on the chemical binding energies between hydrocarbon elements. The correlation is taken from the works of Ghamarian & Cambel, which is based in-part on the well known work of Szargut and Szargut & Stryrylska. The references include: A. Ghamarian & A. B. Cambel, "Energy/Exergy Analysis of Pressurized Fluidized Bed Combustor", Proceedings of the Intersociety Energy Conversion Engineering Conference, Aug. 8–12, 1982, pp. 323–327; A. Ghamarian & A. B. Cambel, "Exergy Analysis of Illinois No. 6 Coal", Energy, Vol. 7, No. 6, 1982, pp. 483–488; J. Szargut, "International Progress in Second Law Analysis", Energy, Vol. 5, 1980, pp. 709–718; and J. Szargut & T. Stryrylska, "Approximate Determination of the Exergy of Fuels", Brennstoff-Warme-kraft, Vol.16, No. 12, December 1964, pp. 589–596. The correlation is accurate to within ±0.7 percent $\Delta HHV_{MAF-Ref}$ deviation for over four dozen short- and long-chained hydrocarbon compounds. For hydrocarbons like coal, demonstrated below, normally having a low oxygen content, the correlation's accuracy is estimated at ±0.5 percent. A similar correlation by the same authors exists for hydrocarbons with high oxygen content. To further reduce these errors, the Input/Loss Method computes a term $\Delta HHV_{MAF-delta}$ based on a reference MAF-base heating value, $HHV_{MAF-Ref}$, and the reference concentrations of oxygen, carbon, hydrogen and sulfur (established during initialization). The term $HHV_{MAF-uncorr}$ is computed via Eq.(62) based on actual MAF concentrations of Eqs.(42) thru (46), or otherwise determined as discussed. Using Eqs.(63), (64) and (65) the on-line As-Fired heating value, $HHV_{AF}$, is resultant. The term $N_{MAF}$ is the molecular weight of the MAF-base fuel (without water and ash).

$$\Delta HHV_{MAF-delta} = HHV_{MAF-Ref}(-178387.18\alpha_{MAF-3} + 183591.92\alpha_{MAF-4} + 78143.68\alpha_{MAF-5} + 127692.00\alpha_{MAF-6})_{Ref} / N_{MAF-Ref} \quad (61)$$

$$HHV_{MAF-uncorr} = (-178387.18\alpha_{MAF-3} + 183591.92\alpha_{MAF-4} + 78143.68\alpha_{MAF-5} + 127692.00\alpha_{MAF-6})_{Actual} / N_{MAF-Actual} \quad (62)$$

$$HHV_{MAF} = HHV_{MAF-uncorr} + \Delta HHV_{MAF-delta} \quad (63)$$

$$HHV_{dry} = HHV_{MAF}(1.0 - WF_{dry-10}) \quad (64)$$

$$HHV_{AF} = HHV_{dry}(1.0 - WF_2) \quad (65)$$

The preferred correlations used to determine heating values for the present invention are based on chemical binding energies. Studies have demonstrated that traditional correlations, such as the Mott-Spooner correlation based on Dulong's formula—well known in the industry—are not adequate. The Preferred Embodiment of the present invention requires at least the coefficients used in determining heating value to fall within certain ranges associated with three principal constituents of coal. Studies have indicated that using the above preferred constants, which fall within the required ranges, reduces the standard deviation of five dozen wildly varying coal analyses from ±228 to ±92 $\Delta$Btu/lbm. The ranges of these coefficients, i.e., multiples the molar fractions $\alpha_j$ in Eqs.(61) and (62), or their equivalent weight fractions (for this presentation of ranges, the symbol $WF_j$ represents percent weight of j), include the following: for carbon molar fraction $174160\alpha_{carbon}/N_{fuel}$ to $184970\alpha_{carbon}/N_{fuel}$, or in weight percent carbon, $145WF_{carbon}$ to $154WF_{carbon}$; for hydrogen molar fraction $77610\alpha_{hydrogen}/N_{fuel}$ to $114910\alpha_{hydrogen}/N_{fuel}$ assuming molecular hydrogen, or in weight percent hydrogen, $385WF_{hydrogen}$ to $570WF_{hydrogen}$; and for oxygen molar fraction—$163190\alpha_{oxygen}/N_{fuel}$ to $-182390\alpha_{oxygen}/N_{fuel}$ assuming molecular oxygen, or in weight percent oxygen, $-51WF_{oxygen}$ to $-57WF_{oxygen}$. These ranges are independent of the fuel base, whether MAF, dry or As-Fired fuel constituents are used.

Thus the As-Fired fuel heating value has been determined. If a correction for a constant pressure process (HHVP) is required to the computed $HHV_{AF}$, this correction may be made using the procedure of PTC 4.1. Iterations of the above system, combustion, thermal efficiency, fuel chemistry and heating value calculations are preformed repeatability converging fuel moles, x, the higher heating value. $HHV_{AF}$, such that total fuel energy flow, As-Fired, is adequate to meet the Useful Energy Flow Delivered, and minor stoichiometric terms to within tight tolerances.

Gross Error Detection and Mass Balances

After convergence, the Input/Loss Method employs the primary measurements $d_{Act}$, $J_{Act}$ and $AF_{Act}$ (used to determine fuel chemistry, thus heating value, etc.) in comparisons to the computed values, $d_{Cal}$, $J_{Cal}$ and $AF_{Cal}$ determined from the system simulator, to deduce inconsistencies in measurements. However, it has been found that such comparisons indicate only gross inconsistencies, and not necessarily those associated with incorrect system parameters such as air pre-heater leakage ($R_{Act}$) or combustion air $O_2$ ($A_{Act}$), and when used in an on-line application were not of value. A more robust and operational error analysis employs multidimensional minimization techniques, discussed below.

It is an important objective of this invention to assure conservation of mass flows. Such conservation, using the terms developed by this invention, interconnecting boiler efficiency, shaft power and useful energy flow and effluents, assures the thermal system operator that consistency of these computations is acceptable. Mass balances are specified in the following table, note that if inlet and outlet mass flows disagree by more than 0.2%, errors are considered significant. Such errors may be associated with computer programming mistakes and, most importantly, inconsistencies in the principle effluent measurements.

Fuel Flow Rate, $m_{AF}$, Eq.(21) = BBTC / [$\eta_{boiler}$(HHVP + HBC)]

Combustion Dry Air Flow Rate = $m_{AF}(1 + \beta)(a + a\phi_{Act})N_{Air}/(xN_{AF})$ Combustion Air Moisture Flow Rate = $m_{AF}(1 + \beta)b_A N_{H2O}/(xN_{AF})$ In-Leakage of Water and Steam = $m_{AF}b_Z N_{H2O}/(xN_{AF})$ Pure Limestone(Ca(CO)$_3$) Flow = $\dfrac{m_{AF}(1 + \gamma)b_{PLS}N_{CaCO3}/(xN_{AF})}{\Sigma INLET\ FLOWS}$ Dry Gas Flow from the Combustion
Region(i.e., Boiler Effluent, assuming 100 mole base) = $m_{AF}100N_{Gas}/(R_{Act}xN_{AF})$ Dry Air Leakage Flow at Boundary = $m_{AF}\beta(a + a\phi_{Act})N_{Air}/(xN_{AF})$ Combustion Moisture plus Air Leakage Moisture at Boundary = $m_{AF}(j + \beta b_A)N_{H2O}/(xN_{AF})$ Reject & Refuse Carbon Flow = $m_{AF}(v + w)N_C/(xN_{AF})$ Calcium Sulfate with Water Flow = $m_{AF}\sigma b_{PLS}N_{CaSO4\cdot zH2O}/(x_{AF}N_{AF})$ Calcium Oxide Flow = $m_{AF}(1 - \sigma + \gamma)b_{PLS}N_{CaO}/(xN_{AF})$ Ash(Bottom, Fly & Dust)Flow = $\dfrac{m_{AF}\alpha_{10}N_{Ash}/N_{AF}}{\Sigma OUTLET\ FLOWS}$ Effluent Calculations By knowing the fuel chemistry and flow rate, and the complete stoichiometric relationships, calculating individual emission flow rates, $m_{species-i}$ (lb/hr), may occur as follows:

$$m_{species-i} = m_{AF}\phi_i N_j/[xN_{AF}] \quad (69)$$

where $\phi_i$ is the molar fraction of an effluent species on a dry-basis. The term $\phi_i$ derives directly from solutions or measurements of the right-hand terms of Eq.(29), for example $\phi_{SO2}$=k. The term x is the moles of fuel per mole of dry gaseous effluent. The emission rate per species, in units of pounds per million Btu of fuel energy input, termed $ER_i$, is given by the following:

$$ER_i = 10^6 m_{species} / (m_{AF} HHV_{AF}) \quad (70A)$$

$$= 10^6 \Phi_i N_i / [x N_{AF} HHV_{AF}] \quad (70B)$$

The emissions rate may be evaluated independently of the As-Fired total fuel flow rate, Eq.(70B). However, the computational accuracy of the fuel flow rate, as determined using the present approach, intrinsically affects the emissions rate through $HHV_{AF}$, x and $N_{AF}$. Further, the process described herein allows the determination of total dry volumetric flow, at standard conditions of gaseous effluent, denoted by VF, as required by environmental regulations. VF is determined by the following (in standard-ft³/hr):

$$VF = \rho_{gas} m_{AF} N_{gas} / [x N_{AF}] \quad (71)$$

where $\rho_{gas}$ and $N_{gas}$ are the standard density and average molecular weight of the effluent dry gas. Of course, to determine the mass flow of all effluents Eq.(69) may be summed.

Minimization of Instrumentation Errors

If the aforementioned error checks exceed an error tolerance, or for routine analysis of instrumentation errors, the Method of this invention may employ multidimensional minimization techniques to adjust measured and/or assumed effluent data ($d_{Act}$ & $J_{Act}$), and measured and/or assumed system data (i.e., $AF_{Act}$, $R_{Act}$, $\phi_{Act}$), resulting in revised fuel constituents. Although in the system of equations of the Preferred Embodiment, the effluent $O_2$ is considered a known and an accurate measurement, having no discernable error, this is not required as will be observed in the following discussion. The assumption of known effluent $O_2$ is supported in practice since industrial $O_2$ instrumentation, commonly employing zirconium oxide technology, is relatively inexpensive. Thus a given thermal system may install numerous $O_2$ instruments, upstream and downstream of the air pre-heater, to achieve a result free of discernable error. Furthermore, the $R_{Act}$ & $\phi_{Act}$ parameters, important components of the combustion equation, may also be determined using $O_2$ sensors.

When using the techniques of the Preferred Embodiment for minimizing error in the air pre-heater leakage factor $R_{Act}$, $O_2$ measurements are required between the heat exchangers/combustion region and the air pre-heater, see FIG. 6, and preferably immediately downstream from any effluent ash removal equipment but before the air pre-heater.

After converging on fuel moles and heating value, with a given effluent $O_2$, the Method of this invention then utilizes certain parameters which are unique to a given fuel to determine instrumentation errors. These parameters include the moisture-ash-free (MAF) heating value, and certain parameters (termed $L_i$) developed from Roughton's work of 1980. Study of large coal data bases has indicated a remarkable consistency in MAF heating value for a given coal of the same Rank and geographical region; for example, a Pennsylvania sub-bituminous coal's $HHV_{MAF}$ per cent deviation was found to be less than 0.02%. Roughton found that the $L_{Fuel}$ parameter was within ±1.0% with 95% confidence for "a wide range of power station coals". This has been generally confirmed, but again confined to individual coal Ranks and regions; variations of ±0.5% for unique coals have been found to be common. The $L_i$ parameters for the total fuel, fuel water and fuel ash are determined in the following manner:

$$L_{Fuel} = [x_{Dry\text{-}theor} N_{Dry\text{-}Fuel} + a_{Dry\text{-}theor}(1+\phi_{Act}) N_{Dry\text{-}Air} - J_{theor} N_{H2O} - x_{MAF\text{-}theor} \alpha_{MAF\text{-}10} N_{Ash}] / (x_{Dry\text{-}theor} N_{Dry\text{-}Fuel} HHV_{Dry}) \quad (72)$$

Note that: $x_{Dry\text{-}theor} N_{Dry\text{-}Fuel} HHV_{Dry} = x_{MAF\text{-}theor} N_{MAF\text{-}Fuel} HHV_{MAF}$.

$$L_{Water} = J_{theor} N_{H2O} / (x_{Dry\text{-}theor} N_{Dry\text{-}Fuel} HHV_{Dry}) \quad (73)$$

$$L_{Ash} = x_{MAF\text{-}theor} \alpha_{MAF\text{-}10} N_{Ash} / (x_{Dry\text{-}theor} N_{Dry\text{-}Fuel} HHV_{Dry}) \quad (74)$$

where $J_{theor}$, $d_{theor}$, $k_{theor}$ and $h_{theor}$ are used to develop these terms as determined directly from the updated fuel chemistry, assuming theoretical combustion. Note that no air pre-heater leakage is assumed for theoretical combustion: R=1.0, β=0.0, thus $J_{theor} = j_{theor}$; and $A_{theor} = 0.20948$.

The preferred procedure then establishes correlations of the $L_i$ parameters as functions of the actual input effluent or system data. For example, the following correlation relates the computed fuel factor $L_{Fuel}$ to effluent $CO_2$:

$$L_{Fuel} = K_{11} + K_{12} d_{Act} + K_{13} d_{Act}^2 \quad (75)$$

Eq.(75) is established by varying $CO_2$ ($d_{Act}$) and calculating $L_{Fuel}$ for three cases, keeping all other effluent parameters constant. Such variation is done automatically so that the reference value, $L_{Ref\text{-}Fuel}$, is encompassed within the correlation's range. $K_{11}$, $K_{12}$ & $K_{13}$ are associated fitting constants. In like manner, correlations are formed for other parameters:

($L_{Water} + L_{Ash}$) versus $J_{Act}$ ($L_{Water} + L_{Ash}$) versus $AF_{Act}$ $L_{Fuel}$ versus air pre-heater leakage factor (the term $R_{Act}$)

$L_{Fuel}$ versus $O_2$ concentration in the combustion air ($A_{Act}$), where $A_{Act} = 1/(1+\phi_{Act})$.

The Input/Loss Method determines all such correlations automatically including their proper ranges. Note that the parameter $L_{Fuel}$ was found to yield best sensitivities to effluent $CO_2$, as opposed to Roughton's evaluation of the same term, $L'_{Fuel}$, which is used for sensitivity with $R_{Act}$ and $A_{Act}$. He defined $L'_{Fuel}$, based on dried fuel, as the mass flow of dry gas produced from theoretical combustion, $x_{Dry\text{-}theor} N_{Dry\text{-}Gas}$, divided by the total energy of the dry fuel, $x_{Dry\text{-}theor} N_{Dry\text{-}Fuel} HHV_{Dry}$. For perfect effluent measurements, without error, this later form and that used in Eq.(72) are of course identical, they represent different sides of the same theoretical combustion equation using dry fuel. Use of $L_{Fuel}$ and $L'_{Fuel}$ was found of importance to uniquely sensitize their respective terms. The Preferred Embodiment of this invention employs the summed parameters ($L_{Water} + L_{Ash}$) as a function of $J_{Act}$ and $AF_{Act}$, individually; versus $L_{Water} = f(J_{Act})$ and $L_{Ash} = f(AF_{Act})$. This summation was found essentially constant for a given fuel, more so than its individual terms. The Preferred Embodiment of this invention also employs, in addition to the $L_i$ parameters, the fuel's MAF heating value. Again, the MAF heating value has obvious import given its constant nature for a given coal, but use of the dry and/or the As-Fired (wet) heating value could be applicable if sample coal was especially prepared for testing purposes leading to correction of instrumentation signals (corrections being applicable to normal operations using fuel with unknown chemistry and heating value).

These terms then form individual error functions, $F_i$, the minimization of their aggregate forms the Objective Function, solved using well known techniques.

$$F_i = [(L_i - L_{Ref-1})/L_{Ref-1}]^2 \cdot [1.0 - \Pi_{n=1,2,3}(HHV_n - HHV_{Ref-n})^2 / HHV_{Ref-n}^2] \quad (76)$$

$$\text{Objective Function} = \Sigma F_i \quad (77)$$

where $L_i$ are computed values based on actual data, $L_{Ref-1}$ are corresponding reference values; and $HHV_n$ are computed heating values, $HHV_{Ref-n}$ are corresponding reference values for MAF, dry and/or the As-Fired (i.e., n=1,2 or 3). With this formulation, the power plant operator has the option of choosing any one or all of the five effluent and system measurements, with up to three types of heating values each. Further, any other relevant effluent and/or system measurement could also be incorporated, such as effluent $O_2$ [$L_{Fuel}=f(g_{Act})$], effluent $SO_2$ [$L_{SO2}=f(k_{Act})$], and/or indicated fuel mass flow [$L_{Ash}=f(m_{AF-signal})$]. It should be noted that this error analysis would not be possible without the EX-FOSS program's ability to compute consistent effluent data based on given inputs of fuel chemistry and system parameters. Measured effluents are not input to EX-FOSS, but only effect computed fuel chemistry. Capitalizing on this, the Method of this invention then forces consistency with fuel chemistry by correcting effluents (and thus chemistry) and system parameters through error analysis. The end result is consistent fuel flow, effluent flows, emission rates, boiler efficiency and system efficiency.

Note that the term "reference fuel characteristics" includes an average or typical fuel chemistry and associated MAF heating value, preferably based on historical data collection of ultimate analyses. The term "elementary" when used herein, referes to a fuel's composition by individual elements (denoted by the term $\alpha$, in Eq.(29)). The values of $L_{Ref-Fuel}$, $L_{ref-Water}$ and $L_{ref-Ash}$ are included as a portion of the reference fuel characteristics, computed using the reference fuel chemistry. Reference fuel characteristics also includes whether the variability of fuel water and fuel ash in the As-Fired condition is predictable, or not. For any given fuel: fuel water may be held constant (including zero); fuel ash may be held constant (including zero); an accurate functionality may be observed for either or both [e.g., $\alpha_{MAF-10}=f(HHV_{MAF})$]; and/or fuel water and/or fuel ash may be treated as unknowns, determined using procedures of this invention. All of these possible variations for the treatment of fuel water and ash are included as a portion of the Method. Reference fuel characteristics also contain reasonability limits of the computed elementary fuel constituents. Reference fuel characteristics also contain fitting constants (e.g., $K_{11}$, $K_{12}$ & $K_{13}$) associated with all correlations relating dependent quantities to system measurements.

It was found that the Preferred Embodiment used for the minimization of the Objective Function is the Conjugate Gradient method, described in the book: W. H. Press, S. A. Teukolsky, W. T. Vettering & B. P. Flannery, *Numerical Recipes in FORTRAN 77, The Art of Scientific Computing*, Cambridge University Press, Cambridge and New York (1992). This technique is sufficiently robust as not to require side constraints such as limiting boundary conditions. It produces effluent and system parameters (e.g., $CO_2$, $H_2O$, R, etc.) which as a set of data represents minimum error, thus correction factors are determined: for the $CO_2$ signal $d_{Corr}/d_{Act}$, for the indicated Air/Fuel ratio $AF_{input}=AF_{Corr}/AF_{Act}$, etc. This technique, as others, require the partial derivatives of Eq.(76), thus: $\partial F_i/\partial d_{Act}$, $\partial F_i/\partial J_{Act}$, $\partial F_i/\partial AF_{Act}$, $\partial F_i/\partial R_{Act}$ and $\partial F_i/\partial A_{Act}$ are computed in a routine manner. Other published techniques are common, such as those described in the book: G. N. Vanderplaats, *Numerical Optimization Techniques for Engineering Design*, McGraw-Hill Book Company, New York (1984). Given the Method's procedure of allowing for effluent and system measurements to be compared to corresponding, but consistently computed values based on updated fuel constituents, common minimization techniques involving constrained searches, could be alternatively applied. These include Sequential Linear Programming, Direction Set using Powell's method, Simplex method, Downhill Simplex method, Simplex method with product form inverse, Quasi-Newton method, and others. Commercial products are also available, such as from Lindo Systems, Inc. of Chicago, Ill.

A further technique applicable to the reduction of instrumentation errors lies with use of neural network technology (NN). NN recognizes patterns in data, which if attributed to certain effects, makes corrections to the causal data. Specifically, data from instrumentation required for the Input/Loss Method could be analyzed for effects on the fuel's computed results (e.g., $F_i$ functions), and corrections then applied such that the computed fuel chemistry yields consistent As-Fired heating values. Given such corrections to instrumentation signals, the established Method would proceed as herein described. Over checks could be established which monitor a systems' fuel energy flow and indicated fuel flow, comparing the computed with the measured. However, this is not preferable given the nature of NN technology as it is more amiable to large data bases, representing processes too complex for explicit thermodynamics. Numerous commercial NN software packages are available; for example from NeuralWare, Pittsburg, Pa.; California Scientific Software, Nevada City, Calif.; or The MathWorks. Inc. Natick. Mass.

An example of using Conjugate Gradient minimization on a system of $F_i$ equations is presented in the following table using actual power plant data, minimizing the errors associated with $d_{Act}$ (and using $HHV_{MAF}$), $J_{Act}$, $AF_{Act}$, $R_{Act}$ (and using $HHV_{Dry}$) and $A_{Act}$.

| Instrument Signal or Assumption | Uncorrected Data | Corrected Data |
|---|---|---|
| Dry stack $CO_2$ | 12.619% | 12.610% |
| Wet stack $H_2O$ | 6.500% | 7.447% |
| Assumed Air/Fuel | 6.980 | 7.065 |
| APH Leakage ($R_{Act}$) | 1.2500 | 1.2517 |
| Assumed $O_2$/Air | 20.9480% | 20.8099% |

As an example of an alternative technique, consider $\Gamma_{k-Cal}$ parameters as affecting fuel carbon, water and ash as suggested by Eqs.(37), (38), (39) and (55), but based on the computed values $d_{Cal}$, $J_{Cal}$ and $AF_{Cal}$. Obviously the deviations between the measured and calculated values of $\alpha_{MAF-k}$ therefore may be determined:

$$F_k = (\alpha_{MAF-k} - \alpha_{MAF/Cal-k})/\alpha_{MAF/Cal-k} \quad (78)$$

Any non-zero value of Eq. (78) may be ultimately attributed to inconsistencies in the effluent and/or system measurements. Therefore a valid fuel composition is the one which minimizes these deviations thus being consistent with both stoichiometry and measurements. This is not preferred since no use is made of the $R_{Act}$ and $A_{Act}$ terms as might affect effluent measurements and/or independent parameters (e.g., $L_{Fuel}$ & $HHV_{MAF}$).

SUMMARY OF THERMODYNAMIC UNDERSTANDING

The present Input/Loss Method provides improved understanding of the thermodynamics of fossil systems, as compared with the prior approaches discussed in the Background. The present Input/Loss approach allows determination of complete As-Fired fuel chemistries, heating values, fuel flow, effluent flow, consistently calculated ash flow, consistently calculated emission rates, and consistently calculated system efficiency. Comparisons to other methods are presented in the following table:

| Method | Complete As-Fired Fuel Chem. | As-Fired Heating Value | Fuel Flow | Calc. Effluent Flow | Calc. Ash Flow | Calc. Emission Rates | System Efficiency |
|---|---|---|---|---|---|---|---|
| Input-Output | NA | PM | PM | NP | NP | NP | yes |
| Heat-Loss | PM | PM | NA | NP | NP | NA | yes |
| Output/Loss | (no) | PM | yes | PM | NP | yes | yes |
| Buna | PM | PM | yes | NA | NA | NA | yes |
| Fuel Water & Ash Meters | (no) | (no) | NA | NA | NA | NA | NA |
| Thermal Analysis | (no) | (no) | NA | NA | NA | NA | NA |
| Munukutla | (no) | (no) | (no) | NA | NA | NA | yes |
| Pat. 5367470 | (no) | (no) | (no) | (no) | NA | yes | yes |
| Pat. 5790420 | (no) | (no) | (no) | (no) | NA | yes | yes |
| Input/Loss | yes | yes | yes | yes | yes | yes | yes |

Notes include:
PM=>Perfect measurement or perfect assumptions made.
NA=>Not Applicable, or not done given original presentation of method.
NP=>Not Possible.
"Calc."=>Calculated with consistency based on non-direct measurement or assumptions.
(no)=>Results are possible but restricted to either known MAF fuel chemistry, and/or known fuel ash, and/or known fuel water; for Munukutla, his method is restricted to constant and perfect assumptions as to fuel ash.

At the practical level of applying the Input/Loss Method at an operating power plant, its use of an air pre-heater leakage factor ($R_{act}$), an air pre-heater dilution factor ($\beta$), and a variable $O_2$/combustion air term ($A_{act}$, thus $\phi_{Act}$), which allow use of effluent measurements on either side of the air pre-heater, coupled with techniques which correct effluent instrumentation through error analysis, assure operational and reliable thermal performance monitoring. Considering that boiler efficiency is formed from fuel constituents (based on measured effluents), that a set of consistent effluents are computed based on these fuel constituents, that the measured effluents are corrected to yield minimum differences with the computed through error analysis, the power plant operator has assurance of consistency. Thus this Method, considering its procedures, defines "self consistency".

When applying the Method of this invention for the improvement of thermal system efficiency the Preferred Embodiment is through an established technique using Fuel Consumption Indices (FCI). FCI are developed from exergy and thermodynamic irreversibility computations of the system's major components and processes based on the Second Law of thermodynamics. These components and processes include in part: the combustion process, combustion gas to working fluid heat exchangers, the turbine cycle, and the process of direct generation of electricity. FCIs are computed by the EX-FOSS computer program. For the purposes of this invention this technique is defined as a "Second Law analysis of the thermal system". The most important inputs to this technique includes specification of As-Fired fuel chemistry, As-Fired fuel mass flow and combustion gas mass flows; which given the consistent approach of the present invention, are fully resolved. Other required inputs include system mass flows including those of the working fluid, system enthalpy flow balances and miscellaneous data. Thus the Method of this invention are uniquely suited to allow the benefits of Second Law analysis of thermal systems to be implemented. The reference for this technique is: F. D. Lang and K. F. Horn, "Fuel Consumption Index for Proper Monitoring of Power Plants", EPRI 1991 Heat Rate Improvement Conference, May 7–9, Scottsdale, Ariz., also available from Exergetic Systems, Inc. of San Rafael, Calif. in its latest version.

SUMMARY OF PROCEDURE

In summary, details of the procedure involves first several initializing procedures, followed by sequential procedures preformed by a computer operating in communication with the systems' data collection devices while it is operating, in real time.

Prior to real time operation, the Input/Loss Method requires certain initializing data involving reference fuel chemistry and heating value, and stoichiometric data associated with the reference fuel chemistry. To supply such data a series of reference fuel chemistries, as ultimate analyses (identifying by weight fractions the individual elements), established from historical laboratory reports is desirable to determine relationships between an independently determined MAF molar carbon fraction $\alpha_{MAF-4}$, and dependent hydrogen, nitrogen, oxygen and sulfur fractions; i.e., $\alpha_{MAF-j}=f(\alpha_{MAF-4})$. In coal fuel, nitrogen, oxygen and sulfur components are small relative to carbon, hydrogen, water and ash, and thus have minor importance to the fuel's heating value. However, the relationship $\alpha_{MAF-5}=f(\alpha_{MAF-4})$ should be established based on actual data. An associated reference higher heating value, consistently established from the same historical laboratory reports acquired for the fuel, is desirable, reduced to a MAF base. However, if no such data are available, then the fuel's minor components of nitrogen, oxygen and/or sulfur may be held constant and/or calculated explicitly if effluent data has the appropriate accuracy, while the relationship $\alpha_{MAF-5}=f(\alpha_{MAF-4})$, and the reference MAF heating value may be established from coal analyses associated with the generic coal type. During the initialization, an error analysis is preferable using sampled data from the system to determine both the interaction of instrumentation errors on effluent $CO_2$, effluent $H_2O$, Air/Fuel ratio, the term $R_{act}$ (and thus air pre-heater leakage), and the term A, and to confirm model selections related to fuel chemistry computations.

FIG. 1 illustrates the initialization processes. Box 110 indicates the initial (and one-time) setups for the indicated items. Box 120 depicts the process of developing a reference fuel, involving all common fuels used by the system. Reference data is input as wet-base weight fractions to a system simulator such as EX-FOSS.EXE, but also reduced to Moisture-Ash-Free (MAF) base for use by Eq. (61). Box 130 represents a simple organization of all initialization data. Box 140 depicts using the same system simulator used when on-line, for off-line sensitivity studies resulting in selection of appropriate calculational options. FIG. 3 presents a typical relationship between MAF molar hydrogen and MAF molar carbon. This particular data is based on wildly varying coal fuel, whose ash varied by ±19 percent about the mean, whose fuel water varied by ±40 percent, and whose heating value typically varied by ±12 percent. All secondary fuels (e.g., coals and/or gas and/or oil fuels) are specified, and assumed to have constant values. FIG. 4 suggests Calculational options associated with various fuels. Each of these options should be confirmed during the initialization process involving error analysis, Box 140 of FIG. 1. With these initialization steps completed, the analysis proceeds to real time, on-line analysis.

As used herein, the term "obtained" or "obtaining" is defined as measuring, calculating, assuming a non-zero value, assuming a zero value, estimating, gathering from a published reference work, gathering from a data base, or any other operational approach.

This paragraph discusses and defines "operating parameters" obtained from a thermal system applicable to this invention. Effluent $CO_2$, $O_2$, $NO_x$, and $SO_2$ measurements are made (at the system's effluent stream or "smoke stack"), or before the air heater (termed the "boiler" side of the air pre-heater, i.e., upstream of the air pre-heater device). $O_2$ measurements are preferred before the air pre-heater. Indicated wet-base combustion Air/Fuel mass ratio and effluent $H_2O$ measurements are required, or assumptions made, depending on the reference fuel characteristics and appropriate error analyses. Measurements comprising the Air/Fuel ratio could be made on a volume base, or a dry-base, then converted. Effluent temperature is measured, that is the average temperature associated with the combustion gases at the boundary of the system (caution must be exercised in measuring non-stratified gas flows). The inlet/outlet ratio of $CO_2$ (preferred), CO, or $O_2$ across the air pre-heater (these could be obtained off-line, based on periodic testing or judgement, but on-line is preferred), is used for the determination of air pre-heater leakage in accordance with ASME PTC 4.3, using the $R_{Act}$ term (and thus β, see notes associated with Eq. (29)). Fuel temperature at an appropriate thermodynamic boundary of the system is obtained. Air psychrometrics are obtained at the boundary of the system (e.g., dry and wet bulb temperatures, or dry bulb and relative humidity). The discharge temperatures of the air as it exits each air heating or cooling device (but before it reacts with the fuel) are required; for example, such devices might include the air pre-heater, forced-draft fan, steam-to-air heater, etc. Measurements are required to determine the total energy flow deposition to the working fluid from the combustion gases. For a power plant, such measurements typically include feedwater flow to the steam generator, feedwater pressure and temperature, steam flow from the steam generator if different than the feedwater flow, steam pressure, steam temperature or quality (or assumed quality), and, if applicable, reheat flows, and reheat inlet and outlet pressures and temperatures. For a conventional power plant, determination of accurate reheat flows generally requires understanding of steam turbine flow distributions (involving shaft seals, feedwater heaters, bypass leakages, attemperation spray flows and the like).

Figure 2A:
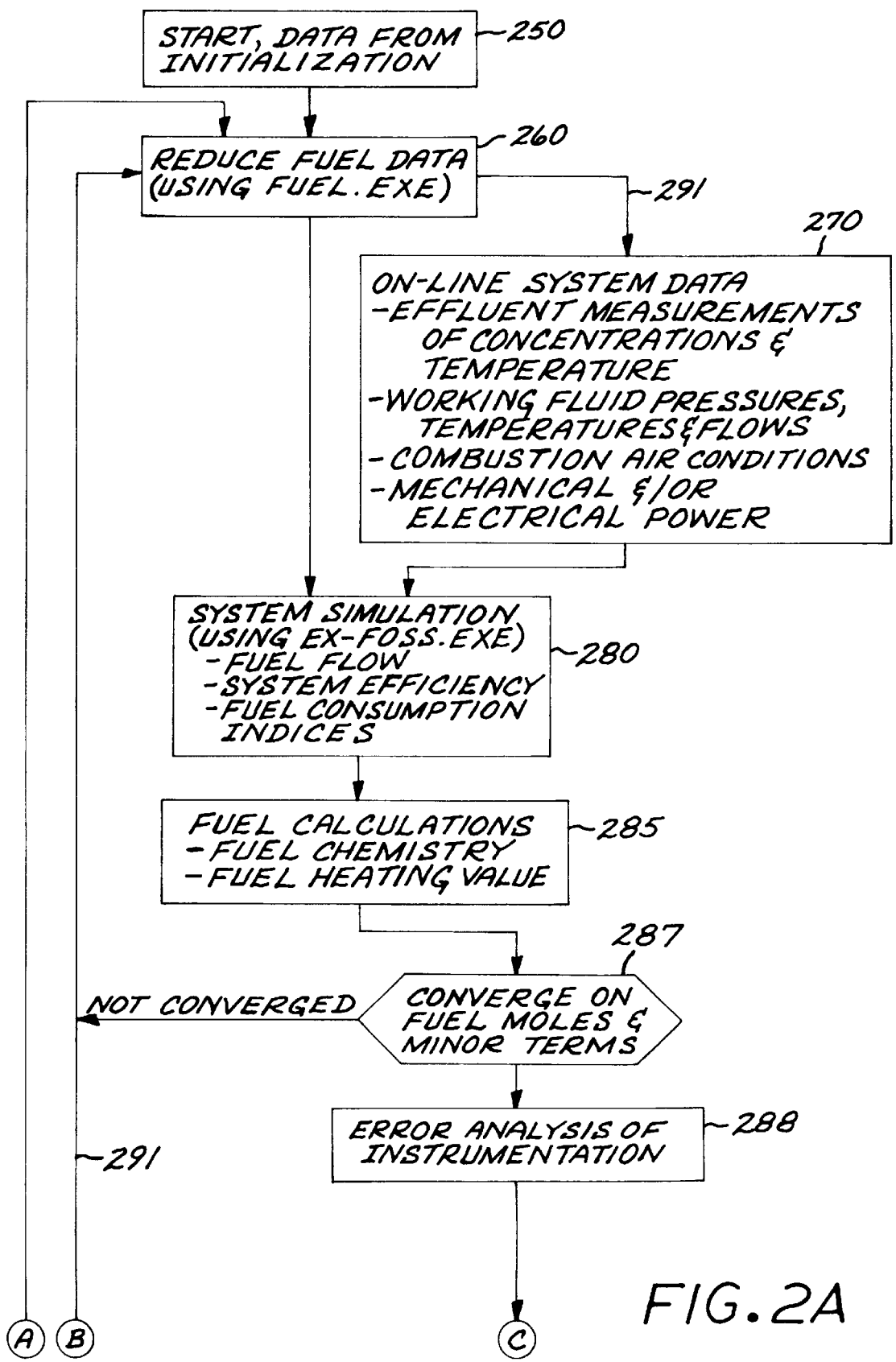

FIG. 2 presents the Calculational sequences associated with the Method when monitoring a fossil-fired system on-line, i.e., in essentially real time. Box 250 represents data passed from the initialization process depicted in FIG. 1. Box 260 reduces fuel data and prepares input for the system simulator. Reduction of fuel data involves combining the newly computed fuel with fuels which have constant chemistries. Box 270 is system data as indicated; other minor data could be updated periodically while on-line. Box 280 is the system simulator which, given specification of a composite fuel, produces fuel flow and system efficiency. Box 285 is the computation of fuel chemistry and fuel heating value for both the composite fuel, and given the fixed compositions of the secondary fuels, the composition of the primary fuel. Box 287 tests for convergence of the process based on the composite fuel moles, heating value, and minor terms. In general, convergences are within $0.5 \times 10^{-4}$ percent for the computed As-Fired fuel moles. Box 288 represents results from the error analysis indicating which instruments require servicing, and numerical minimization of instrumentation errors associated with the input measurements of Box 270 versus those computed from Box 280. 291 represents the transfer of correction factors produced from error analysis for effluent instrumentation and/or data assumptions. Box 290 represents a decision as to whether the correction factors warrant update and subsequent use. Box 292 determines effluent flow and emission rates, refer to Eqs. (69) thru (71) and associated discussion. Box 294 provides the results of the Second Law analysis of the thermal system, other output and reports to system operators such that corrective actions may take place; also, reports are provided to regulatory authorities. Box 296 is a decision to turn the process off (quit) or not. Box 298 is to quit.

Figure 5:
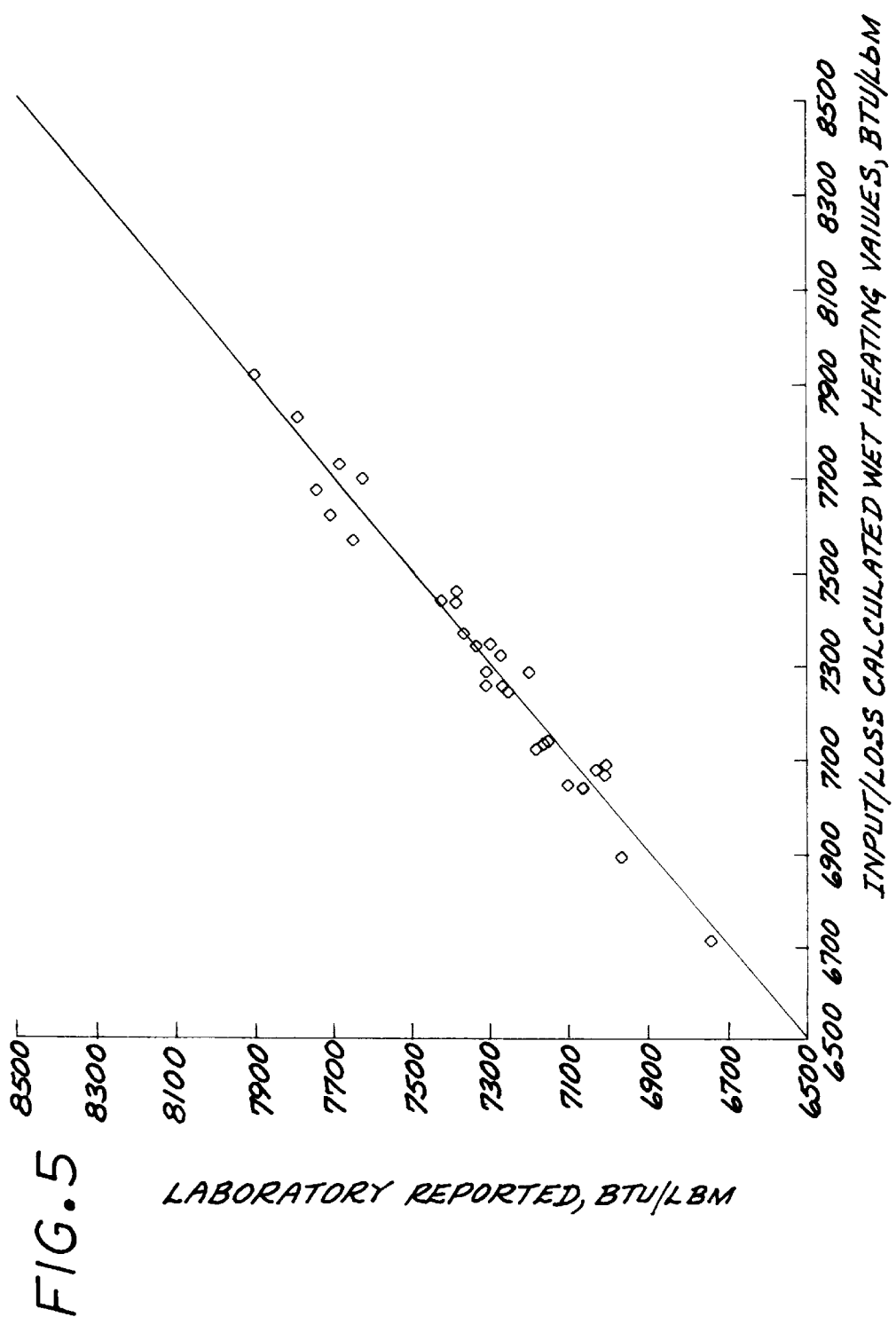
FIG. 5 is an error plot showing laboratory-reported wet heating values versus those computed by the Method of this invention for a coal-fired power plant having wildly varying fuel chemistries and heating values.

FIG. 5 presents a sample of calculational results associated with a power plant burning coal with wildly varying chemistry, as discussed earlier in relation to FIG. 3. This plant routinely uses coal which varies by ±12 percent in heating value. As may be seen in FIG. 5, the analysis produced average errors less than ±0.5 percent in As-Fired heating value, a remarkably good result.

FIG. 6 is a schematic representation of a conventional or fluidized bed power plant illustrating use of stoichiometric relationships important in applying this invention to practical power plants. It should be studied in conjunction with Eq. (29) and its associated discussion. Specific discussion of FIG. 6 is presented earlier. Limestone injection is shown in FIG. 6 which is commonly used in fluidized bed power plants.

In summary, by mass and energy balances based on unity fuel flow rate, by using accurate molecular weights, by using accurate thermodynamic properties of water, steam and combustion gases, by knowing the gross electrical and/or mechanical power produced from the combustion gases directly or indirectly, by knowing the net energy flow supplied to the working fluid, and by recognizing the integral relationship of effluent $CO_2$, $H_2O$, $SO_2$, $O_2$, Air/Fuel ratio, air pre-heater leakage and $O_2$ concentration in the local combustion air—to their fuel constituents, revised fuel chemistry may be computed, the heating value based on the revised fuel chemistry may be computed, and fuel flow to the system may be computed. Knowing fuel flow and heating value allows determination of effluent flows and emission rates. Knowing fuel flow, heating value and fuel chemistry allows routine tracking of a fossil-fired plants' overall thermal efficiency, thus continuous correction of problems impacting thermal efficiency is possible.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for quantifying the operation of a fossil-fueled thermal system having a heat exchangers/combustion region producing combustion products, the method comprising the steps of:

before on-line operation, the steps of
obtaining reference fuel characteristics, and
developing explicit mathematical models of the combustion process involving at least stoichiometric balances; and thereafter operating on-line, the step of operating on-line including the steps of measuring a set of measurable operating parameters, including at least effluent concentrations of $O_2$ and $CO_2$, these measurements being made at a location downstream of the heat exchangers/combustion region of the thermal system, obtaining an effluent concentration of $H_2O$, if reference fuel characteristics indicate fuel water is not predictable, as an obtained effluent $H_2O$, obtaining an indicated Air/Fuel ratio, if reference fuel characteristics indicate fuel ash is not predictable, as an obtained Air/Fuel ratio, obtaining an ambient concentration of $O_2$, obtaining an air pre-heater leakage factor, and calculating a complete As-Fired fuel chemistry, including fuel water and fuel ash, as a function of the reference fuel characteristics, explicit mathematical models of the combustion process, the set of measurable operating parameters, the obtained effluent $H_2O$, the obtained Air/Fuel ratio, the ambient concentration of $O_2$, and the air pre-heater leakage factor.

2. The method of claim 1, wherein the step of operating on-line includes the additional step after calculating the complete As-Fired fuel chemistry, of calculating consistent moisture-ash-free, dry and As-Fired fuel heating values as a function of the complete As-Fired fuel chemistry and the reference fuel characteristics.

3. The method of claim 2, including, after the step of calculating consistent moisture-ash-free, dry and As-Fired heating values, the additional steps of obtaining fuel factors associated with the As-Fired fuel chemistry, updating the reference fuel characteristics based on the calculated As-Fired fuel chemistry and its sensitivities to fuel characteristics, completing a multidimensional minimization analysis employing fuel factors and heating values to minimize the collective error associated with at least one of the measured effluent $CO_2$, the obtained effluent $H_2O$, the indicated Air/Fuel ratio, the ambient concentration of $O_2$ and the air pre-heater leakage factor, calculating and applying for subsequent on-line analysis correction factors to the measured effluent $CO_2$, obtained effluent $H_2O$, the indicated Air/Fuel ratio, the ambient concentration of $O_2$, and the air pre-heater leakage factor.

4. The method of claim 2, wherein the set of measurable operating parameters includes effluent temperature, and wherein the method includes an additional step, after the step of calculating consistent As-Fired fuel heating value, of calculating a consistent boiler efficiency as a function of the complete As-Fired fuel chemistry, effluent temperature, effluent concentrations, and heating value.

5. The method of claim 4, wherein the step of operating on-line includes an additional step of measuring the useful output derived directly from the combustion products, and the step of measuring a set of measurable operating parameters includes the step of measuring a useful power and energy flow produced from a working fluid heated by combustion products, determining an efficiency associated with the working fluid's process, and further including an additional step, after the step of calculating a consistent boiler efficiency, of calculating a system thermal efficiency as a function of the efficiency associated with the working fluid's process and the consistent boiler efficiency.

6. The method of claim 4, wherein the step of operating on-line includes an additional step of measuring a useful output derived directly from the combustion products, and including an additional step, after the step of calculating the complete As-Fired fuel chemistry, of calculating a consistent heating value as a function of the complete As-Fired fuel chemistry, and including an additional step, after the step of calculating a consistent heating value, of calculating a consistent As-Fired fuel flow rate as a function of the consistent boiler efficiency, the useful output, and the As-Fired heating value.

7. The method of claim 6, including an additional step, after the step of calculating a consistent As-Fired fuel flow rate and boiler efficiency, of calculating a consistent total effluent flow rate as a function of the consistent As-Fired fuel flow rate.

8. The method of claim 7, including an additional step, after the step of calculating a consistent total effluent flow rate, of obtaining a set of effluent concentrations including at least $SO_2$ and $NO_x$, calculating individual effluent flow rates as functions of the total effluent flow rate and effluent concentrations.

9. The method of claim 8, including an additional step, after the step of calculating individual effluent flow rates, of calculating consistent individual emission rates as a function of the individual effluent flow rates, consistent As-Fired fuel flow rate, and consistent As-Fired heating value.

10. The method of claim 8, including an additional step, after the step of calculating consistent individual effluent flow rates and those quantities on which they are consistency based, of calculating a Second Law analysis of the thermal system and Fuel Consumption Indices.

11. The method of claim 10, including an additional step, after the step of calculating Fuel Consumption Indices, of adjusting operation of the system to improve its efficiency based upon the results.

12. The method of claim 1, wherein the thermal system comprises a thermal system selected from the group consisting of a coal-burning power plants, oil-burning power plants, gas-fired power plants, biomass combustors, fluidized bed combustors, a conventional electric power plant, a steam generator, a package boiler, a combustion turbine, and a combustion turbine with a heat recovery boiler.

13. The method of claim 1, wherein the step of calculating the complete As-Fired fuel chemistry includes the step of calculating explicitly a complete As-Fired fuel chemistry, including fuel water and fuel ash, as a function of the reference fuel characteristics, explicit mathematical models of the combustion process, the set of measurable operating parameters, the obtained effluent $H_2O$, the obtained Air/Fuel ratio, the concentration of $O_2$ in the ambient air entering the thermal system, and the air pre-heater leakage factor.

14. The method of claim 1, wherein the step of obtaining the indicated Air/Fuel ratio, if reference fuel characteristics indicate fuel ash is not predictable, as the obtained Air/Fuel ratio, includes the step of obtaining a normalized Air/Fuel ratio, if reference fuel characteristics indicate fuel ash is not predictable, as an obtained Air/Fuel ratio.

15. The method of claim 1, wherein the step of obtaining the ambient concentration of $O_2$ includes the step of using a value of 20.948 percent for the ambient concentration of $O_2$.

16. The method of claim 1, wherein the step of obtaining the ambient concentration of $O_2$ includes the step of using an average value at sea level determined by the National Aeronautics and Space Administration for the ambient concentration of $O_2$.

17. The method of claim 1, wherein the step of obtaining the air pre-heater leakage factor includes the step of using a value of unity for the air pre-heater leakage factor.

18. A method for quantifying the operation of a fossil-fueled thermal system having a heat exchangers/combustion region wherein a fuel flow produces combustion products, the method comprising the steps of:

operating on-line, the step of operating on-line including the steps of obtaining an As-Fired fuel chemistry including at least one fuel constituent selected from the group consisting of weight percent carbon, weight percent hydrogen, and weight percent oxygen of the fuel; and calculating a heating value of the fuel in Btu per pound of fuel, the step of calculating including a step of forming products of numerical coefficients times the weight percent of the fuel constituent, wherein at least one of the numerical coefficients is selected from the group consisting of from 145 to 154 for weight percent carbon, from 385 to 570 for weight percent hydrogen, and from −51 to −57 for weight percent oxygen, and combinations thereof.

19. A method for quantifying the operation of a fossil-fueled fluidized bed thermal system producing combustion products, the method comprising the steps of:

before on-line operation, the steps of
obtaining reference fuel characteristics, and
developing explicit mathematical models of the combustion process involving at least stoichiometric balances; and thereafter operating on-line, the step of operating on-line including the steps of measuring the measurable operating parameters, including at least
an effluent temperature, and
the concentration of effluent $O_2$, $CO_2$, and $SO_2$, at a location downstream of a heat exchangers/combustion region of the fluidized bed thermal system;

measuring an indicated limestone flow rate;

measuring a useful output derived directly from the combustion products, calculating a complete As-Fired fuel chemistry, wherein the complete As-Fired fuel chemistry includes the elementary constituents, fuel water, and fuel ash of the fuel, and determining the Energy Released during Combustion based on explicit mathematical models of the combustion process and the complete As-Fired fuel chemistry, determining a consistent fuel flow, a consistent effluent flow, and a consistently calculated system efficiency, as a function of the measurable operating parameters, the indicated limestone flow rate, the useful output, and the complete As-Fired fuel chemistry.

20. The method of claim 19, including an additional step, after the step of determining a consistent fuel flow, of determining a consistent effluent flow, and reporting the consistent effluent flow.

21. The method of claim 19, including an additional step, after the step of determining a consistent fuel flow, of calculating an effluent ash flow, and reporting the effluent ash flow.

22. The method of claim 19, including an additional step, after the step of determining a consistent fuel flow, of calculating an set of emission rates, and reporting the set of emission rates.

23. The method of claim 19, including an additional step, after the step of determining an Energy Released during Combustion, of reporting to the operator of the fossil-fueled fluidized bed thermal system the Energy Released during Combustion.

24. A method for quantifying the operation of a fossil-fueled thermal system in which a fossil fuel is supplied at a flow rate to a heat exchangers/combustion region and combusted to produce hot combustion gases, which heats a working fluid and/or produces shaft power then exits through an exhaust stack, the method comprising the following steps:

performing an off-line operation comprising the steps of
obtaining reference fuel characteristics,
obtaining reference fuel stoichiometric data,
obtaining current measurements of the system's operating parameters, and performing an on-line operation comprising the steps of
measuring the useful output of the system,
obtaining fuel data and characteristics, the step of obtaining fuel data including the step of obtaining composite fuel concentrations and composite heating value, if multiple fuels are used, introducing fuel concentrations and heating values to a mathematical model of the thermal system, obtaining routine systems operational parameters, obtaining values of the effluents $O_2$, $CO_2$, CO, $H_2O$, $SO_2$ and $NO_x$, obtaining the ambient concentration of $O_2$, obtaining air pre-heater leakage and dilution factors, obtaining an indicated Air/Fuel ratio, computing molar moisture-ash-free fractions of fuel carbon, fuel water and fuel ash as explicit stoichiometric solutions, dependent at least in part on the effluents $O_2$, $CO_2$, $SO_2$, $H_2O$, Air/Fuel ratio, air pre-heater factors and ambient concentration of $O_2$, finding the molar moisture-ash-free fractions of fuel nitrogen, oxygen, hydrogen, and sulfur, converting the molar moisture-ash-free fuel concentrations to a molar dry base, then to a molar As-Fired wet base, and finally to As-Fired wet weight fractions, to obtain a complete and consistent computed As-Fired fuel chemistry, computing a heating value based on a moisture-ash-free weight base, then converted to a dry base, and then to a weight-based As-Fired heating value, and executing the mathematical model of the thermal system using the fuel information and the concentration of effluent $O_2$ to produce consistent stoichiometric values of effluent $CO_2$, $SO_2$ and $H_2O$ values, the Air/Fuel ratio, the moles of fuel per basis moles of dry gaseous effluent, and at least the following self-consistent thermal performance parameters: As-Fired fuel flow, effluent flow, emission rates, boiler efficiency, and over-all system thermal efficiency.

25. The method of claim 24, including an additional step, after the step of executing, of performing analysis of instrumentation errors to obtain correction factors, and, if excessive, applying the correction factors to instrumentation signals such that subsequent on-line operation produces minimum errors in fuel chemistry and heating value determinations.

26. The method of claim 25, including an additional step, after the step of performing analysis of instrumentation errors, of adjusting operation of the system to improve its efficiency based upon the results.

27. A method for quantifying the operation of a fossil-fueled thermal system having a heat exchangers/combustion region producing combustion products, the method comprising the steps of:

before on-line operation, the steps of obtaining a set of reference fuel characteristics, and developing explicit mathematical models of the combustion process involving at least stoichiometric balances; and thereafter operating on-line, the step of operating on-line including the steps of measuring a set of measurable operating parameters, including at least effluent concentrations of $O_2$ and $CO_2$, these measurements being made at a location downstream of the heat exchangers/combustion region of the thermal system, obtaining an effluent concentration of $H_2O$ if the set of reference fuel characteristics indicates that fuel water is not predictable, as an obtained effluent $H_2O$, obtaining a concentration of $O_2$ in the ambient air entering the thermal system, obtaining an air pre-heater leakage factor, calculating a set of fuel chemistry concentrations including elementary fuel constituents and fuel water, but excluding fuel ash, as a function of the set of reference fuel characteristics, explicit mathematical models of the combustion process, the set of measurable operating parameters, the obtained effluent $H_2O$, the concentration of $O_2$ in the ambient air entering the thermal system, and the air pre-heater leakage factor.

28. The method of claim 27, wherein the step of operating on-line includes the additional steps after the step of calculating the set of fuel chemistry concentrations including elementary fuel constituents and fuel water, of obtaining an indicated fuel flow if the set of reference fuel characteristics indicates that fuel ash is not predictable, as an obtained fuel flow used for calculating fuel ash concentration, calculating a fuel ash concentration if the set of reference fuel characteristics indicates fuel ash is not predictable, as a function of the set of fuel chemistry concentrations including elementary fuel constituents and fuel water, explicit mathematical models of the combustion process, the obtained fuel flow, the concentration of $O_2$ in the ambient air entering the thermal system, and the air pre-heater leakage factor, and calculating a complete As-Fired fuel chemistry as a function of the set of fuel chemistry concentrations which includes elementary fuel constituents, fuel water and fuel ash concentrations.

29. The method of claim 28, wherein the step of calculating the fuel ash concentration, includes the step of calculating explicitly a moisture-ash-free fuel ash concentration if the set of reference fuel characteristics indicates fuel ash is not predictable, as a function of the set of fuel chemistry concentrations including elementary fuel constituents and fuel water, explicit mathematical models of the combustion process, the obtained fuel flow, the concentration of $O_2$ in the ambient air entering the thermal system, and the air pre-heater leakage factor.

30. The method of claim 28, wherein the step of calculating the fuel ash concentration, includes the step of calculating explicitly a dry-based fuel ash concentration if the set of reference fuel characteristics indicates fuel ash is not predictable, as a function of the set of fuel chemistry concentrations including elementary fuel constituents and fuel water, explicit mathematical models of the combustion process, the obtained fuel flow, the concentration of $O_2$ in the ambient air entering the thermal system, and the air pre-heater leakage factor.

31. The method of claim 28, wherein the step of operating on-line includes the additional step after calculating the complete As-Fired fuel chemistry, of calculating an As-Fired fuel heating value as a function of the complete As-Fired fuel chemistry and the set of reference fuel characteristics.

32. The method of claim 31, including, after the step of calculating the As-Fired fuel heating value, the additional steps of obtaining fuel factors associated with the complete As-Fired fuel chemistry, completing a multidimensional minimization analysis employing fuel factors and heating values to minimize the collective error associated with at least one of the measured effluent $CO_2$, the obtained effluent $H_2O$, the obtained fuel flow, the concentration of $O_2$ in the ambient air entering the thermal system, and the air pre-heater leakage factor, obtaining and applying for subsequent on-line analysis correction factors to the measured effluent $CO_2$, the obtained effluent $H_2O$, the obtained fuel flow, the concentration of $O_2$ in the ambient air entering the thermal system, and the air pre-heater leakage factor.

33. The method of claim 31, wherein the set of measurable operating parameters includes effluent temperature, and wherein the method includes an additional step, after the step of calculating the As-Fired fuel heating value, of obtaining a system energy credit term, calculating a consistent boiler efficiency as a function of the complete As-Fired fuel chemistry, effluent temperature, the effluent concentrations, the As-Fired fuel heating value and the system energy credit term.

34. The method of claim 33, wherein the step of operating on-line includes an additional step of measuring the useful output derived directly from the combustion products, and the step of measuring a set of measurable operating parameters includes the step of measuring a useful electrical and thermal power produced from a working fluid heated by combustion products, determining an efficiency associated with the working fluid's process, and further including an additional step, after the step of calculating a consistent boiler efficiency, of calculating a system thermal efficiency as a function of the efficiency associated with the working fluid's process and the consistent boiler efficiency.

35. The method of claim 33, wherein the set of measurable operating parameters includes measuring a useful output derived directly from the combustion products, and including an additional step, after the step of calculating the consistent boiler efficiency, of calculating a consistent As-Fired fuel flow rate as a function of the consistent boiler efficiency, the useful output, the As-Fired fuel heating value and the system energy credit term.

36. The method of claim 35, including an additional step, after the steps of calculating the consistent As-Fired fuel flow rate and the consistent boiler efficiency, of calculating a consistent effluent flow rate as a function of the consistent As-Fired fuel flow rate.

37. The method of claim 36, including an additional step, after the step of calculating the consistent effluent flow rate, of obtaining a set of effluent concentrations including at least $SO_2$ and $NO_x$, calculating a set of individual effluent flow rates including those of at least $SO_2$ and $NO_x$ as functions of the total effluent flow rate and the set of effluent concentrations.

38. The method of claim 37, including an additional step, after the step of calculating the set of individual effluent flow rates, of calculating a set of consistent emission rates as a function of the individual effluent flow rates, consistent As-Fired fuel flow rate and consistent As-Fired heating value.

39. The method of claim 36, including an additional step, after the step of calculating the consistent effluent flow rate, of calculating a Second Law analysis of the thermal system and Fuel Consumption Indices.

40. The method of claim 39, including an additional step, after the step of calculating Fuel Consumption Indices, of adjusting operation of the system to improve its efficiency based upon the results.

41. The method of claim 28, wherein the thermal system comprises a thermal system selected from the group consisting of a coal-burning power plants, oil-burning power plants, gas-fired power plants, biomass combustors, fluidized bed combustors, a conventional electric power plant, a steam generator, a package boiler, a combustion turbine, and a combustion turbine with a heat recovery boiler.

42. The method of claim 27, wherein the step of operating on-line includes the additional steps after the step of calculating the set of fuel chemistry concentrations including elementary fuel constituents and fuel water, of obtaining a normalized Air/Fuel ratio if the set of reference fuel characteristics indicates that fuel ash is not predictable, as an obtained Air/Fuel ratio used for calculating fuel ash concentration, calculating a fuel ash concentration if the set of reference fuel characteristics indicates fuel ash is not predictable, as a function of the set of fuel chemistry concentrations including elementary fuel constituents and fuel water, explicit mathematical models of the combustion process, the obtained Air/Fuel ratio, the concentration of $O_2$ in the ambient air entering the thermal system, and the air pre-heater leakage factor, and calculating a complete As-Fired fuel chemistry as a function of the set of fuel chemistry concentrations which includes elementary fuel constituents, fuel water and fuel ash concentrations.

43. The method of claim 42, wherein the step of calculating the fuel ash concentration, includes the step of calculating explicitly a moisture-ash-free fuel ash concentration if the set of reference fuel characteristics indicates fuel ash is not predictable, as a function of the set of fuel chemistry concentrations including elementary fuel constituents and fuel water, explicit mathematical models of the combustion process, the obtained Air/Flow ratio, the concentration of $O_2$ in the ambient air entering the thermal system, and the air pre-heater leakage factor.

44. The method of claim 42, wherein the step of calculating the fuel ash concentration, includes the step of calculating explicitly a dry-based fuel ash concentration if the set of reference fuel characteristics indicates fuel ash is not predictable, as a function of the set of fuel chemistry concentrations including elementary fuel constituents and fuel water, explicit mathematical models of the combustion process, the obtained Air/Fuel ratio, the concentration of $O_2$ in the ambient air entering the thermal system, and the air pre-heater leakage factor.

45. The method of claim 42, wherein the step of operating on-line includes the additional step after calculating the complete As-Fired fuel chemistry, of calculating an As-Fired fuel heating value as a function of the complete As-Fired fuel chemistry and the set of reference fuel characteristics.

46. The method of claim 45, including, after the step of calculating the As-Fired fuel heating value, the additional steps of obtaining fuel factors associated with the complete As-Fired fuel chemistry, completing a multidimensional minimization analysis employing fuel factors and heating values to minimize the collective error associated with at least one of the measured effluent $CO_2$, the obtained effluent $H_2O$, the obtained fuel flow, the concentration of $O_2$ in the ambient air entering the thermal system, and the air pre-heater leakage factor, obtaining and applying for subsequent on-line analysis correction factors to the measured effluent $CO_2$, the obtained effluent $H_2O$, the obtained fuel flow, the concentration of $O_2$ in the ambient air entering the thermal system, and the air pre-heater leakage factor.

47. The method of claim 45, wherein the set of measurable operating parameters includes effluent temperature, and wherein the method includes an additional step, after the step of calculating the As-Fired fuel heating value, of obtaining a system energy credit term, calculating a consistent boiler efficiency as a function of the complete As-Fired fuel chemistry, effluent temperature, the effluent concentrations, the As-Fired fuel heating value and the system energy credit term.

48. The method of claim 47, wherein the step of operating on-line includes an additional step of measuring the useful output derived directly from the combustion products, and the step of measuring a set of measurable operating parameters includes the step of measuring a useful electrical and thermal power produced from a working fluid heated by combustion products, determining an efficiency associated with the working fluid's process, and further including an additional step, after the step of calculating a consistent boiler efficiency, of calculating a system thermal efficiency as a function of the efficiency associated with the working fluid's process and the consistent boiler efficiency.

49. The method of claim 47, wherein the set of measurable operating parameters includes measuring a useful output derived directly from the combustion products, and including an additional step, after the step of calculating the consistent boiler efficiency, of calculating a consistent As-Fired fuel flow rate as a function of the consistent boiler efficiency, the useful output, the As-Fired fuel heating value and the system energy credit term.

50. The method of claim 49, including an additional step, after the steps of calculating the consistent As-Fired fuel flow rate and the consistent boiler efficiency, of calculating a consistent effluent flow rate as a function of the consistent As-Fired fuel flow rate.

51. The method of claim 50, including an additional step, after the step of calculating the consistent effluent flow rate, of obtaining a set of effluent concentrations including at least $SO_2$ and $NO_x$, calculating a set of individual effluent flow rates including those of at least $SO_2$ and $NO_x$ as functions of the total effluent flow rate and the set of effluent concentrations.

52. The method of claim 51, including an additional step, after the step of calculating the set of individual effluent flow rates, of calculating a set of consistent emission rates as a function of the individual effluent flow rates, consistent As-Fired fuel flow rate and consistent As-Fired heating value.

53. The method of claim 50, including an additional step, after the step of calculating the consistent effluent flow rate, of calculating a Second Law analysis of the thermal system and Fuel Consumption Indices.

54. The method of claim 53, including an additional step, after the step of calculating Fuel Consumption Indices, of adjusting operation of the system to improve its efficiency based upon the results.

55. The method of claim 42, wherein the thermal system comprises a thermal system selected from the group consisting of a coal-burning power plants, oil-burning power plants, gas-fired power plants, biomass combustors, fluidized bed combustors, a conventional electric power plant, a steam generator, a package boiler, a combustion turbine, and a combustion turbine with a heat recovery boiler.

56. The method of claim 27, wherein the step of operating on-line includes the additional steps after the step of calculating the set of fuel chemistry concentrations including elementary fuel constituents and fuel water, of obtaining a predictable fuel ash concentration based on the set of reference fuel characteristics, and calculating a complete As-Fired fuel chemistry as a function of the set of fuel chemistry concentrations which includes elementary fuel constituents, fuel water and fuel ash concentrations.

57. The method of claim 56, wherein the step of obtaining the predictable fuel ash concentration based on the set of reference fuel characteristics, includes the step of obtaining a predictable moisture-ash-free fuel ash concentration based on the set of reference fuel characteristics.

58. The method of claim 56, wherein the step of obtaining the predictable fuel ash concentration based on the set of reference fuel characteristics, includes the step of obtaining a predictable dry-based fuel ash concentration based on the set of reference fuel characteristics.

59. The method of claim 56, wherein the step of operating on-line includes the additional step after calculating the complete As-Fired fuel chemistry, of calculating an As-Fired fuel heating value as a function of the complete As-Fired fuel chemistry and the set of reference fuel characteristics.

60. The method of claim 59, including, after the step of calculating the As-Fired fuel heating value, the additional steps of obtaining fuel factors associated with the complete As-Fired fuel chemistry, completing a multidimensional minimization analysis employing fuel factors and heating values to minimize the collective error associated with at least one of the measured effluent $CO_2$, the obtained effluent $H_2O$, the obtained fuel flow, the concentration of $O_2$ in the ambient air entering the thermal system, and the air pre-heater leakage factor, obtaining and applying for subsequent on-line analysis correction factors to the measured effluent $CO_2$, the obtained effluent $H_2O$, the obtained fuel flow, the concentration of $O_2$ in the ambient air entering the thermal system, and the air pre-heater leakage factor.

61. The method of claim 59, wherein the set of measurable operating parameters includes effluent temperature, and wherein the method includes an additional step, after the step of calculating the As-Fired fuel heating value, of obtaining a system energy credit term, calculating a consistent boiler efficiency as a function of the complete As-Fired fuel chemistry, effluent temperature, the effluent concentrations, the As-Fired fuel heating value and the system energy credit term.

62. The method of claim 61, wherein the step of operating on-line includes an additional step of measuring the useful output derived directly from the combustion products, and the step of measuring a set of measurable operating parameters includes the step of measuring a useful electrical and thermal power produced from a working fluid heated by combustion products, determining an efficiency associated with the working fluid's process, and further including an additional step, after the step of calculating a consistent boiler efficiency, of calculating a system thermal efficiency as a function of the efficiency associated with the working fluid's process and the consistent boiler efficiency.

63. The method of claim 61, wherein the set of measurable operating parameters includes measuring a useful output derived directly from the combustion products, and including an additional step, after the step of calculating the consistent boiler efficiency, of calculating a consistent As-Fired fuel flow rate as a function of the consistent boiler efficiency, the useful output, the As-Fired fuel heating value and the system energy credit term.

64. The method of claim 63, including an additional step, after the steps of calculating the consistent As-Fired fuel flow rate and the consistent boiler efficiency, of calculating a consistent effluent flow rate as a function of the consistent As-Fired fuel flow rate.

65. The method of claim 64, including an additional step, after the step of calculating the consistent effluent flow rate, of obtaining a set of effluent concentrations including at least $SO_2$ and $NO_x$, calculating a set of individual effluent flow rates including those of at least $SO_2$ and $NO_x$ as functions of the total effluent flow rate and the set of effluent concentrations.

66. The method of claim 65, including an additional step, after the step of calculating the set of individual effluent flow rates, of calculating a set of consistent emission rates as a function of the individual effluent flow rates, consistent As-Fired fuel flow rate and consistent As-Fired heating value.

67. The method of claim 64, including an additional step, after the step of calculating the consistent effluent flow rate, of calculating a Second Law analysis of the thermal system and Fuel Consumption Indices.

68. The method of claim 67, including an additional step, after the step of calculating Fuel Consumption Indices, of adjusting operation of the system to improve its efficiency based upon the results.

69. The method of claim 56, wherein the thermal system comprises a thermal system selected from the group consisting of a coal-burning power plants, oil-burning power plants, gas-fired power plants, biomass combustors, fluidized bed combustors, a conventional electric power plant, a steam generator, a package boiler, a combustion turbine, and a combustion turbine with a heat recovery boiler.

70. The method of claim 27, wherein the step of calculating the set of fuel chemistry concentrations including elementary fuel constituents and fuel water, includes the step of calculating a set of moisture-ash-free fuel chemistry concentrations including elementary fuel constituents and fuel water, but excluding fuel ash, as a function of the set of reference fuel characteristics, explicit mathematical models of the combustion process, the set of measurable operating parameters, the obtained effluent $H_2O$, the concentration of $O_2$ in the ambient air entering the thermal system, and the air pre-heater leakage factor.

71. The method of claim 27, wherein the step of calculating the set of fuel chemistry concentrations including elementary fuel constituents and fuel water, includes the step of calculating a set of dry-based fuel chemistry concentrations including elementary fuel constituents and fuel water, but excluding fuel ash, as a function of the set of reference fuel characteristics, explicit mathematical models of the combustion process, the set of measurable operating parameters, the obtained effluent $H_2O$, the concentration of $O_2$ in the ambient air entering the thermal system, and the air pre-heater leakage factor.

72. The method of claim 27, wherein the step of calculating the set of fuel chemistry concentrations including elementary fuel constituents and fuel water, but excluding fuel ash, includes the step of calculating explicitly a set of fuel chemistry concentrations including elementary fuel constituents and fuel water, but excluding fuel ash, as a function of the set of reference fuel characteristics, explicit mathematical models of the combustion process, the set of measurable operating parameters, the obtained effluent $H_2O$, the concentration of $O_2$ in the ambient air entering the thermal system, and the air pre-heater leakage factor.

73. The method of claim 27, wherein the step of obtaining the concentration of $O_2$ in the ambient air entering the thermal system includes the step of using a value of 20.948 percent for the concentration of $O_2$ in the ambient air entering the thermal system.

74. The method of claim 27, wherein the step of obtaining the concentration of $O_2$ in the ambient air entering the thermal system includes the step of using an average value at sea level determined by the National Aeronautics and Space Administration for the concentration of $O_2$ in the ambient air entering the thermal system.

75. The method of claim 27, wherein the step of obtaining the air pre-heater leakage factor includes the step of using a value of unity for the air pre-heater leakage factor.

* * * * *

UNITED STATES PATENT AND TRADEMARK OFFICE
CERTIFICATE OF CORRECTION

PATENT NO. : 6,522,994 B1
DATED : February 18, 2003
INVENTOR(S) : Fred D. Lang

It is certified that error appears in the above-identified patent and that said Letters Patent is hereby corrected as shown below:

Column 3,
Lines 35-36, embedded expression "$(\eta_{boiler})(\Sigma m\Delta h)$" should read -- $\eta_{boiler}P/(\Sigma m\Delta h)$ --

Column 5,
Line 62, delete "SO2" and insert -- $SO_2$ --
Line 67, after "work" insert -- as --

Column 11,
Line 61, delete "rates —all" and insert -- rates - all --
Line 64, delete "solutions, both dependent" and insert -- solutions, dependent --

Column 14,
Line 35, delete "electrical" and insert -- electricity --

Column 23,
Line 67, delete "$\Sigma n_1$" and insert -- $\Sigma n_i$ --

Signed and Sealed this

Seventeenth Day of February, 2004

JON W. DUDAS
*Acting Director of the United States Patent and Trademark Office*

UNITED STATES PATENT AND TRADEMARK OFFICE
CERTIFICATE OF CORRECTION

PATENT NO.    : 6,522,994 B1
DATED         : February 18, 2001
INVENTOR(S)   : Fred D. Lang It is certified that error appears in the above-identified patent and that said Letters Patent is hereby corrected as shown below:

Column 16,
Line 60, after "$\eta_{boiler}$" insert -- (also denoted as $\eta_{boiler}$) --
Line 60, after "$\eta_{system}$" insert -- (also denoted as $\eta_{system}$) --

Column 18,
Line 22, after "$\eta_C$" insert -- (also denoted as $\eta_C$) --
Line 22, after "$\eta_A$" insert -- (also denoted as $\eta_A$) --
Line 35, equation should read as follows:
-- $m_{AF} \equiv m_{AF} \equiv$ As-Fired Fuel Mass Flow Rate; $lbm_{AF}/hr$. --
Lines 36-37, equation should read as follows:
-- HHVP $\equiv$ Higher Heating Value at Constant Pressure; $Btu/lbm_{AF}$. --

Column 20,
Equation (17) should read as follows:

$$m_{AF}HNSL = L_{\beta-4.1} + L_p + L_d + L_r + L_{UC} + L_{\beta-4.4} + L_W + \text{(turbine shaft losses)} \quad (17)$$

Column 22, line 40 to Column 23, line 13,
Equation (29), should read as follows:

$$\begin{aligned}
-- \; x\{&\alpha_0 [C_{YR}H_{ZR}] + \alpha_1 [N_2] + \alpha_2 [H_2O] + \alpha_3 [O_2] + \alpha_4 [C] + \alpha_5 [H_2] \\
&+ \alpha_6 [S] + \alpha_7 [CO_2] + \alpha_8 [CO] + \alpha_9 [H_2S] + \alpha_{10} [ash]\}_{As\text{-}Fired\;Fuel} \\
&+ b_Z[H_2O]_{In\text{-}Leakage} + \{(1.0 + \beta)(a[O_2] + a\phi_{Act}[N_2] + b_A[H_2O])\}_{Air} \\
&+ \{(1 + \gamma)b_{PLS}[CaCO_3]\}_{As\text{-}Fired\;PLS} \\
= \; &d[CO_2] + g[O_2] + h[N_2] + j[H_2O] + k_{Act}[SO_2] \\
&+ \{e_{Act}[CO] + f[H_2] + l\,[SO_3] + m[NO] + p[N_2O] \\
&+ q[NO_2] + t[C_{YP1}H_{ZP1}] + u[C_{YP2}H_{ZP2}]\}_{Minor\;Components} \\
&+ \sigma b_{PLS}[CaSO_4 \cdot zH_2O] + \{(1.0 - \sigma + \gamma)b_{PLS}[CaO]\}_{Excess\;PLS} \\
&+ x\alpha_{10}[ash] + w[C_{Reject}] + v[C_{Refuse}] \\
&+ \{\beta a[O_2] + \beta a\phi_{Act}[N_2] + \beta b_A[H_2O]\}_{Air\;Leakage} \quad (29) \; --
\end{aligned}$$

Column 23,
Line 17, delete "x = As-Fuel fuel" and insert -- x = Moles of As-Fired fuel --
Lines 19 and 20, each occurrence of "$\alpha_1$" should read -- $\alpha_i$ --
Line 23, delete "$b_A$ = Moisture" and insert -- $b_A$ = Moles of moisture --
Line 24, delete "where $\phi$" and insert -- where $\omega$ --
Line 28, delete "$b_Z$ = Water/steam" and insert -- $b_Z$ = Moles of water/steam --

UNITED STATES PATENT AND TRADEMARK OFFICE
CERTIFICATE OF CORRECTION

PATENT NO. : 6,522,994 B1
DATED : February 18, 2001
INVENTOR(S) : Fred D. Lang

It is certified that error appears in the above-identified patent and that said Letters Patent is hereby corrected as shown below:

Column 23,
Line 31, equation reading "$b_Z \equiv x\ N_{AF}\ \Sigma[m_{leakage}/(M_{AF}\ N_{H2O})]$" should read as follows:
-- $b_Z \equiv x\ N_{AF}\ \Sigma[m_{leakage}/(m_{AF}\ N_{H2O})]$ --
Line 32, delete "$b_{PLS}$ = Molar fraction" and insert -- $b_{PLS}$ = Moles --
Line 34, embedded equation reading "$k_F \equiv x(\alpha_6 - \alpha_9) / [1.0 + (1/k_F)_{input}]$" should read as follows: -- $k_F \equiv x(\alpha_6 - \alpha_9) / [1.0 + (l/k_F)_{input}]$ --
Line 36, embedded expression reading "$(1/k_F)_{input}$" should read -- $(l/k_F)_{input}$ --
Line 52, embedded equation reading "$\beta \equiv (R_{Act} - 1.0) / [a\ R_{Act}(1.0 + \phi_{Act})]$" should read -- $\beta \equiv 100(R_{Act} - 1.0) / [a\ R_{Act}(1.0 + \phi_{Act})]$ --
Line 58, delete "a = Molar fraction" and insert -- a = Moles --
Line 62, each occurrence of "$A_{act}$" should read -- $A_{Act}$ --
Line 63, delete "$A_{act}$ = Concentration" and insert -- $A_{Act}$ = Molar fraction --
Line 66, delete "1, m" and insert -- $l$, m --

Column 24,
Line 2, delete "p1 $n_{ji}$ = Molar quantities of non-gas" and insert after
Line 2 the new line as follows:
-- $n_{ii}$ = Molar quantities of non-gas --
Line 5, delete "$\Sigma n_1$" and insert -- $\Sigma n_{ii}$ --
Line 16, delete "$WF_1$" and insert -- $WF_i$ --
Line 18, delete "$n_1$" and insert -- $n_i$ --
Line 19, delete "$n_n$" and insert -- $n_{ii}$ --
Lines 32-36, listed equations should read as follows:

-- Total effluent water $\equiv J = j + b_A \beta$
Total effluent oxygen $\equiv G = g + a\beta$
Total effluent $= \Sigma n_i + \Sigma n_{ii} + \beta(a + a\phi_{Act} + b_A)$
Total effluents before the air pre-heater $= R_{Act}\Sigma n_i + R_{Act}\Sigma n_{ii}$ --

Lines 41-42, embedded expression "$\beta(a + a\phi Act)$" should read -- $\beta(a + a\phi_{Act})$ --

Column 26,
Equation (32) should read as follows:
-- $x(\alpha_3 + \alpha_2/2) = \Gamma_{O2}$     (32) --

Equation (35) should read as follows:
-- $x\alpha_{10} \neq -\Gamma'_{ash} - x(\alpha_1 + \alpha_2 + 2\alpha_3 + \alpha_5/2 - 1.0)$   (35) --

Equation (36) should read as follows:
-- $\Gamma_{N2} = 100 - (d_{Act} + e_{Act} + f + G_{Act} + k_{Act}$
$+ l + m/2 + q/2 + t + u)$
$- 100\phi_{Act}(R_{Act} - 1.0)/[R_{Act}(\phi_{Act} + 1.0)]$   (36) --

UNITED STATES PATENT AND TRADEMARK OFFICE
CERTIFICATE OF CORRECTION

PATENT NO. : 6,522,994 B1  
DATED : February 18, 2001  
INVENTOR(S) : Fred D. Lang Page 3 of 6

It is certified that error appears in the above-identified patent and that said Letters Patent is hereby corrected as shown below:

Column 26,
Equation (38) should read as follows:

-- $\Gamma_{O2} = d_{Act} + e_{Act}/2 + (G_{Act} - a\beta) + (J_{Act} - b_A\beta)/2 + k_{Act}$
$+ 3l/2 + m/2 + p/2 + q + 2r - a - b_A/2 - b_Z/2$
$+ (3\sigma - 2 - 2\gamma + \sigma z)b_{PLS}/2 - x(\alpha_7 + \alpha_8/2)$ (38) --

Equation (40) should read as follows:

-- $\Gamma_{SO2} = k_{Act} + l + \sigma b_{PLS} - x\alpha_9$ (40) --

Equation (41) should read as follows:

-- $\Gamma'_{Ash} = a - (G_{Act} - a\beta) + e_{Act}/2 + f/2 + w + v$
$- b_{PLS}/2 - l/2 - m/2 - p/2 - q - 2r$
$+ x[\alpha_0(YR - ZR/2) + \alpha_7 + \alpha_8/2 + \alpha_9/2]$ (41) --

Line 40, delete "Act" and insert -- *Act* --

Column 27,
Line 5, delete "unit" and insert -- unity --
Line 13, delete "minor, fuel" and insert -- minor fuel --

Column 28,
Line 58, delete "$\alpha_{MAF-4} = f(\alpha_{MAF-5})$" and insert -- $\alpha_{MAF-4} = f(\alpha_{MAF-5})$ --

Column 29,
Equation (49) should read as follows:

-- $xN_{AF} = x(\Sigma_{j=0-9} N_j \alpha_j + N_{10} \alpha_{10})$ (49) --

Eqution (52) should read as follows:

-- $xN_{AF} = x_{MAF}(\Sigma_{j=0-9} N_j \alpha_{MAF-j} + N_{10} \alpha_{MAF-10})$ (52) --

Equation (53) should read as follows:

-- $AF = (1.0 + \beta)[(a + a\phi_{Act})N_{Air} + b_A N_{H2O}]$
$/ [x_{MAF}(\Sigma_{j=0-9} N_j \alpha_{MAF-j} + N_{10} \alpha_{MAF-10})]$ (53) --

Equation (54) should read as follows:

-- $\alpha_{MAF-10} = \Gamma_{Ash} \alpha_{MAF-4}/(\Gamma_{CO2} N_{10}) - \Sigma_{j=0-9} N_j \alpha_{MAF-j}/N_{10}$ (54) --

UNITED STATES PATENT AND TRADEMARK OFFICE
CERTIFICATE OF CORRECTION

PATENT NO.   : 6,522,994 B1
DATED        : February 18, 2001
INVENTOR(S)  : Fred D. Lang It is certified that error appears in the above-identified patent and that said Letters Patent is hereby corrected as shown below:

Column 30,
Equation (59A) should read as follows:

-- $\alpha_j = \alpha_{MAF-j} / (1.0 + \alpha_{MAF-2} + \alpha_{MAF-10})$      (59A) --

Equation (60B) should read as follows:

-- $WF_{dry-j} = WF_j / (1.0 - WF_2)$      (60B) --

Column 31,
Equation (61) should read as follows:

-- $\Delta HHV_{MAF-delta} = HHV_{MAF-Ref} - (-178387.18\, \alpha_{MAF-3}$
$+ 183591.92\, \alpha_{MAF-4} + 78143.68\, \alpha_{MAF-5}$
$+ 127692.00\, \alpha_{MAF-6})_{Ref} / N_{MAF-Ref}$      (61) --

Equation (62) should read as follows:

-- $HHV_{MAF-uncorr} = (-178387.18\, \alpha_{MAF-3}$
$+ 183591.92\, \alpha_{MAF-4} + 78143.68\, \alpha_{MAF-5}$
$+ 127692.00\, \alpha_{MAF-6})_{Actual} / N_{MAF-Actual}$      (62) --

Column 32,
Line 2, delete "fraction—163190" and insert -- fraction -163190 --
Lines 39-61 with embedded equations, should read in tabular context as follows:

-- Fuel Flow Rate, $m_{AF}$, Eq.(21) = $BBTC/[\eta_{boiler}(HHVP + HBC)]$
Combustion Dry Air Flow Rate = $m_{AF}(1.0 + \beta)(a + a\phi_{Act})N_{Air}/(xN_{AF})$
Combustion Air Moisture Flow Rate = $m_{AF}(1.0 + \beta)b_A N_{H2O}/(xN_{AF})$
In-Leakage of Water and Steam = $m_{AF} b_Z N_{H2O}/(xN_{AF})$
Pure Limestone ($CaCO_3$) Flow = $m_{AF}(1.0 + \gamma)b_{PLS} N_{CaCO3}/(xN_{AF})$
                       $\Sigma$INLET FLOWS Dry Gas Flow from the Combustion
     Region (i.e., Boiler Effluent,
     assuming 100 mole base) = $m_{AF} 100 N_{Gas}/(R_{Act} xN_{AF})$
Dry Air Leakage Flow at Boundary = $m_{AF} \beta(a + a\phi_{Act})N_{Air}/(xN_{AF})$
Combustion Moisture plus Air Leakage
     Moisture at Boundary = $m_{AF}(j + \beta b_A) N_{H2O}/(xN_{AF})$
Reject & Refuse Carbon Flow = $m_{AF}(v + w) N_C/(xN_{AF})$
Calcium Sulfate with Water Flow = $m_{AF} \sigma b_{PLS} N_{CaSO4 \cdot zH2O}/(xN_{AF})$
Calcium Oxide Flow = $m_{AF}(1.0 - \sigma + \gamma)b_{PLS} N_{CaO}/(xN_{AF})$
Ash (Bottom, Fly & Dust) Flow = $m_{AF} \alpha_{10} N_{Ash}/N_{AF}$
                       $\Sigma$OUTLET FLOWS --

Equation (69) should read as follows:

-- $m_{species-i} = m_{AF} \Phi_i N_i / [xN_{AF}]$      (69) --

UNITED STATES PATENT AND TRADEMARK OFFICE
CERTIFICATE OF CORRECTION

PATENT NO. : 6,522,994 B1
DATED : February 18, 2001
INVENTOR(S) : Fred D. Lang

It is certified that error appears in the above-identified patent and that said Letters Patent is hereby corrected as shown below:

Column 33,
Lines 1-2, each occurrence of "$\phi_i$" should read -- $\Phi_i$ --
Line 4, delete "$\phi_{SO2}$" should read -- $\Phi_{SO2}$ --

Column 34,
Lines 9-12, including Equation (72) should read as follows:

$$-- L'_{Fuel} = [x_{Dry\text{-}theor} N_{Dry\text{-}Fuel} + a_{Dry\text{-}theor}(1.0 + \phi_{Act})N_{Dry\text{-}Air}$$
$$- J_{theor} N_{H2O} - x_{MAF\text{-}theor} \alpha_{MAF\text{-}10} N_{Ash}]$$
$$/ (x_{Dry\text{-}theor} N_{Dry\text{-}Fuel} HHV_{Dry}) \qquad (72)$$
$$\text{Note that: } x_{Dry\text{-}theor} N_{Dry\text{-}Fuel} HHV_{Dry} = x_{MAF\text{-}theor} N_{MAF\text{-}Fuel} HHV_{MAF}. --$$

Lines 26, 30, and 46, delete "$L_{Fuel}$" and insert -- $L'_{Fuel}$ --
Equation (75) should read as follows:

$$-- L'_{Fuel} = K_{11} + K_{12} d_{Act} + K_{13} d_{Act}^2 \qquad (75) --$$

Line 56, delete "$L_{Fuel}$ and $L_{Fuel}$" and insert -- $L_{Fuel}$ and $L'_{Fuel}$ --.
Lines 59-60, delete "$J_{Act}$ and $_{AFAct}$, individually; versus $L_{Water}$ = f ($J_{Act}$) and $L_{Ash}$ = f (AF$_{Act}$)."

and insert -- $J_{Act}$ and AF$_{Act}$, individually; versus $L_{Water} = f(J_{Act})$ and $L_{Ash} = f(AF_{Act})$. --

Column 35,
Equation (76) should read as follows:

$$-- F_i = [(L_i - L_{Ref\text{-}i})/L_{Ref\text{-}i}]^2$$
$$\cdot [1.0 - \prod_{n=1,2,3} (HHV_n - HHV_{Ref\text{-}n})^2 / HHV_{Ref\text{-}n}^2] \qquad (76) --$$

Line 11, delete "$L_{Ref\text{-}1}$" and insert -- $L_{Ref\text{-}i}$ --
Lines 20 and 21, each occurrence of "f(" should read -- $f($ --
Line 38, delete "$L_{ref\text{-}Water}$ and $L_{ref\text{-}Ash}$" and insert -- $L_{Ref\text{-}Water}$ and $L_{Ref\text{-}Ash}$ --
Line 46, each occurrence of "f(" should read -- $f($ --

Column 37,
Lines 48-49, each occurrence of the subscript "act" should read the subscript -- Act --

UNITED STATES PATENT AND TRADEMARK OFFICE
CERTIFICATE OF CORRECTION

PATENT NO. : 6,522,994 B1
DATED : February 18, 2001
INVENTOR(S) : Fred D. Lang

It is certified that error appears in the above-identified patent and that said Letters Patent is hereby corrected as shown below:

Column 38,
Lines 56-57, embedded equation "$\alpha_{MAF-j} = f(\alpha_{MAF-4})$" should read -- $\alpha_{MAF-j} = f(\alpha_{MAF-4})$ --

Line 60, embedded equation "$\alpha_{MAF-5} = f(\alpha_{MAF-4})$" should read -- $\alpha_{MAF-5} = f(\alpha_{MAF-4})$ --

Column 39,
Line 1, embedded equation "$\alpha_{MAF-5} = f(\alpha_{MAF-4})$" should read -- $\alpha_{MAF-5} = f(\alpha_{MAF-4})$ --

Signed and Sealed this

Thirtieth Day of March, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,522,994 B1
DATED : February 18, 2003
INVENTOR(S) : Fred D. Lang

It is certified that error appears in the above-identified patent and that said Letters Patent is hereby corrected as shown below:

Column 16,
Line 60, after "$\eta_{boiler}$" insert -- (also denoted as $\eta_{boiler}$) --
Line 60, after "$\eta_{system}$" insert -- (also denoted as $\eta_{system}$) --

Column 18,
Line 22, after "$\eta_C$" insert -- (also denoted as $\eta_C$) --
Line 22, after "$\eta_A$" insert -- (also denoted as $\eta_A$) --
Line 35, equation should read as follows:
-- $m_{AF} \equiv m_{AF} \equiv$ As-Fired Fuel Mass Flow Rate; $lbm_{AF}$/hr. --
Lines 36-37, equation should read as follows:
-- HHVP $\equiv$ Higher Heating Value at Constant Pressure; $Btu/lbm_{AF}$. --

Column 20,
Equation (17) should read as follows:

$$m_{AF}\text{HNSL} = L_{\beta\text{-}4.1} + L_p + L_d + L_r + L_{UC} + L_{\beta\text{-}4.4} + L_W + \text{(turbine shaft losses)} \quad (17)$$

Column 22, line 40 to Column 23, line 13,
Equation (29), should read as follows:

$$\begin{aligned}
-- \ x\{&\alpha_0 [C_{YR}H_{ZR}] + \alpha_1 [N_2] + \alpha_2 [H_2O] + \alpha_3 [O_2] + \alpha_4 [C] + \alpha_5 [H_2] \\
&+ \alpha_6 [S] + \alpha_7 [CO_2] + \alpha_8 [CO] + \alpha_9 [H_2S] + \alpha_{10} [\text{ash}]\}_{\text{As-Fired Fuel}} \\
&+ b_Z[H_2O]_{\text{In-Leakage}} + \{(1.0 + \beta)(a[O_2] + a\phi_{Act}[N_2] + b_A[H_2O])\}_{\text{Air}} \\
&+ \{(1 + \gamma)b_{PLS}[CaCO_3]\}_{\text{As-Fired PLS}} \\
= d&[CO_2] + g[O_2] + h[N_2] + j[H_2O] + k_{Act}[SO_2] \\
&+ \{e_{Act}[CO] + f[H_2] + l[SO_3] + m[NO] + p[N_2O] \\
&+ q[NO_2] + t[C_{YP1}H_{ZP1}] + u[C_{YP2}H_{ZP2}]\}_{\text{Minor Components}} \\
&+ \sigma b_{PLS}[CaSO_4 \cdot zH_2O] + \{(1.0 - \sigma + \gamma)b_{PLS}[CaO]\}_{\text{Excess PLS}} \\
&+ x\alpha_{10}[\text{ash}] + w[C_{Reject}] + v[C_{Refuse}] \\
&+ \{\beta a[O_2] + \beta a\phi_{Act}[N_2] + \beta b_A[H_2O]\}_{\text{Air Leakage}} \quad (29) --
\end{aligned}$$

Column 23,
Line 17, delete "x = As-Fuel fuel" and insert -- x = Moles of As-Fired fuel --
Lines 19 and 20, each occurrence of "$\alpha_1$" should read -- $\alpha_i$ --
Line 23, delete "$b_A$ = Moisture" and insert -- $b_A$ = Moles of moisture --
Line 24, delete "where $\phi$" and insert -- where $\omega$ --
Line 28, delete "$b_Z$ = Water/steam" and insert -- $b_Z$ = Moles of water/steam --

Page 1 of 6

UNITED STATES PATENT AND TRADEMARK OFFICE
CERTIFICATE OF CORRECTION

PATENT NO. : 6,522,994 B1
DATED : February 18, 2003
INVENTOR(S) : Fred D. Lang

It is certified that error appears in the above-identified patent and that said Letters Patent is hereby corrected as shown below:

Column 23,
Line 31, equation reading "$b_Z \equiv x\, N_{AF}\, \Sigma[m_{leakage}/(M_{AF}\, N_{H2O})]$" should read as follows:
-- $b_Z \equiv x\, N_{AF}\, \Sigma[m_{leakage}/(m_{AF}\, N_{H2O})]$ --
Line 32, delete "$b_{PLS}$ = Molar fraction" and insert -- $b_{PLS}$ = Moles --
Line 34, embedded equation reading "$k_F \equiv x(\alpha_6 - \alpha_9) / [1.0 + (l/k_F)_{input}]$" should read as follows: -- $k_F \equiv x(\alpha_6 - \alpha_9) / [1.0 + (l/k_F)_{input}]$ --
Line 36, embedded expression reading "$(1/k_F)_{input}$" should read -- $(l/k_F)_{input}$ --
Line 52, embedded equation reading "$\beta \equiv (R_{Act} - 1.0) / [a\, R_{Act}(1.0 + \phi_{Act})]$" should read -- $\beta \equiv 100(R_{Act} - 1.0) / [a\, R_{Act}(1.0 + \phi_{Act})]$ --
Line 58, delete "a = Molar fraction" and insert -- a = Moles --
Line 62, each occurrence of "$A_{act}$" should read -- $A_{Act}$ --
Line 63, delete "$A_{act}$ = Concentration" and insert -- $A_{Act}$ = Molar fraction --
Line 66, delete "1, m" and insert -- $l$, m --

Column 24,
Line 2, delete "p1 $n_{ji}$ = Molar quantities of non-gas" and insert after
Line 2 the new line as follows:
-- $n_{ii}$ = Molar quantities of non-gas --
Line 5, delete "$\Sigma n_1$" and insert -- $\Sigma n_{ii}$ --
Line 16, delete "$WF_1$" and insert -- $WF_i$ --
Line 18, delete "$n_1$" and insert -- $n_i$ --
Line 19, delete "$n_n$" and insert -- $n_{ii}$ --
Lines 32-36, listed equations should read as follows:

-- Total effluent water $\equiv J = j + b_A\beta$
Total effluent oxygen $\equiv G = g + a\beta$
Total effluent $= \Sigma n_i + \Sigma n_{ii} + \beta(a + a\phi_{Act} + b_A)$
Total effluents before the air pre-heater $= R_{Act}\Sigma n_i + R_{Act}\Sigma n_{ii}$ --

Lines 41-42, embedded expression "$\beta(a + a\phi Act)$" should read -- $\beta(a + a\phi_{Act})$ --

Column 26,
Equation (32) should read as follows:

-- $x(\alpha_3 + \alpha_2/2) = \Gamma_{O2}$     (32) --

Equation (35) should read as follows:

-- $x\alpha_{10} \neq -\Gamma'_{ash} - x(\alpha_1 + \alpha_2 + 2\alpha_3 + \alpha_5/2 - 1.0)$     (35) --

Equation (36) should read as follows:

-- $\Gamma_{N2} = 100 - (d_{Act} + e_{Act} + f + G_{Act} + k_{Act}$
$\qquad + l + m/2 + q/2 + t + u)$
$\qquad - 100\phi_{Act}(R_{Act} - 1.0)/[R_{Act}(\phi_{Act} + 1.0)]$     (36) --

UNITED STATES PATENT AND TRADEMARK OFFICE
CERTIFICATE OF CORRECTION

PATENT NO.    : 6,522,994 B1
DATED         : February 18, 2003
INVENTOR(S)   : Fred D. Lang It is certified that error appears in the above-identified patent and that said Letters Patent is hereby corrected as shown below:

<u>Column 26,</u>
Equation (38) should read as follows:

$$-- \; \Gamma_{O2} = d_{Act} + e_{Act}/2 + (G_{Act} - a\beta) + (J_{Act} - b_A\beta)/2 + k_{Act} \\ + 3l/2 + m/2 + p/2 + q + 2r - a - b_A/2 - b_Z/2 \\ + (3\sigma - 2 - 2\gamma + \sigma z)b_{PLS}/2 - x(\alpha_7 + \alpha_8/2) \qquad (38) \; --$$

Equation (40) should read as follows:

$$-- \; \Gamma_{SO2} = k_{Act} + l + \sigma b_{PLS} - x\alpha_9 \qquad (40) \; --$$

Equation (41) should read as follows:

$$-- \; \Gamma'_{Ash} = a - (G_{Act} - a\beta) + e_{Act}/2 + f/2 + w + v \\ - b_{PLS}/2 - l/2 - m/2 - p/2 - q - 2r \\ + x[\alpha_0(YR - ZR/2) + \alpha_7 + \alpha_8/2 + \alpha_9/2] \qquad (41) \; --$$

Line 40, delete "Act" and insert -- *Act* --

<u>Column 27,</u>
Line 5, delete "unit" and insert -- unity --
Line 13, delete "minor, fuel" and insert -- minor fuel --

<u>Column 28,</u>
Line 58, delete "$\alpha_{MAF-4} = f(\alpha_{MAF-5})$" and insert -- $\alpha_{MAF-4} = f(\alpha_{MAF-5})$ --

<u>Column 29,</u>
Equation (49) should read as follows:

$$-- \; xN_{AF} = x\left(\Sigma_{j=0-9} \, N_j \alpha_j + N_{10}\alpha_{10}\right) \qquad (49) \; --$$

Eqution (52) should read as follows:

$$-- \; xN_{AF} = x_{MAF}\left(\Sigma_{j=0-9} \, N_j \alpha_{MAF-j} + N_{10}\alpha_{MAF-10}\right) \qquad (52) \; --$$

Equation (53) should read as follows:

$$-- \; AF = (1.0 + \beta)[(a + a\phi_{Act})N_{Air} + b_A N_{H2O}] \\ / [x_{MAF}(\Sigma_{j=0-9} \, N_j \alpha_{MAF-j} + N_{10}\alpha_{MAF-10})] \qquad (53) \; --$$

Equation (54) should read as follows:

$$-- \; \alpha_{MAF-10} = \Gamma_{Ash}\alpha_{MAF-4}/(\Gamma_{CO2}N_{10}) - \Sigma_{j=0-9} \, N_j\alpha_{MAF-j}/N_{10} \qquad (54) \; --$$

UNITED STATES PATENT AND TRADEMARK OFFICE
CERTIFICATE OF CORRECTION

PATENT NO. : 6,522,994 B1  
DATED : February 18, 2003  
INVENTOR(S) : Fred D. Lang Page 4 of 6

It is certified that error appears in the above-identified patent and that said Letters Patent is hereby corrected as shown below:

Column 30,  
Equation (59A) should read as follows:

-- $\alpha_j = \alpha_{MAF-j} / (1.0 + \alpha_{MAF-2} + \alpha_{MAF-10})$ (59A) --

Equation (60B) should read as follows:

-- $WF_{dry-j} = WF_j / (1.0 - WF_2)$ (60B) --

Column 31,  
Equation (61) should read as follows:

-- $\Delta HHV_{MAF-delta} = HHV_{MAF-Ref} - (-178387.18\, \alpha_{MAF-3}$  
$+ 183591.92\, \alpha_{MAF-4} + 78143.68\, \alpha_{MAF-5}$  
$+ 127692.00\, \alpha_{MAF-6})_{Ref} / N_{MAF-Ref}$ (61) --

Equation (62) should read as follows:

-- $HHV_{MAF-uncorr} = (-178387.18\, \alpha_{MAF-3}$  
$+ 183591.92\, \alpha_{MAF-4} + 78143.68\, \alpha_{MAF-5}$  
$+ 127692.00\, \alpha_{MAF-6})_{Actual} / N_{MAF-Actual}$ (62) --

Column 32,  
Line 2, delete "fraction—163190" and insert -- fraction -163190 --  
Lines 39-61 with embedded equations, should read in tabular context as follows:

-- Fuel Flow Rate, $m_{AF}$, Eq.(21) $= BBTC/[\eta_{boiler}(HHVP + HBC)]$  
Combustion Dry Air Flow Rate $= m_{AF}(1.0 + \beta)(a + a\phi_{Act})N_{Air}/(xN_{AF})$  
Combustion Air Moisture Flow Rate $= m_{AF}(1.0 + \beta)b_A N_{H2O}/(xN_{AF})$  
In-Leakage of Water and Steam $= m_{AF} b_Z N_{H2O}/(xN_{AF})$  
Pure Limestone ($CaCO_3$) Flow $= m_{AF}(1.0 + \gamma)b_{PLS}N_{CaCO3}/(xN_{AF})$  
$\Sigma$INLET FLOWS Dry Gas Flow from the Combustion  
    Region (i.e., Boiler Effluent,  
    assuming 100 mole base) $= m_{AF} 100 N_{Gas}/(R_{Act} xN_{AF})$  
Dry Air Leakage Flow at Boundary $= m_{AF}\beta(a + a\phi_{Act})N_{Air}/(xN_{AF})$  
Combustion Moisture plus Air Leakage  
    Moisture at Boundary $= m_{AF}(j + \beta b_A) N_{H2O}/(xN_{AF})$  
Reject & Refuse Carbon Flow $= m_{AF}(v + w) N_C/(xN_{AF})$  
Calcium Sulfate with Water Flow $= m_{AF}\sigma b_{PLS} N_{CaSO4 \cdot zH2O}/(xN_{AF})$  
Calcium Oxide Flow $= m_{AF}(1.0 - \sigma + \gamma)b_{PLS}N_{CaO}/(xN_{AF})$  
Ash (Bottom, Fly & Dust) Flow $= m_{AF}\alpha_{10} N_{Ash}/N_{AF}$  
$\Sigma$OUTLET FLOWS --

Equation (69) should read as follows:

-- $m_{species-i} = m_{AF}\, \Phi_i\, N_i / [xN_{AF}]$ (69) --

UNITED STATES PATENT AND TRADEMARK OFFICE
CERTIFICATE OF CORRECTION

PATENT NO. : 6,522,994 B1      Page 5 of 6
DATED : February 18, 2003
INVENTOR(S) : Fred D. Lang It is certified that error appears in the above-identified patent and that said Letters Patent is hereby corrected as shown below:

Column 33,
Lines 1-2, each occurrence of "$\phi_i$" should read -- $\Phi_i$ --
Line 4, delete "$\phi_{SO2}$" should read -- $\Phi_{SO2}$ --

Column 34,
Lines 9-12, including Equation (72) should read as follows:

$$L'_{Fuel} = [x_{Dry-theor} N_{Dry-Fuel} + a_{Dry-theor}(1.0 + \phi_{Act})N_{Dry-Air} - J_{theor}N_{H2O} - x_{MAF-theor}\alpha_{MAF-10}N_{Ash}]$$
$$/ (x_{Dry-theor}N_{Dry-Fuel}HHV_{Dry}) \qquad (72)$$
$$\text{Note that: } x_{Dry-theor}N_{Dry-Fuel}HHV_{Dry} = x_{MAF-theor}N_{MAF-Fuel}HHV_{MAF}.$$

Lines 26, 30, and 46, delete "$L_{Fuel}$" and insert -- $L'_{Fuel}$ --
Equation (75) should read as follows:

$$-- \quad L'_{Fuel} = K_{11} + K_{12}d_{Act} + K_{13}d^2_{Act} \qquad (75) \quad --$$

Line 56, delete "$L_{Fuel}$ and $L_{Fuel}$" and insert -- $L_{Fuel}$ and $L'_{Fuel}$ --.
Lines 59-60, delete "$J_{Act}$ and $_{AFAct}$, individually; versus $L_{Water} = f(J_{Act})$ and $L_{Ash} = f(AF_{Act})$."

and insert -- $J_{Act}$ and $AF_{Act}$, individually; versus $L_{Water} = f(J_{Act})$ and $L_{Ash} = f(AF_{Act})$. --

Column 35,
Equation (76) should read as follows:

$$-- \quad F_i = [(L_i - L_{Ref-i})/L_{Ref-i}]^2$$
$$\cdot [1.0 - \prod_{n=1,2,3}(HHV_n - HHV_{Ref-n})^2 / HHV^2_{Ref-n}] \qquad (76) \quad --$$

Line 11, delete "$L_{Ref-1}$" and insert -- $L_{Ref-i}$ --
Lines 20 and 21, each occurrence of "f(" should read -- $f($ --
Line 38, delete "$L_{ref-Water}$ and $L_{ref-Ash}$" and insert -- $L_{Ref-Water}$ and $L_{Ref-Ash}$ --
Line 46, each occurrence of "f(" should read -- $f($ --

Column 37,
Lines 48-49, each occurrence of the subscript "act" should read the subscript -- Act --

UNITED STATES PATENT AND TRADEMARK OFFICE
CERTIFICATE OF CORRECTION

PATENT NO. : 6,522,994 B1
DATED : February 18, 2003
INVENTOR(S) : Fred D. Lang

It is certified that error appears in the above-identified patent and that said Letters Patent is hereby corrected as shown below:

Column 38,
Lines 56-57, embedded equation "$\alpha_{MAF-j} = f(\alpha_{MAF-4})$" should read -- $\alpha_{MAF-j} = f(\alpha_{MAF-4})$ --

Line 60, embedded equation "$\alpha_{MAF-5} = f(\alpha_{MAF-4})$" should read -- $\alpha_{MAF-5} = f(\alpha_{MAF-4})$ --

Column 39,
Line 1, embedded equation "$\alpha_{MAF-5} = f(\alpha_{MAF-4})$" should read -- $\alpha_{MAF-5} = f(\alpha_{MAF-4})$ --

This certificate supersedes Certificate of Correction issued March 30, 2004.

Signed and Sealed this

Twenty-fifth Day of May, 2004

JON W. DUDAS
*Acting Director of the United States Patent and Trademark Office*